United States Patent
Green et al.

(10) Patent No.: US 10,279,898 B2
(45) Date of Patent: May 7, 2019

(54) ROCKET OR BALLISTIC LAUNCH ROTARY WING VEHICLE

(75) Inventors: John Green, Bedfordshire (GB); Philip Geoghegan, Kent (GB); Michael Alexander Snook, Bedfordshire (GB)

(73) Assignee: BLUE BEAR SYSTEMS RESEARCH LIMITED, Bedford (GB)

(*) Notice: Subject to any disclaimer, the term of this patent is extended or adjusted under 35 U.S.C. 154(b) by 0 days.

(21) Appl. No.: 14/122,045

(22) PCT Filed: May 23, 2012

(86) PCT No.: PCT/EP2012/059637
§ 371 (c)(1),
(2), (4) Date: Jan. 24, 2014

(87) PCT Pub. No.: WO2012/160111
PCT Pub. Date: Nov. 29, 2012

(65) Prior Publication Data
US 2014/0299708 A1    Oct. 9, 2014

(30) Foreign Application Priority Data

May 23, 2011 (GB) .................................. 1108622.0

(51) Int. Cl.
*B64C 27/59* (2006.01)
*B64C 27/605* (2006.01)
(Continued)

(52) U.S. Cl.
CPC ............ *B64C 27/605* (2013.01); *B64C 27/00* (2013.01); *B64C 27/08* (2013.01); *B64C 27/32* (2013.01); *B64C 27/50* (2013.01); *B64C 27/58* (2013.01); *B64C 27/59* (2013.01); *B64C 39/024* (2013.01); *B64D 27/02* (2013.01); *B64D 27/24* (2013.01); *B64F 1/04* (2013.01); *B64C 2201/027* (2013.01); *B64C 2201/042* (2013.01); *B64C 2201/102* (2013.01); *B64C 2201/108* (2013.01)

(58) Field of Classification Search
CPC ....... B64C 27/605; B64C 27/00; B64C 27/50; B64C 27/08; B64C 27/59; B64D 27/24; B64D 27/02; B64F 1/04
USPC ................................ 244/17.11, 17.23, 17.25
See application file for complete search history.

(56) References Cited

U.S. PATENT DOCUMENTS 2,670,051 A * 2/1954 Hohenemser ................. 416/102
3,031,017 A   4/1962 Arcidiacono
(Continued)

FOREIGN PATENT DOCUMENTS

KR   20060027941   3/2006

OTHER PUBLICATIONS

Search Report received for United Kingdom Patent Application No. GB1108622.0, dated Sep. 30, 2013, 2 pages.

*Primary Examiner* — Tien Q Dinh
*Assistant Examiner* — Michael A. Fabula

(57) ABSTRACT

A rocket or ballistic launch rotary wing air vehicle may include a rocket or ballistic launch propulsion system for launching the vehicle, a rotary wing flight system for providing powered flight comprising dual counter rotating coaxial rotors, and a control system programmed to adjust the pitch of a rotor to anyh determined degree of pitch independently of a flap angle of the flap hinge during a transition of the dual counter rotating coaxial rotors from a stowed position to a deployed position.

15 Claims, 55 Drawing Sheets

(51) Int. Cl.
  *B64C 27/32* (2006.01)
  *B64C 27/58* (2006.01)
  *B64C 39/02* (2006.01)
  *B64C 27/00* (2006.01)
  *B64C 27/08* (2006.01)
  *B64C 27/50* (2006.01)
  *B64D 27/02* (2006.01)
  *B64D 27/24* (2006.01)
  *B64F 1/04* (2006.01)

(56) References Cited

U.S. PATENT DOCUMENTS

| | | | | |
|---|---|---|---|---|
| 3,144,908 | A | | 8/1964 | Pascher |
| 3,175,619 | A | * | 3/1965 | Reed, Jr. ............... 416/37 |
| 3,308,888 | A | * | 3/1967 | Arcidiacono ............ 416/114 |
| 3,412,680 | A | * | 11/1968 | Girard ............... B64F 1/20 |
| | | | | 102/339 |
| 3,428,271 | A | * | 2/1969 | Barzda ............... B64D 19/02 |
| | | | | 244/139 |
| 3,460,628 | A | * | 8/1969 | Tankersley .......... 416/213 R |
| 3,701,612 | A | * | 10/1972 | Breuner .............. 416/141 |
| 4,302,154 | A | * | 11/1981 | Mack ................. 416/114 |
| 4,478,379 | A | * | 10/1984 | Kerr .................. 244/17.11 |
| 4,630,998 | A | * | 12/1986 | Leman et al. ........ 416/134 A |
| 5,868,351 | A | * | 2/1999 | Stamps ............ B64C 29/0033 |
| | | | | 244/12.4 |
| 6,047,924 | A | * | 4/2000 | Thomassin ........... B64C 27/50 |
| | | | | 244/17.11 |
| 6,065,933 | A | * | 5/2000 | Secord ............... B63H 1/22 |
| | | | | 416/142 |
| 7,677,491 | B2 | * | 3/2010 | Merems .............. B64D 1/02 |
| | | | | 244/8 |
| 8,083,173 | B2 | * | 12/2011 | Arlton et al. ........ 244/17.23 |
| 8,210,465 | B2 | * | 7/2012 | Merems ............... B64D 1/02 |
| | | | | 244/17.11 |
| 8,235,324 | B1 | * | 8/2012 | Birch ................ B64C 27/68 |
| | | | | 244/17.25 |
| 8,342,440 | B2 | * | 1/2013 | Papanikolopoulos ............ |
| | | | | A63H 27/12 |
| | | | | 244/17.11 |
| 9,156,545 | B1 | * | 10/2015 | Fenny ............... B64C 27/50 |
| 9,327,831 | B2 | * | 5/2016 | Schank .............. B64C 27/50 |
| 2005/0051667 | A1 | * | 3/2005 | Arlton et al. ........ 244/17.11 |
| 2006/0011777 | A1 | * | 1/2006 | Arlton et al. ........ 244/7 B |
| 2008/0245924 | A1 | * | 10/2008 | Arlton et al. ........ 244/17.13 |
| 2009/0212157 | A1 | * | 8/2009 | Arlton et al. ........ 244/63 |
| 2009/0218439 | A1 | * | 9/2009 | Carlson ............. B64D 19/02 |
| | | | | 244/17.11 |
| 2010/0025526 | A1 | * | 2/2010 | Lawrence ............ 244/17.23 |
| 2011/0006166 | A1 | * | 1/2011 | Arlton et al. ........ 244/7 A |
| 2012/0025012 | A1 | * | 2/2012 | Arlton et al. ........ 244/17.13 |
| 2015/0266571 | A1 | * | 9/2015 | Bevirt .............. B64D 27/24 |
| | | | | 244/7 C |
| 2015/0274290 | A1 | * | 10/2015 | Fenny ............... B64C 27/50 |
| | | | | 244/17.25 |
| 2015/0298804 | A1 | * | 10/2015 | Schank .............. B64C 27/50 |
| | | | | 244/8 |
| 2016/0083087 | A1 | * | 3/2016 | Schank .............. B64C 27/50 |
| | | | | 416/1 |

* cited by examiner

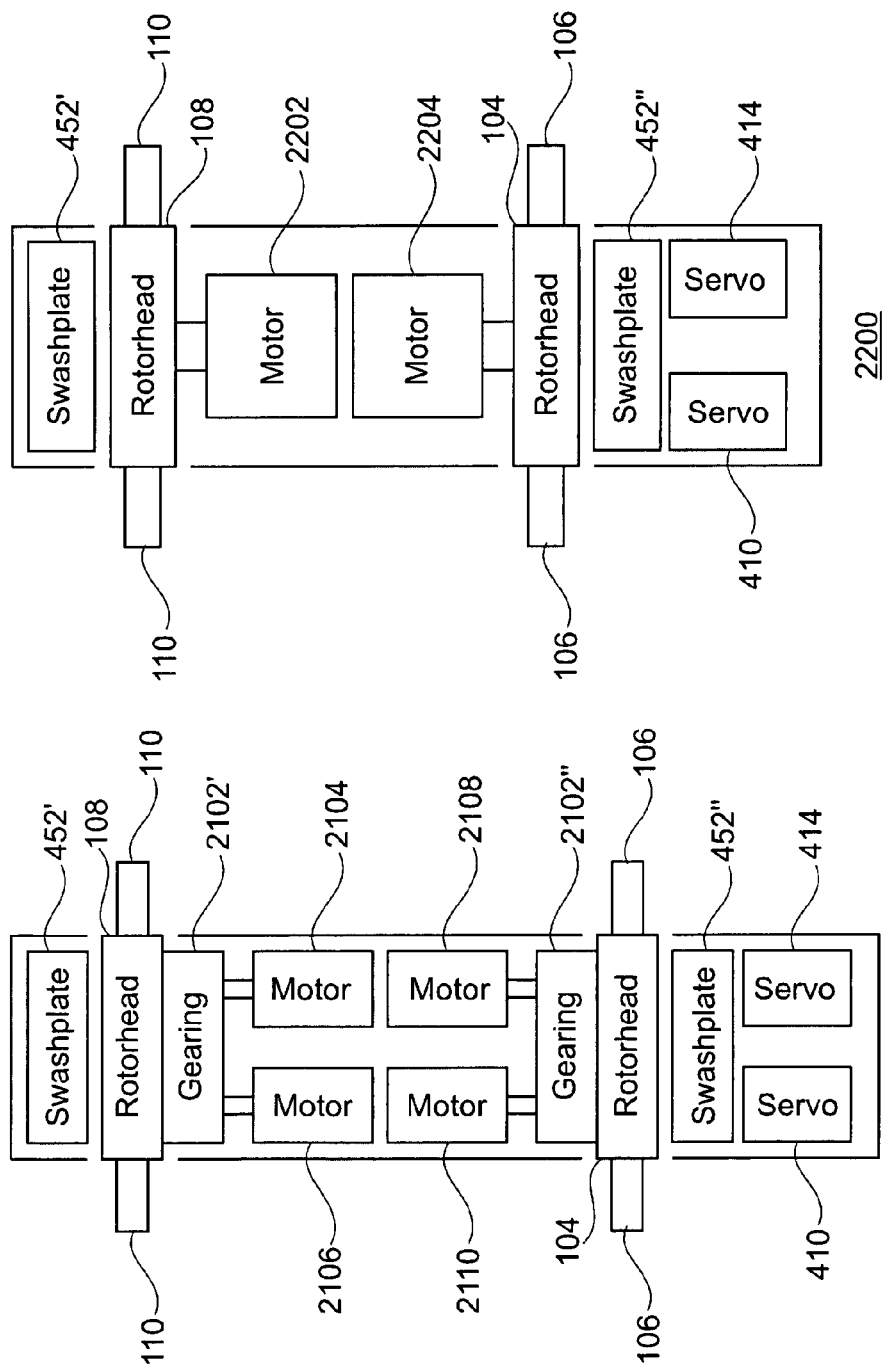

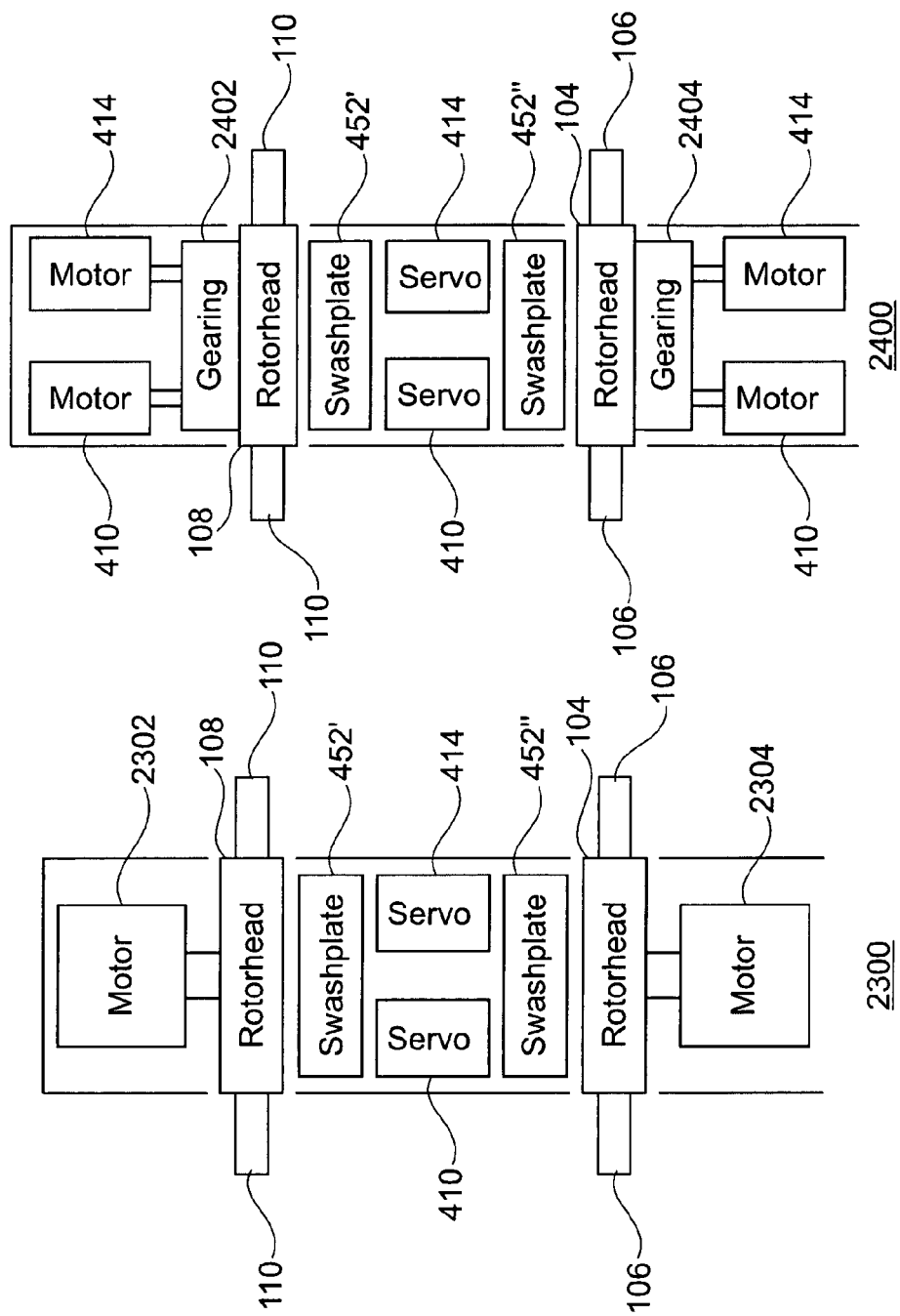

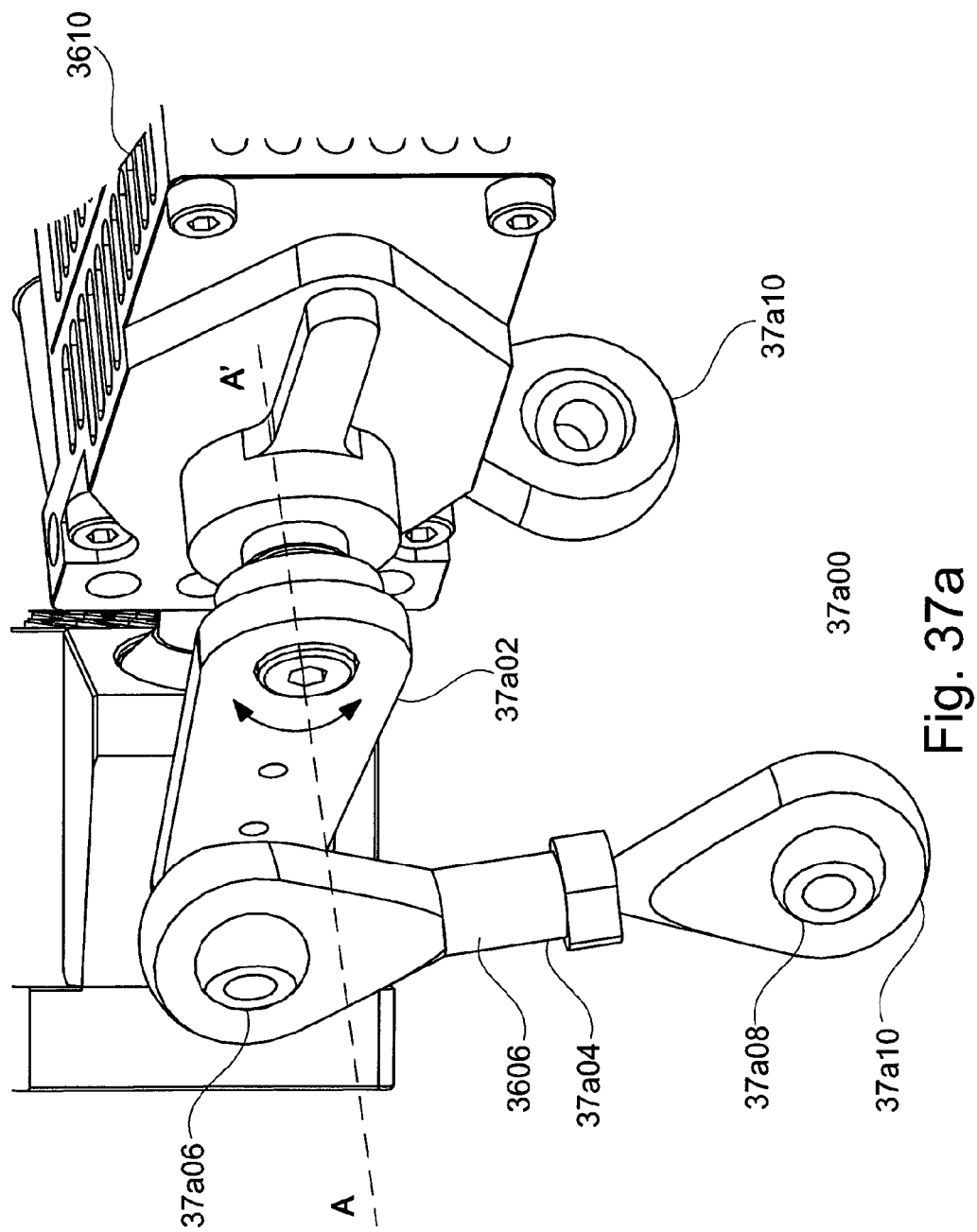

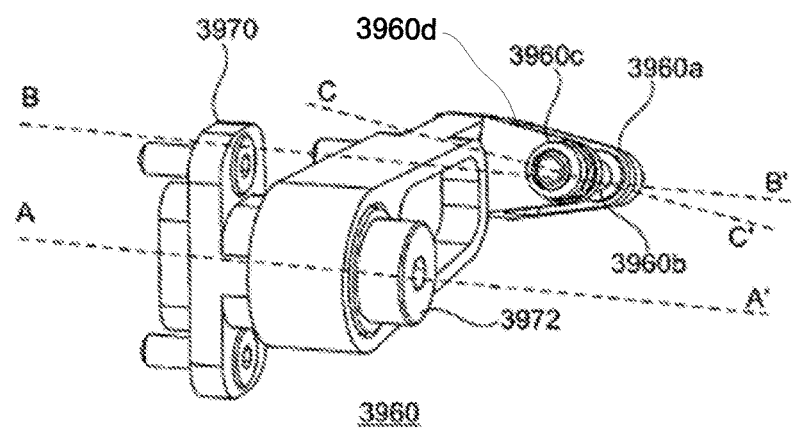
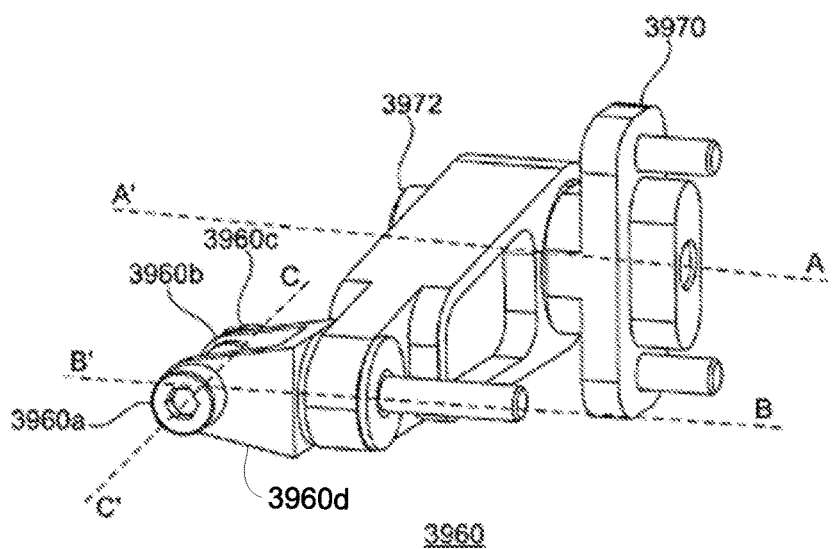
Fig. 44b

ROCKET OR BALLISTIC LAUNCH ROTARY WING VEHICLE

FIELD OF THE INVENTION

Embodiments of the present invention relate to an air vehicle and, more particularly, to a rotary wing vehicle.

BACKGROUND TO THE INVENTION

Increasingly the military, law enforcement agencies and civilian operators use unmanned air vehicles (UAVs) for reconnaissance, surveillance, search and enhanced situational awareness. Typically, a UAV is tasked by a ground control system that is operated by an operator. Data are exchanged between the UAV and the ground control system during any given mission using telemetry.

Wider adoption of UAVs for such tasks depends upon many factors. Those factors include, for example, ease and speed of deployment, the number of operators required to fly the UAV, the weight of the Unmanned Air System (UAS) of which the UAV is a part, including the ground control station and/or associated power supplies and payloads, the size of the vehicle, whether or not further equipment is required to launch the vehicle and the complexity of the vehicle; the latter clearly influencing the ease and speed of deployment.

The above factors influence the suitability of a UAV for a given task. Some situations demand that a UAV is deployed and on task, that is, performing, or at least being en route to, the task for which it was deployed, in as short a time frame as practicable.

It is an object of embodiments of the present invention at least to mitigate one or more of the above problems.

SUMMARY OF THE INVENTION

Accordingly, embodiments of the present invention provide a rocket and/or ballistic launch rotary wing vehicle, the vehicle comprising a launch propulsion system for launching the vehicle; and a rotary wing flight system for providing powered flight.

Advantageously, the vehicle according to embodiments of the present invention can be deployed very rapidly.

BRIEF DESCRIPTION OF THE DRAWINGS

Embodiments of the present invention will now be described, by way of example only, with reference to the accompanying drawings in which

FIG. 21 shows a third vehicle configuration;

FIG. 22 depicts a fourth vehicle configuration;

FIG. 23 shows a fifth vehicle configuration;

FIG. 24 illustrates a sixth vehicle configuration;

FIG. 37*a* depicts a servo-swashplate linkage;

FIG. 44*b* illustrates perspective views of a pitch input arm;

DESCRIPTION OF EMBODIMENTS OF THE INVENTION

Figure 1:
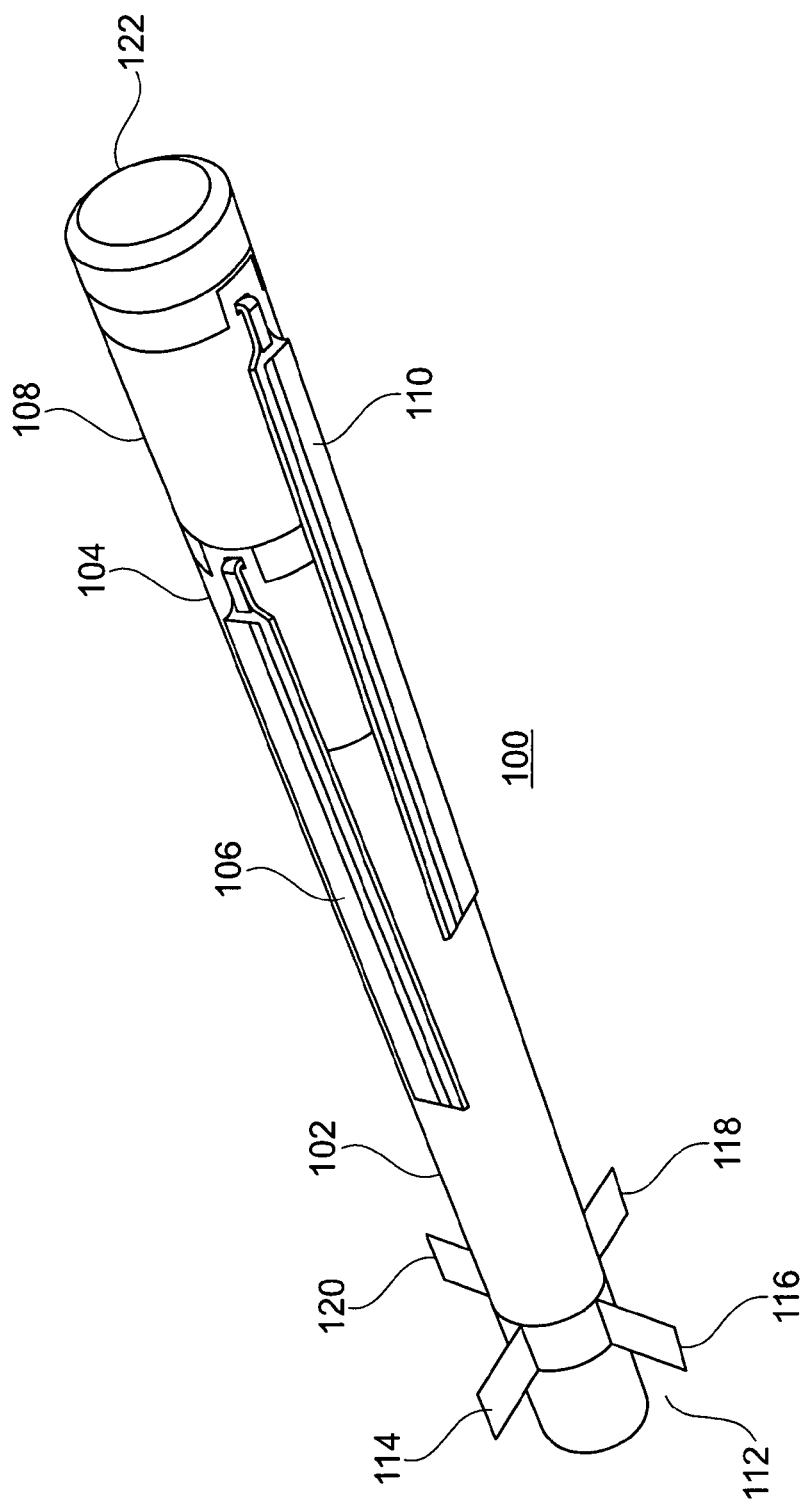
FIG. 1 shows a first perspective view of a rotary wing vehicle.

Referring to FIG. 1, there is shown a first perspective view of a rotary wing vehicle 100 comprising an elongate body 102, a first rotor system 104 bearing respective rotors of which only one rotor blade 106 is shown, a second rotor system 108 bearing respective rotors of which only one rotor blade 110 is shown. In all embodiments described herein, the rotor systems are arranged such that the rotors are counter-rotating, that is, the first rotor system is arranged to rotate its respective rotors in the opposite direction to the rotors of the second rotor system. The vehicle 100 also has a detachable launch or propulsion section 112, preferably, having respective fins 114 to 120. The vehicle has a nose cone 122. Preferred embodiments of the elongate body are substantially cylindrical with a substantially uniform circular cross section. The rotor blades 106 and 110 are shown in the stowed or launch position, in which they are substantially parallel with the longitudinal axis of the vehicle 100.

All embodiments described herein use two rotors per rotor system. However, embodiments are not limited thereto. Embodiments can equally well be realised in which more than two rotors are used per rotor system.

Figure 2:
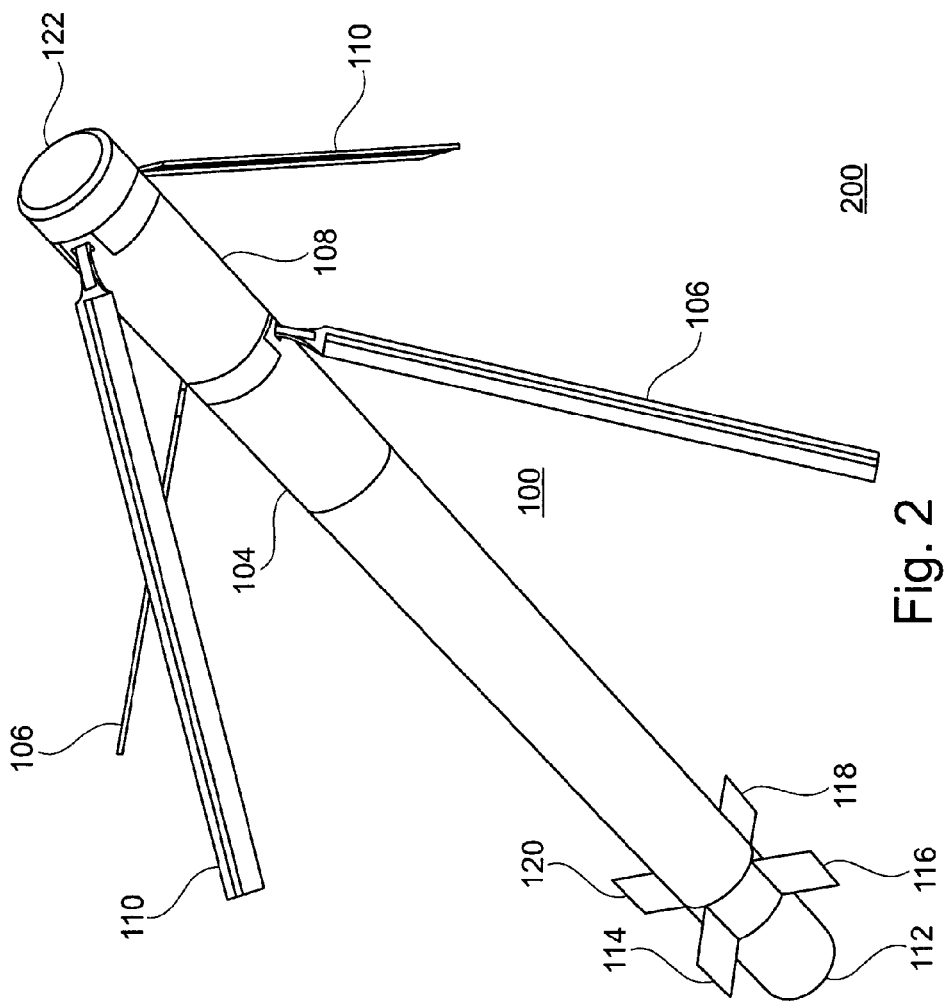
FIG. 2 depicts a second perspective view of the rotary wing vehicle.

FIG. 2 is a second perspective view 200 of the vehicle 100 with the rotors 106 and 110 in a partially stowed or partially deployed position. It can be appreciated that the rotors of a given pair are diagonally opposite one another and that the pairs of rotors are orthogonal to one another.

Figure 3:
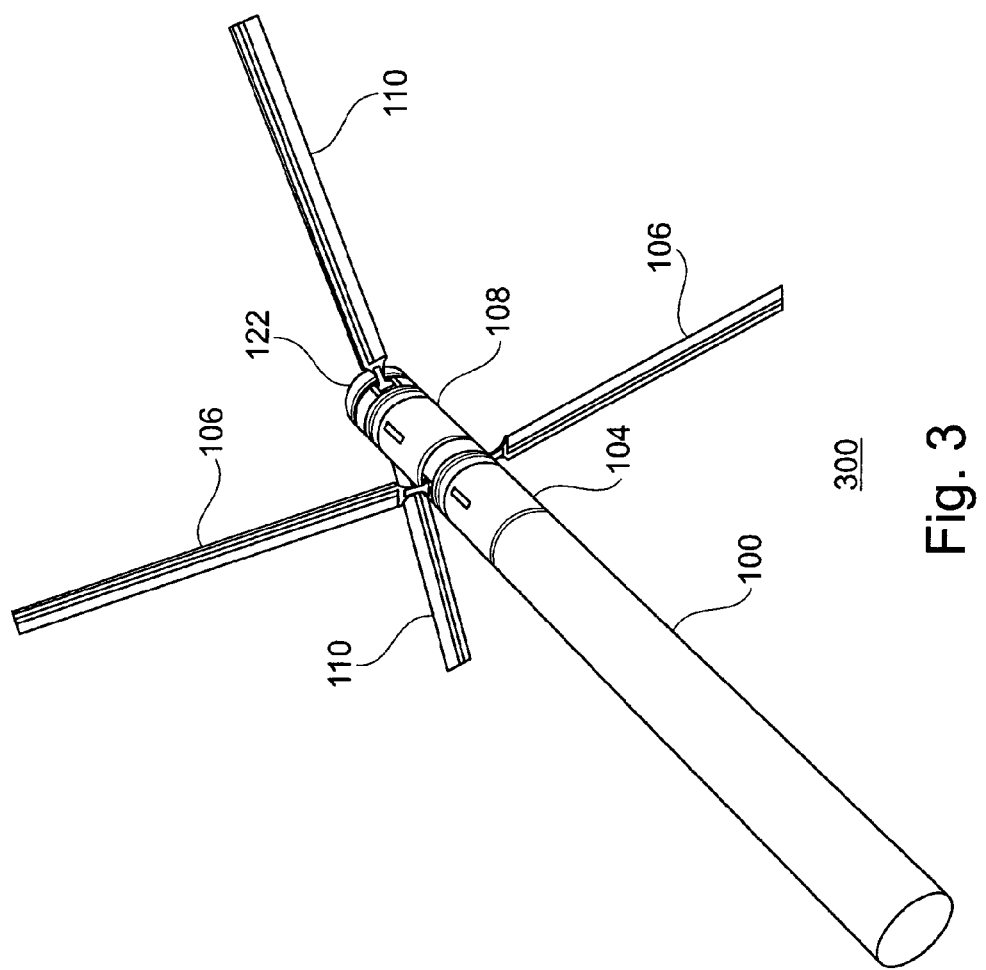
FIG. 3 illustrates a third perspective view of the rotary wing vehicle.

FIG. 3 is a third perspective view 300 of the vehicle 100 with the rotors 106 and 110 in the fully deployed position. It can be appreciated that the launch or propulsion section 112 has been dropped.

The elongate body comprises an external case. Each of the rotor systems 104 and 108 has an external housing.

Figure 4:
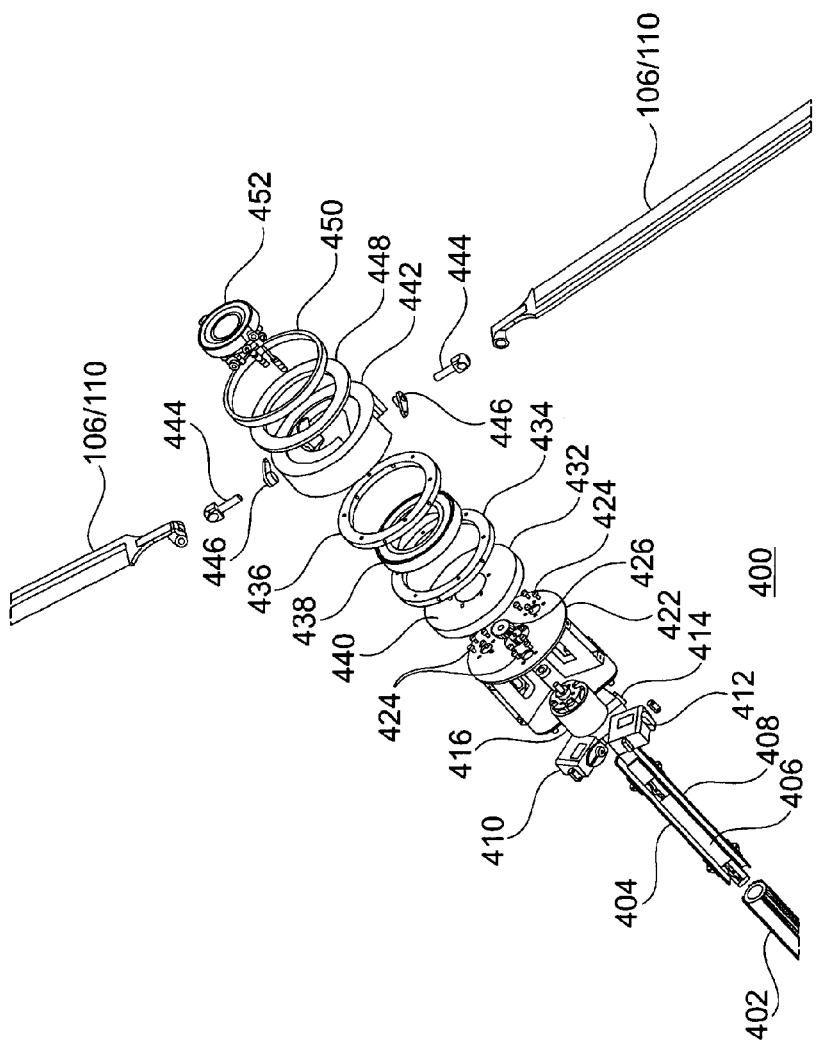
FIG. 4 shows an exploded view of the rotary wing vehicle.
Figure 5:
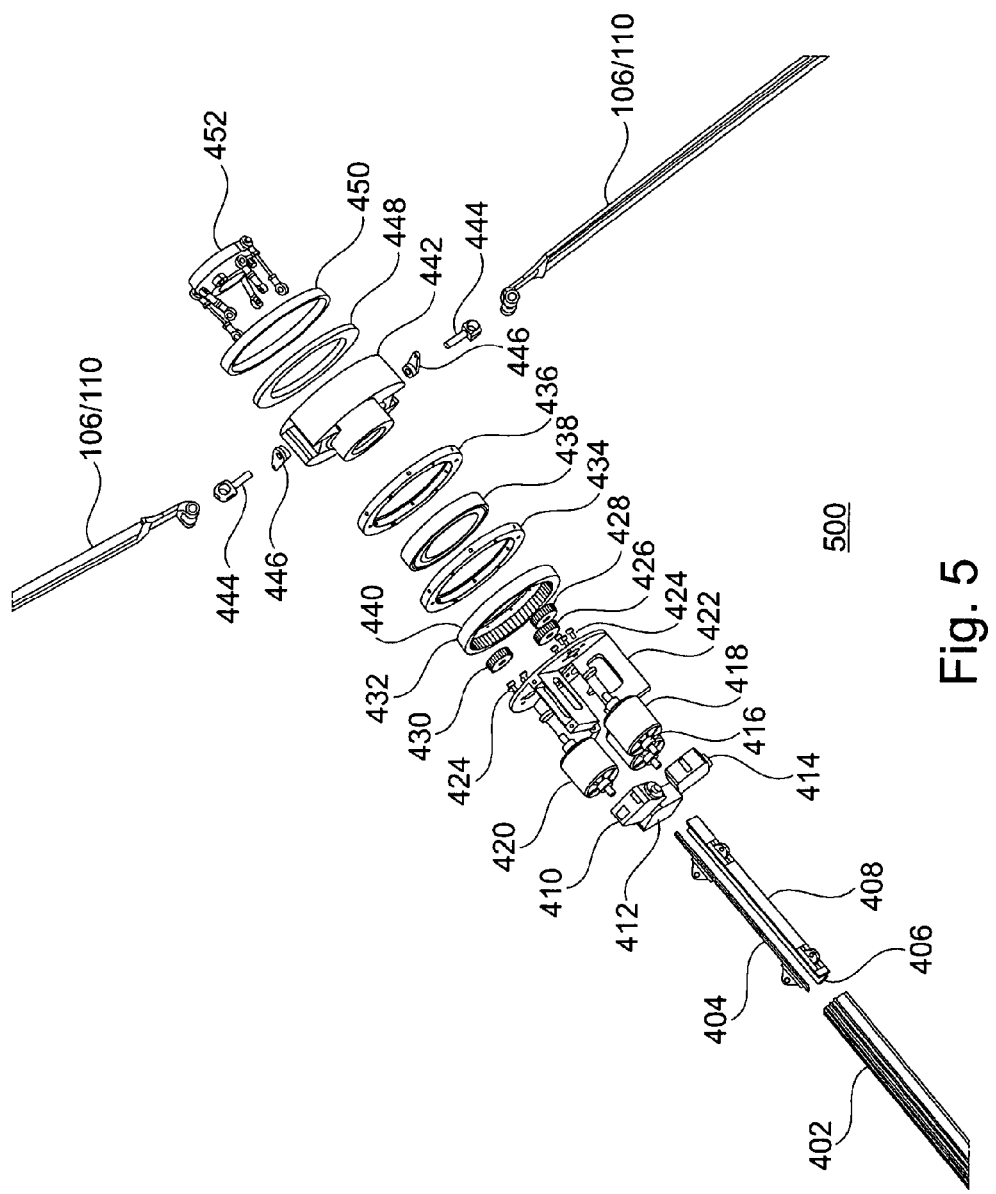
FIG. 5 depicts an exploded view of the rotary wing vehicle.

FIGS. 4 and 5 show respective perspective exploded views 400 and 500 of the rotary vehicle 100 without the external case, external housings and nose cone 122 and with only a single rotor head. It can be appreciated that the vehicle 100 comprises a hollow-central core or spine 402 around which the other components are built or mounted, a number of control links 404 to 408, (e.g., control links 404, 406, 408), a number of servos 410 to 414, (e.g., servos 410, 412, 414), a plurality of motors 416 to 420 (e.g., motors 416, 418, 420; only one 416 of which is shown) and a motor mount 422. The motors 416 to 420 are coupled to the motor mount 422 via respective screws, referred to collectively as 424. Each motor 416 to 420 bears a respective spindle for receiving a respective drive pinion 426 to 430 (e.g., drive pinion 426, 428, 430). The drive pinions 426 to 430 are arranged to cooperate with a main drive gear 432. A pair of bearing clamps 434 and 436 are arranged to retain a ball race 438. The upper surface 440 of the main drive gear 432 is arranged to be coupled to a rotor hub 442. The rotor hub 442 supports a number of rotor blades 106/110 via respective pitch axles 444. Each rotor blade 106/110 also has an associated pitch control arm 446. The vehicle 100 further comprises a thrust bearing 448, a thrust bearing retainer 450 and a swashplate 452. The control links 404 to 408 are coupled between the servos 410 to 414 and the swashplate 452. One skilled in the art will appreciate that having the control links 404 to 408 internally mounted, that is, in a sliding relationship with the core 402 results in a smaller form factor as compared to having the control links radially outwardly disposed as per conventional collective/cyclic control mechanisms.

Figure 6:
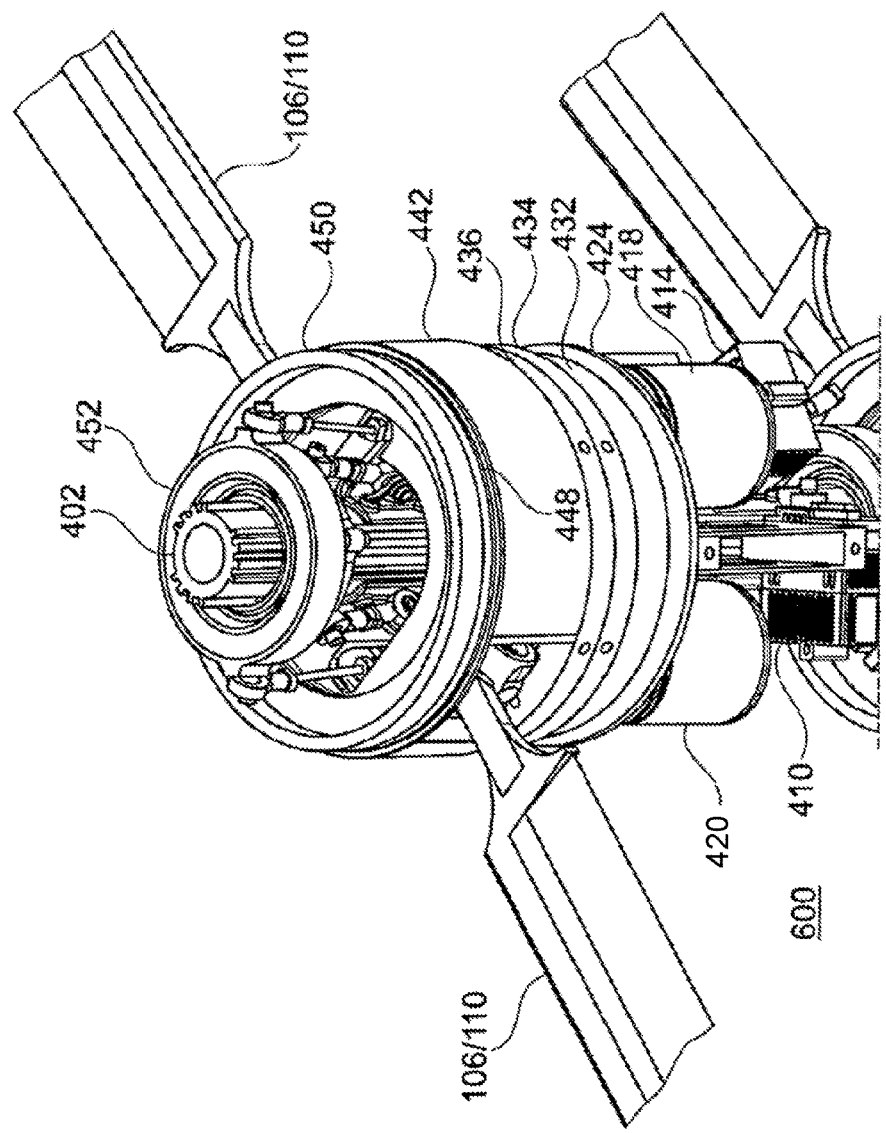
FIG. 6 illustrates an assembled view of the vehicle.

Referring to FIG. 6, there is shown an assembled view 600 of a rotor head of the vehicle 100. It can be appreciated that the assembly is relatively compact.

Figure 7:
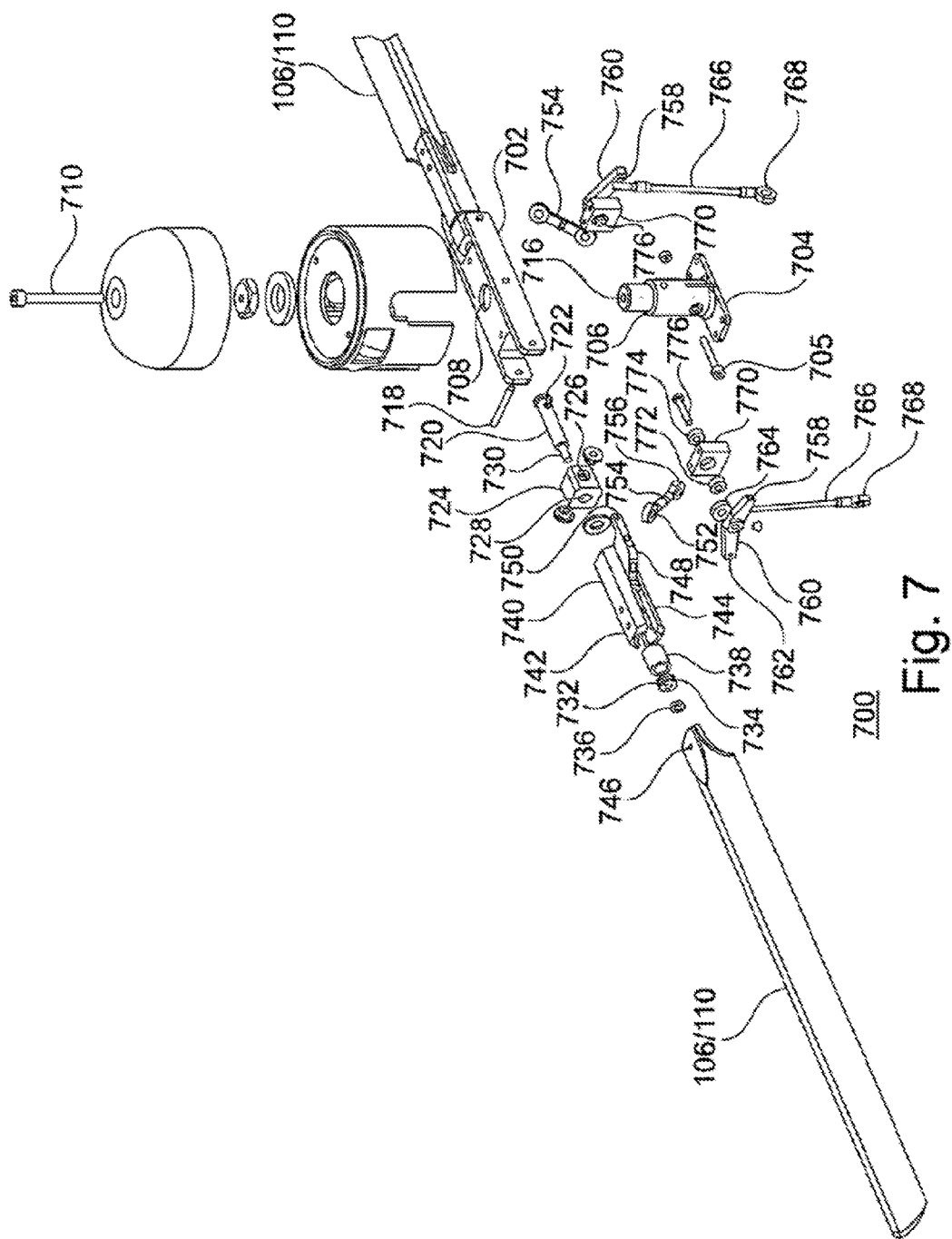
FIG. 7 shows an exploded view of the pitch mechanism.

FIG. 7 shows an exploded view of a pitch mechanism 700. The pitch mechanism 700 comprises a rotor head 702 mountable on a rotor hub 704. The rotor hub has an associated fastener 705 coupling the rotor hub 704 to a respective drive shaft (not shown) in one embodiment. Alternative means for coupling the rotor hub 704 to the drive gear can be realised and embodiments are not limited to using such a rotor hub mounted on a drive shaft. It is sufficient that the rotor hub is coupled, directly or indirectly, to the main gear or a shaft of a motor. The rotor hub 704 has shouldered portion 706 arranged to be received in a respective hole 708 of the rotor head 702 to support the latter. The rotor hub 704 is coupled to the rotor head 702 via a respective bolt, nut and washer (not shown). A bolt 710 engages a respective hole 716 in the rotor hub 704. The rotors 106/110 are coupled to the rotor head 702 via a flap hinge comprising a flap hinge pivot pin 718 and rotor axle 720 bearing, at an end proximal to the rotor head 702, through hole 722 for receiving the flap hinge pivot pin 718. The flap hinge also comprises a flap hinge pivot block 724 having a first through hole 726 arranged to be coaxial with the above through hole 722 when assembled and a second through hole 728 for receiving the rotor axle 720. The rotor axle 720 has a shouldered portion 730 arranged to be received in a respective hole 732 of a thrust bearing 734. The shouldered portion 730 is threaded for fastening to a respective nut 736. A bushing 738 is disposed between the thrust bearing 732 and an inner end wall (not shown) of a rotor grip 740. The rotor grip 740 has a jaw comprising an upper jaw 742 and a lower jaw 744 arranged to clamp the root of the rotor blade 106/110. The clamping is realised using fasteners arranged to pass through the upper 742 and lower 744 jaws and at least one respective hole 746 of the rotor blade root 106/110.

The rotor grip 740 has a pitch control arm 748 having a ball (not shown) at the proximal end 750 arranged to engage a respective socket 752 of a pitch control linkage 754 thereby forming a first ball and socket joint. As shown in FIG 7, the pitch control arm 748 is radially outwardly disposed of the flap hinge axis of rotation relative to the rotor axis of rotation. A further socket 756 is provided at the other end of the pitch control linkage 754. The further socket 756 is arranged to receive a respective ball (not shown) at a first end 758 of a pitch input arm 760. The other end 762 of the pitch input arm 760 also has a ball (not shown) to be received in a respective socket 764 of a first end of a pitch control rod 766. The other end of the pitch control rod 766 also has a socket 768 for receiving a ball of the swashplate 452 described above with reference to FIG. 1 and below in greater detail with reference to FIGS. 13 to 15. A pair of input arm bearing blocks 770 is provided together with respective bearings 772 and 774 for supporting the pitch input arms via respective pins 776. The input arm bearing blocks 770 are arranged to be mounted to the rotor hub 704.

One skilled in the art will appreciate that a scissor link and counterweight, connected to the hub via a hinged joint and the swash via a rotating socket, carries the main shaft rotation of the motor up to the lower swashplate and allows axial movement whilst transmitting cyclic and collective inputs.

It will be noted that the pitch control rods 766 are shown as extending substantially downwards. While embodiments can be realised using such an arrangement, preferred embodiments are arranged such that the pitch control rods 766 extend substantially upwards from the pitch input arms 760 towards respective balls of the swashplate 452. In effect, the swashplate 452 is inverted and disposed above the rotor head 702 rather than below the rotor head 702 as is conventional. The arrangement shown in FIG. 7 has been represented as is for purposes of clarity and explanation.

Figure 8:
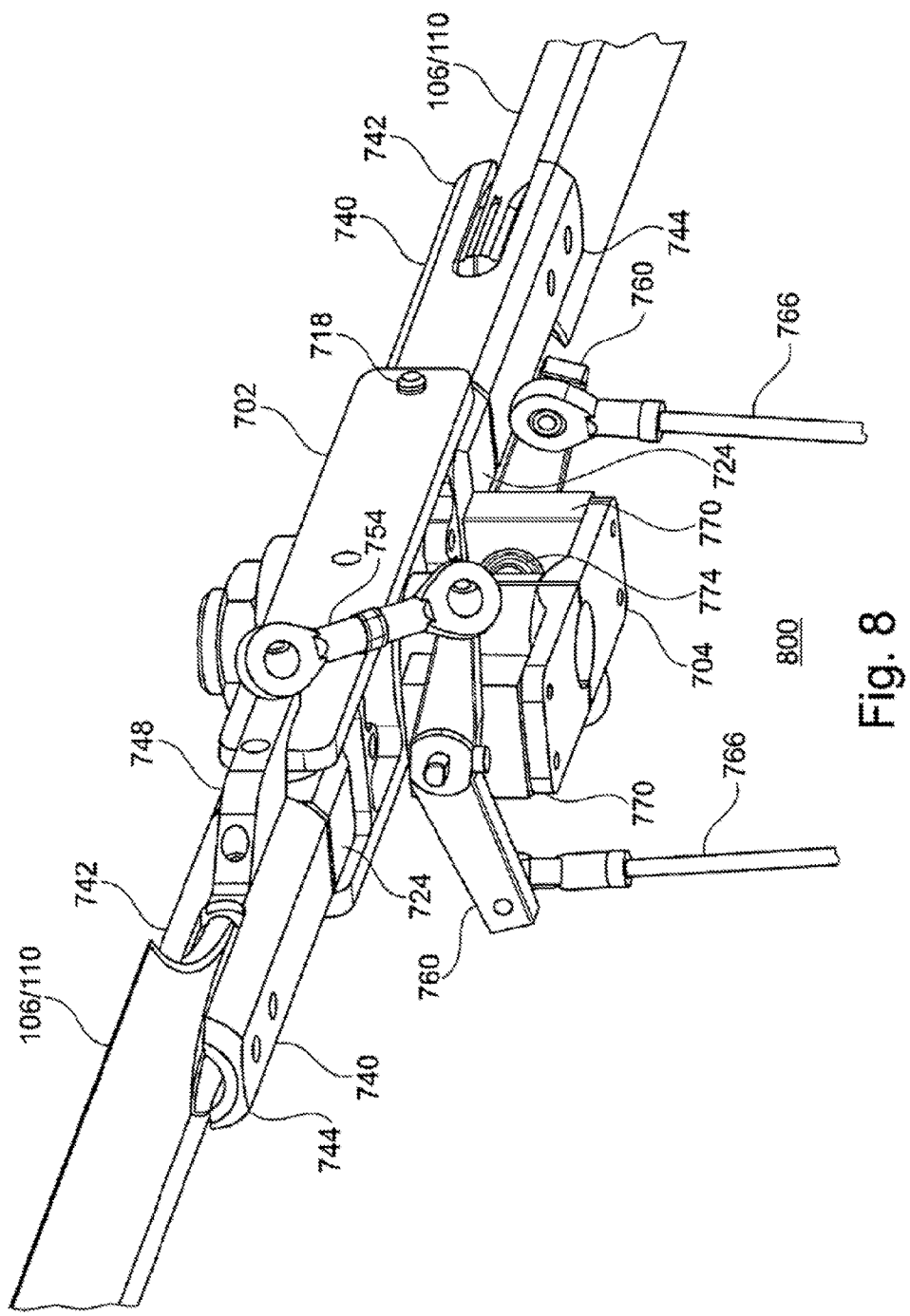
FIG. 8 depicts an assembled view of the pitch mechanism.

FIG. 8 is an assembled view 800 of the pitch mechanism. It will be appreciated again that the pitch control rods 766 are shown as being caudally oriented, that is, directed towards the bottom of the vehicle, for purposes of illustration only. Embodiments of the invention actually use cephalically oriented pitch control rods because the swashplate 452 is situated above the rotor head 702. It can be appreciated that the pitch control rods 766, the pitch input arms 760, pitch control linkages 754 and pitch control arms 748 are arranged such that the rotor blades 106/110 have a substantially zero angle of attack.

Figure 9:
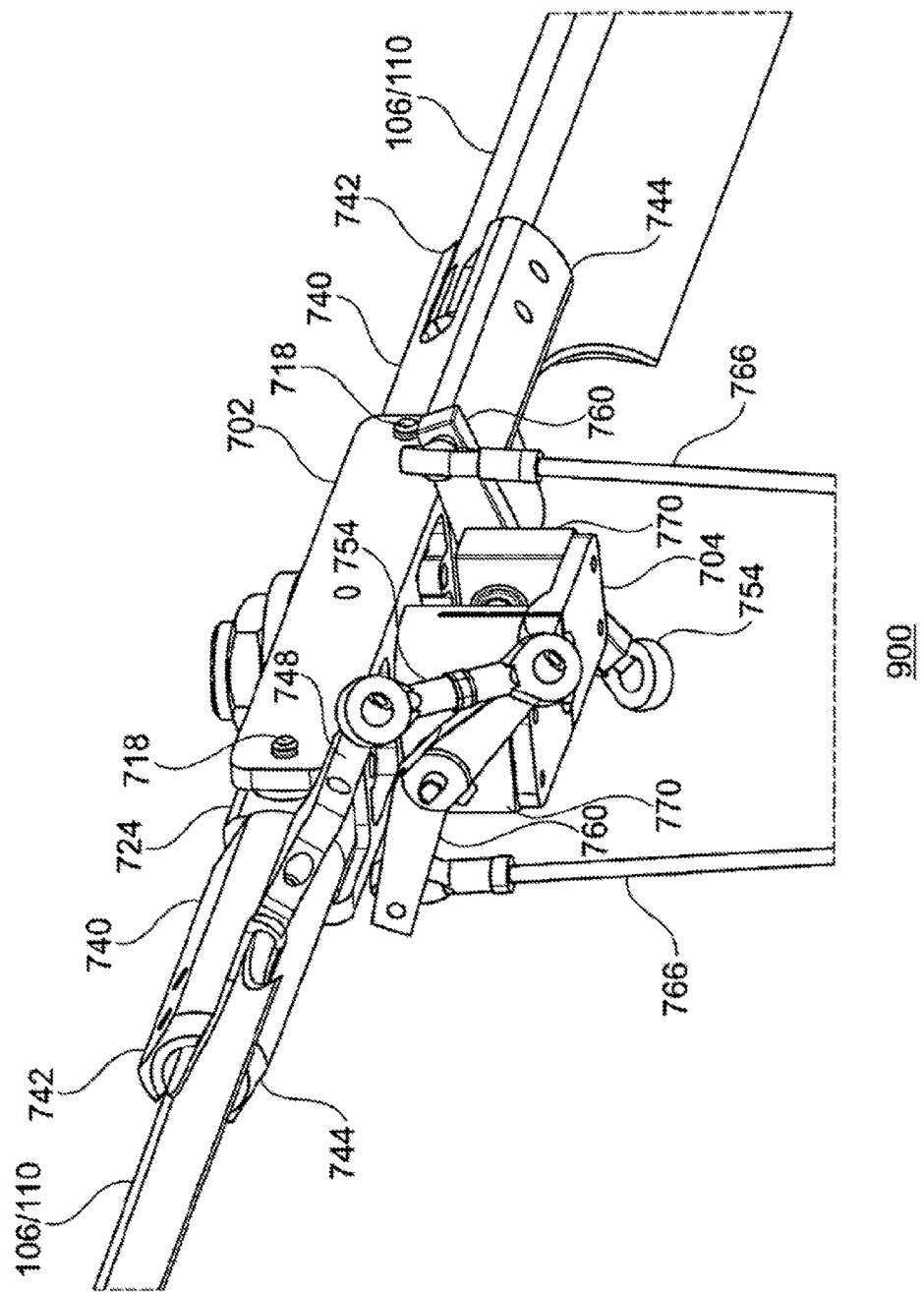
FIG. 9 illustrates an assembled view of the pitch mechanism.

FIG. 9 is an assembled view 900 of the pitch mechanism. It will be appreciated again that the pitch control rods 766 are shown as being caudally oriented for purposes of illustration only. Embodiments of the invention actually use cephalically oriented pitch control rods because the swashplate 452 is situated above the rotor head 702. It can be appreciated that the pitch control rods 766, the pitch input arms 760, pitch control linkages 754 and pitch control arms 748 are arranged such that the rotor blades 106/110 have their maximum angle of attack. Embodiments of the present invention can have any desired angle of attack. Preferred embodiments have a maximum angle of attack of 35°.

Figure 10:
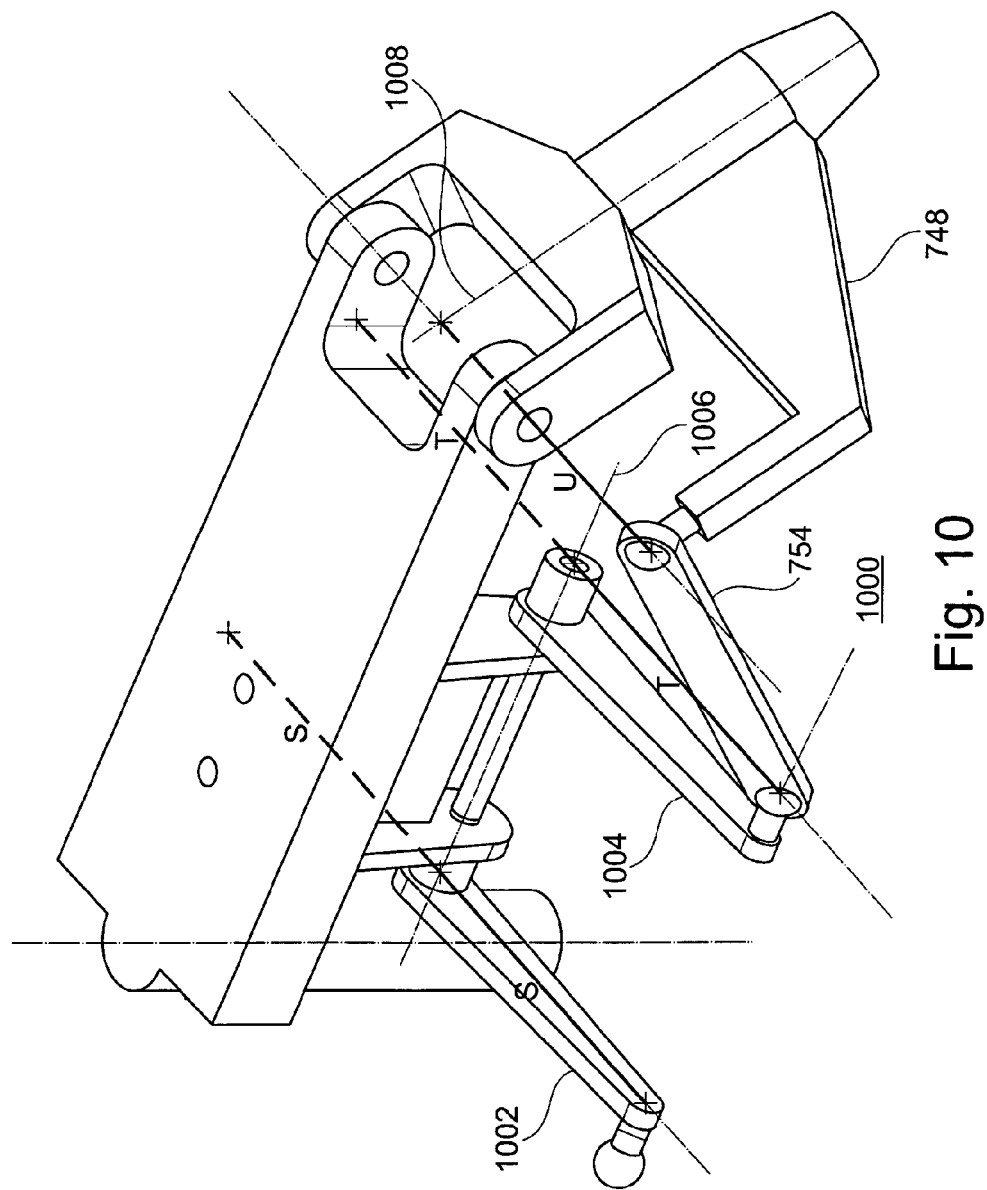
FIG. 10 shows a first simple mechanical model of the pitch mechanism.
Figure 11:
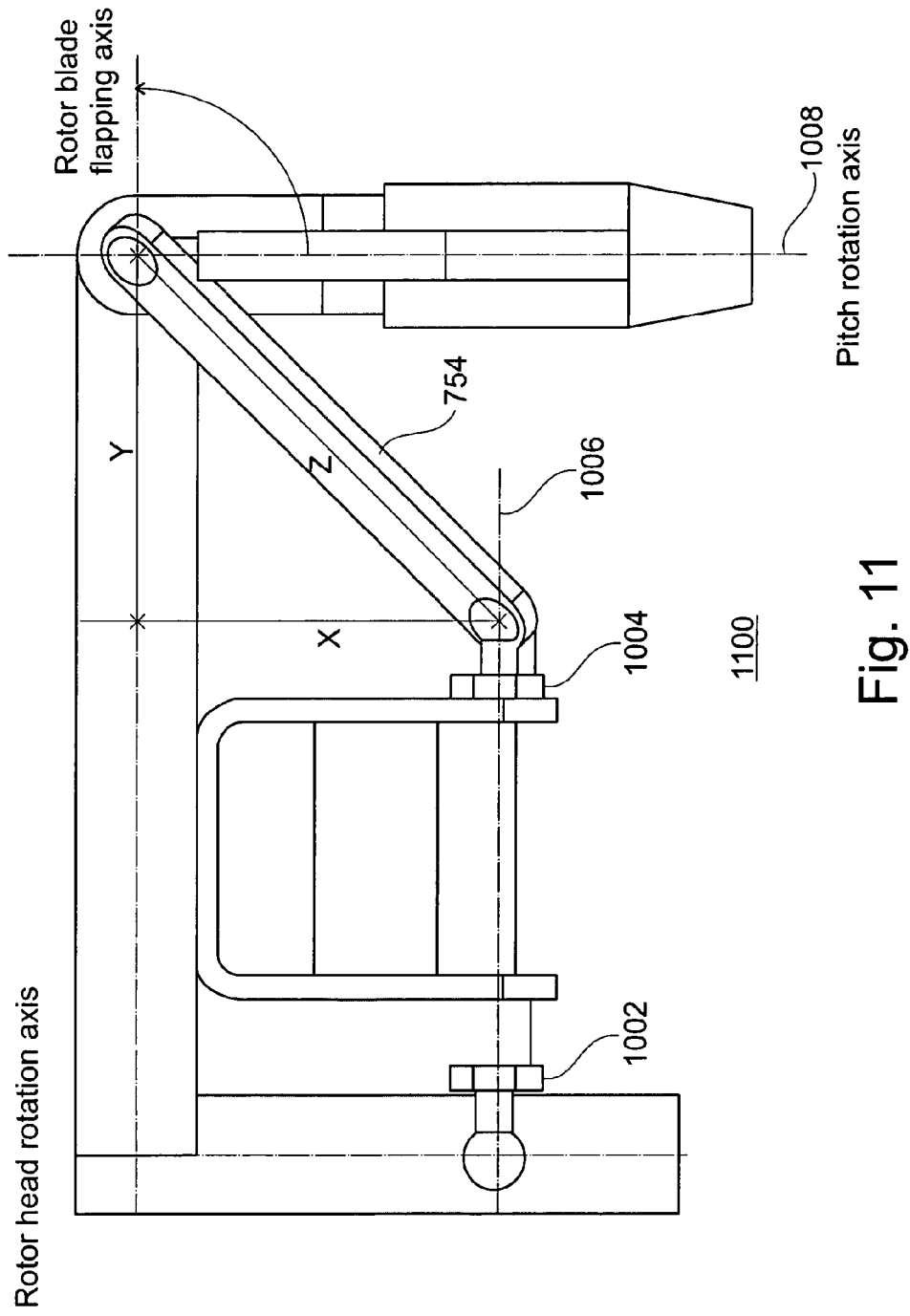
FIG. 11 depicts a second simple mechanical model of the pitch mechanism.

FIGS. 10 and 11 show respective views 1000 and 1100 of a simple mechanical model to assist with understanding the pitch mechanism 700. Although structurally different in some respects the principle of operation is identical to the pitch mechanism describe above with reference to FIG. 7. The model will be described with reference to relative dimensions and ratios because the embodiments are scalable. The above described pitch input arm 760 has been modelled as a pair of arms 1002 and 1004. It can be appreciated that the model could have merely shown the first arm 1002 as being the other side of the second arm 1004, as depicted by the dashed line. The actuation axis 1006 corresponds to that provided by input arm bearing pins 776. It can be seen that the rotor 106/110 has a centre line or pitch rotation axis 1008. There is a predetermined distance, U, between the pitch rotation axis 1008 and the centre of the ball of the pitch control arm 748. There is a predetermined distance, S, extending from the actuation axis 1006 along arm 1002. There is a predetermined distance, T, extending from the actuation axis 1006 along arm 1004. FIG. 11 shows the relative orientations of the pitch control linkage 754, the centre line of the rotor head 702, which is collinear with the pitch rotation axis when the blade is in the deployed position, and the vertical distance, X, between the axis 1006 and the centre line of the rotor axis. There is a predetermined distance, Y, extending along the rotor head rotation axis from the pitch rotation axis to the intersection of the vertical distance, X, with the rotor head rotation axis. There is a predetermined distance, Z, extending along the pitch control linkage 754 from the intersection of the actuation axis 1006 and the vertical distance, X, to the intersection of the pitch rotation axis 1008 and the rotor head rotation axis. The following relative dimensions may apply to preferred embodiments of the present invention:

$$X=Y, S=U, T=U, U=1.333Y \text{ and } Z=\sqrt{X^2+Y^2}.$$

Figure 12:
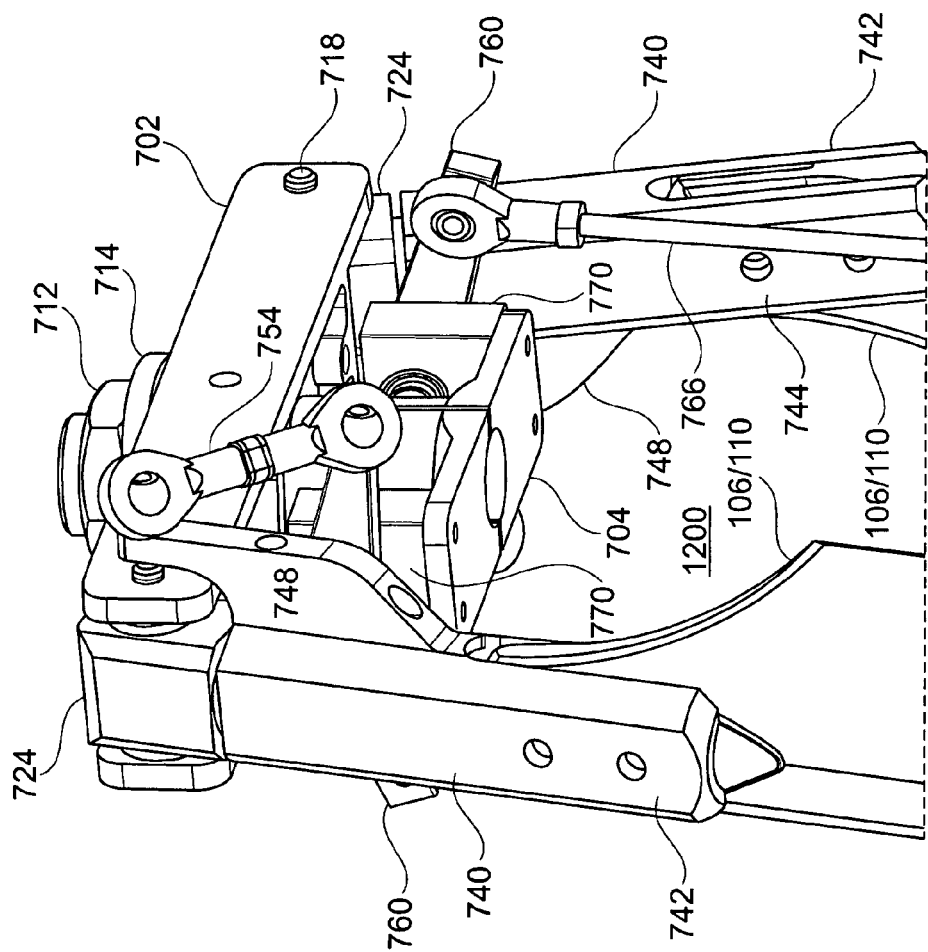
FIG. 12 illustrates a view of the pitch mechanism in a stowed position.

Referring, again, to FIGS. 7 and 9, it will be appreciated that the flapping angle is zero, that is, the rotors are fully deployed. In contrast, FIG. 12 depicts a view 1200 of the pitch mechanism 700 in which the rotor blades 106/110 are stowed. One skilled in the art will appreciate that the pitch or angle of attack of the rotor blades 106/110 can be controlled even when the rotor blades 106/110 are in the stowed position and during the transition of the rotor blades 106/110 from the stowed position to the fully deployed position, which is in stark contrast to a conventional helicopter pitch control mechanism. One skilled in the art will appreciate that the blade collective pitch needs to be close to zero for fully folded rotors for packaging constraints. During rotor deployment, the rotor collective pitch will initially be changed to high pitch and then reduced as the rotor system accelerates. The foregoing in undertaken with a view to managing, preferably reducing, the aerodynamic forces on the rotors during deployment. This rotor pitch schedule will be implemented as a schedule depending upon rotor RPM and airspeed. As the rotor RPM increases from zero, cyclic inputs may be used to control flapping and maintain axisymmetric deployment. After the rotors are at moderate RPM and deployment is at small flapping angles, cyclic will be used to initiate transition to level flight. During transition to level flight, control of collective and cyclic will be required to achieve the desired body forces and to avoid excessive rotor loads.

Figure 13:
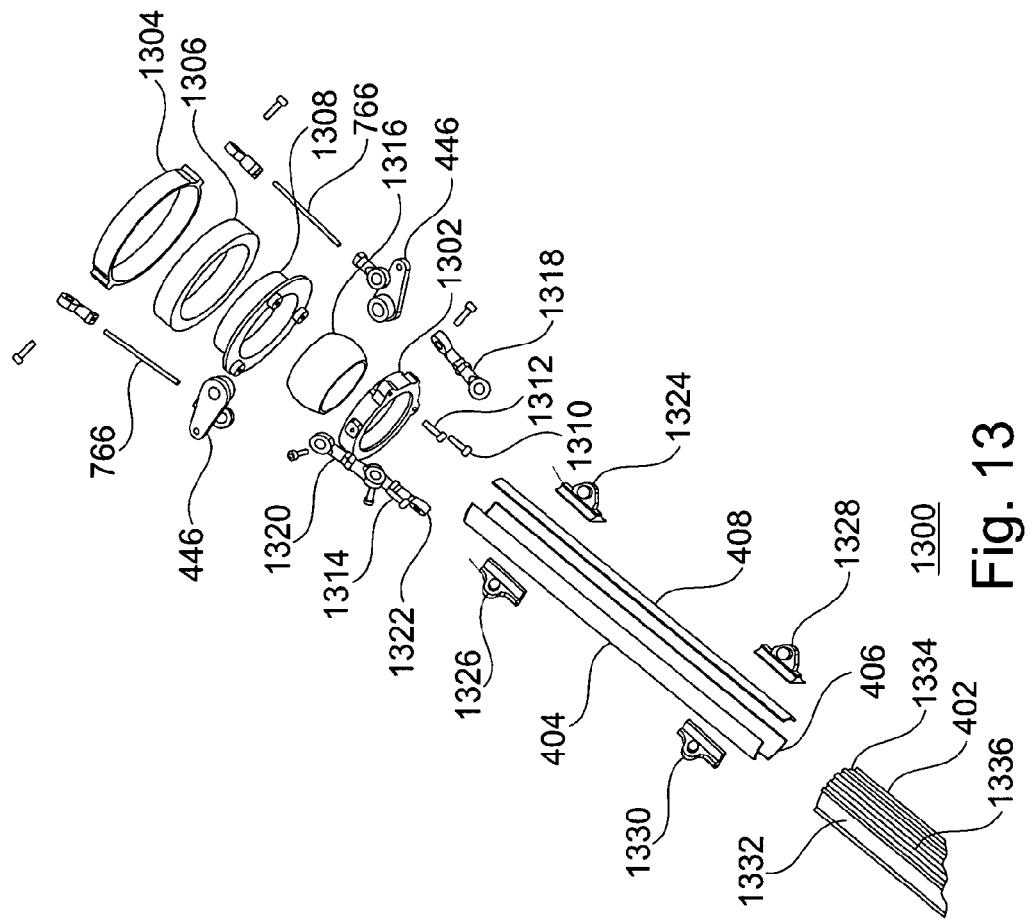
FIG. 13 is a view of the swashplate assembly.

FIG. 13 is an exploded view 1300 of the swashplate assembly 452 and hollow central core 402. The swashplate assembly 452 comprises a non-rotating swashplate 1302 and a rotating swashplate 1304. The rotating swashplate is carried by a rotating swashplate bearing 1306 that is mounted on a rotating swashplate bearing mount 1308. The mount 1308 is coupled to the non-rotating swashplate 1302 via respective fasteners 1310 to 1314. The mount 1308 and non-rotating swashplate 1302 are arranged, when assembled, to capture an annular ball 1316 thereby forming a ball joint. The annular ball 1316 is fabricated from a rigid plastic material. Preferred embodiments use such materials exhibiting self lubricating properties such as acetal, nylon, Teflon etc. The non-rotating swashplate 1302 is coupled by non-rotating swashplate linkages 1318 to 1322 to respective anchors 1324 and 1326 coupled to the links 404 to 408. It will be appreciated that the embodiment uses three such anchors, even though only two such anchors are shown. Servo anchors 1328 and 1330, attached to the links 404 to 408, are arranged to couple with respective servos 410 to 414. It will be appreciated that three such anchors are used even though only two are visible in FIG. 13 (see e.g., 1328'). The links 404 to 408 are slidably mounted with respective channels 1332 and 1334 of the hollow core. Three such channels are provided even though only two channels are visible.

It can be appreciated that the control links 404 to 408 are arranged substantially in parallel with the pitch control rods 766 as opposed to being substantially linearly and sequentially disposed. In effect, the pitch control inputs (links 404 to 408) and links 1310 to 1320 and outputs (pitch control rods 766) fold or loop back on themselves. This leads to a compact swashplate assembly 452.

It will be noted that the core 402 is hollow to accommodate wiring looms for distributing power and carrying control and data signals. Furthermore, the outer surface of the core 402 is profiled. In particular, a first form of profiling, that is, the above-described channels 1332 and 1334, accommodates the links 404 to 408 for coupling the swashplate assembly 452 to the servos. A second form of profiling 1336, preferably in the form of one or more narrower channels, is adapted to accommodate wiring, which can also be used for at least one of distributing power, control signals and data signals. The profiling can be more readily appreciated from the end of the core 402 shown in FIG. 15.

Although the above embodiment uses a ball and socket arrangement to realise the swashplate assembly, embodiments are not limited thereto. Alternative embodiments of the swashplate assembly can be realised with other arrangements, as will be described below with reference to FIGS. 29 to 32.

Figure 14:
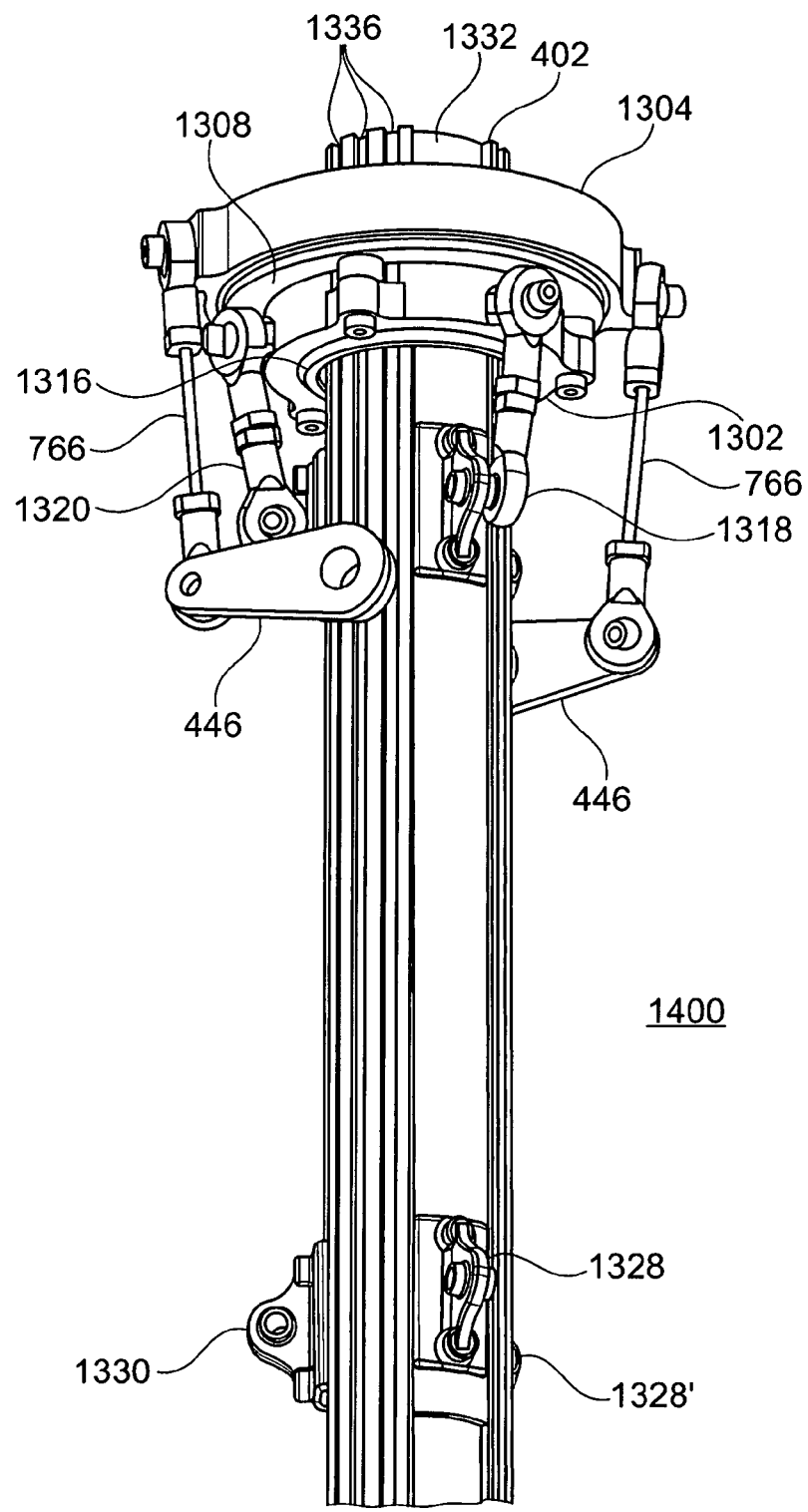
FIG. 14 shows an underside view of the swashplate assembly.

FIG. 14 shows an underside view 1400 of the swashplate assembly 452 and hollow central core 402.

Figure 15:
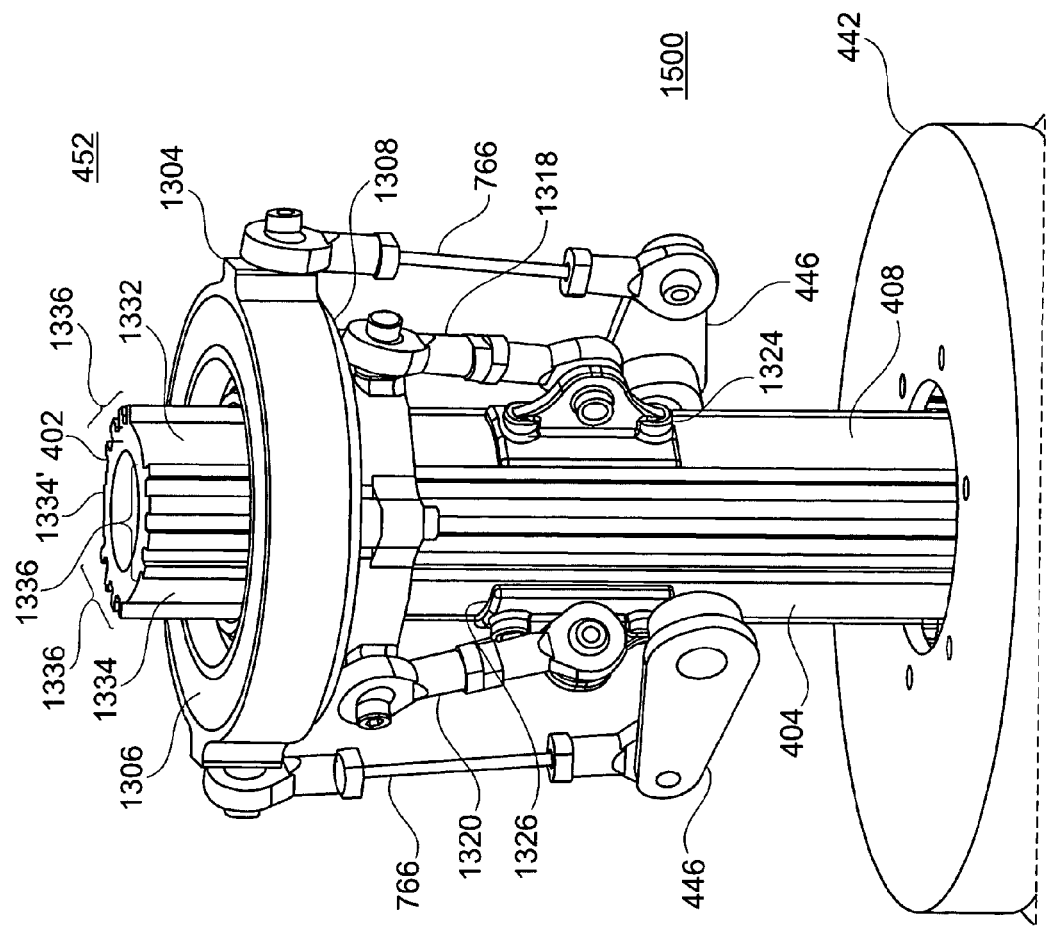
FIG. 15 depicts a further view of the swashplate assembly

FIG. 15 is a view 1500 of the swashplate assembly 452 from above. The profiling of the core 402, defining the link channels 1332, 1334 and 1334' and wiring channels 1336, is clearly visible.

Figure 16:
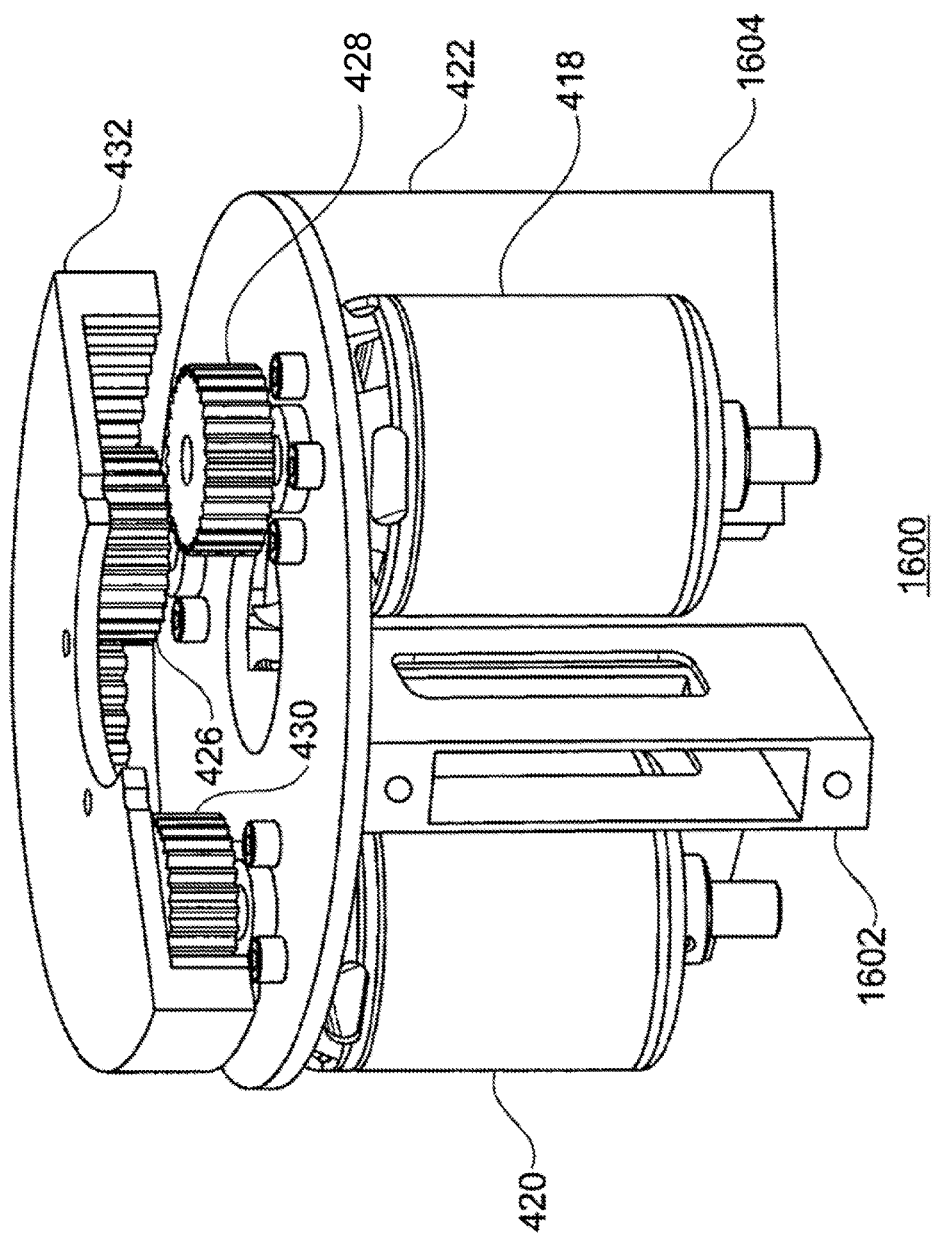
FIG. 16 shows an exploded view of the gear mechanism.

FIG. 16 is a perspective exploded view 1600 of the main drive gear 432, drive pinions 426 to 430 (e.g., drive pinion 426, 428, 430), motor mount 422 and two 418, 420 of the three motors 416 to 420. The motor mount 422 has a number of housing or casing mounts 1602 and 1604 on which the housing for the vehicle is mounted. Embodiments of the present invention preferably have a plurality of casing or housing mounts. For example, embodiment can be realised in which at least one of the pair of thrust bearing clamps 434 and 436 is coupled to the casing or housing. In a coaxial embodiment, at least one of the lower pair of thrust bearing clamps is coupled to the casing or housing. Preferred embodiments use three such housing or casing mounts equally circumferentially disposed.

Figure 17:
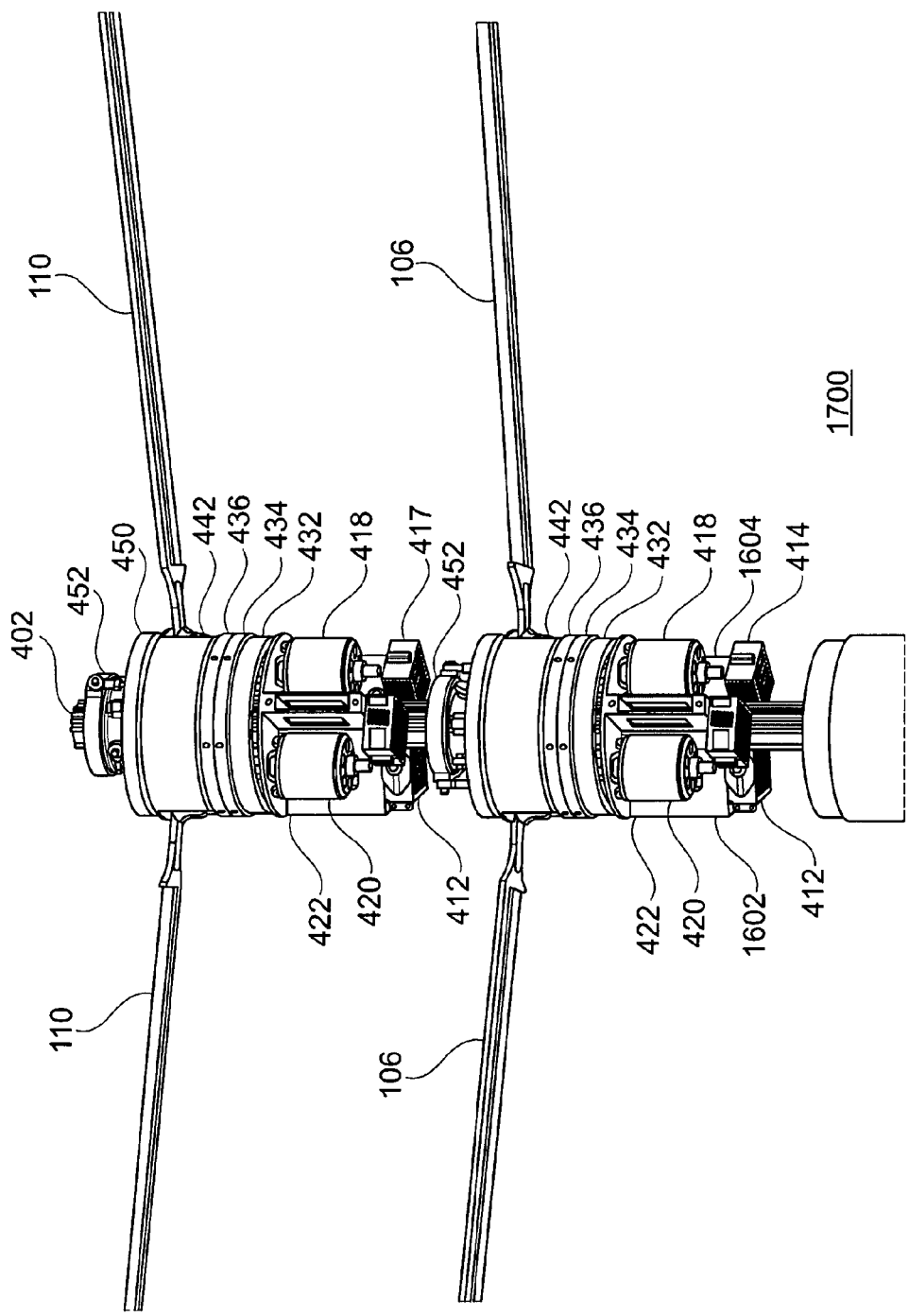
FIG. 17 shows a perspective view of a coaxial embodiment.
Figure 18:
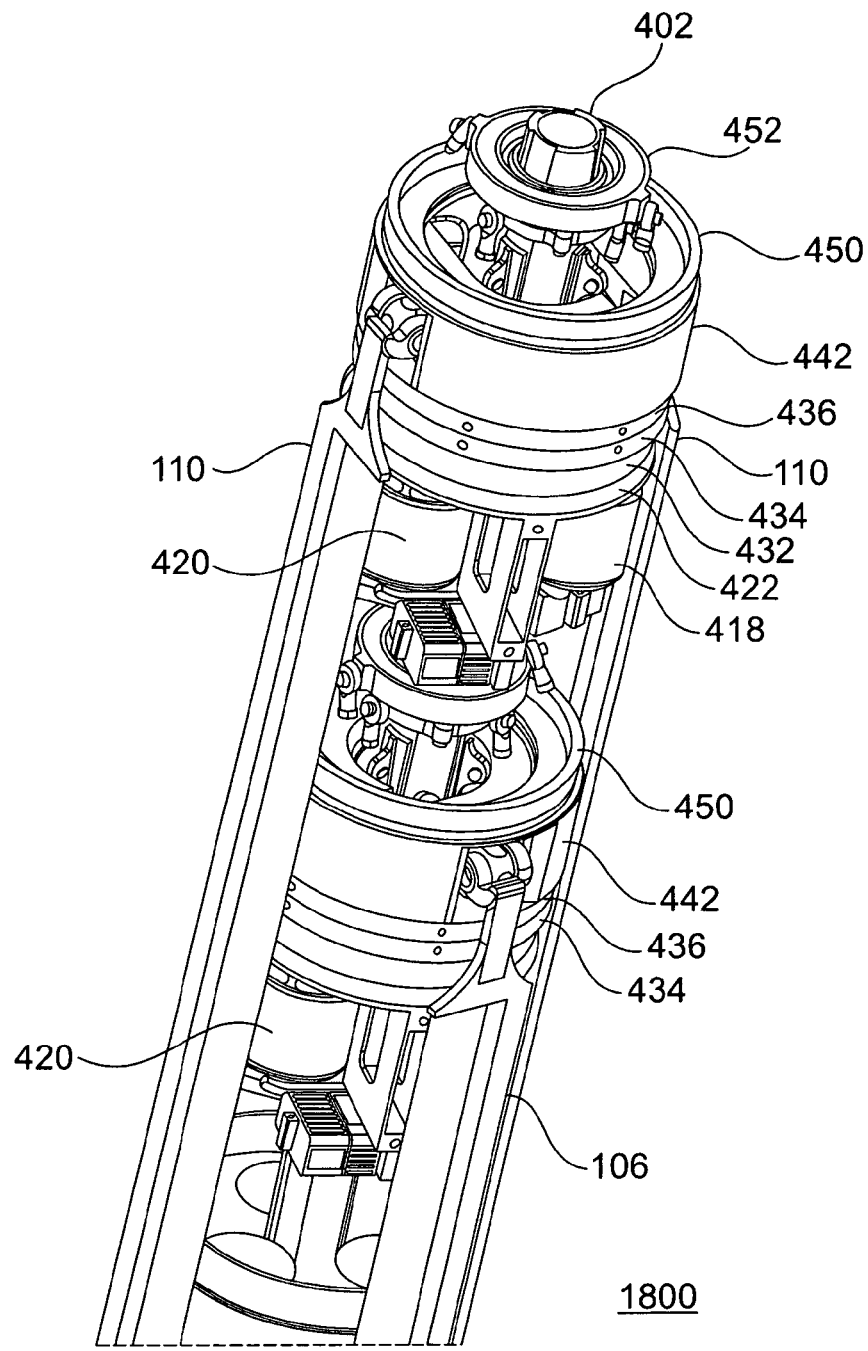
FIG. 18 illustrates a perspective view of a coaxial embodiment.

Embodiments of the present invention are modular and the layout of the various components can be varied. FIG. 17 is a view 1700 of the vehicle in a coaxial configuration with all rotor blades 106 and 110 lying in the same coronal plane. However, preferred embodiments are arranged such that the pairs of rotor blades lie in different, preferably, orthogonal planes. Such an embodiment has a more compact form factor in the stowed position by avoiding overlap of the rotor blades, as can be appreciated from FIG. 18, which is a perspective view 1800 of the vehicle 100 in the stowed position and configured such that the rotor blades 106 and 110 are in orthogonal planes.

Figure 19:
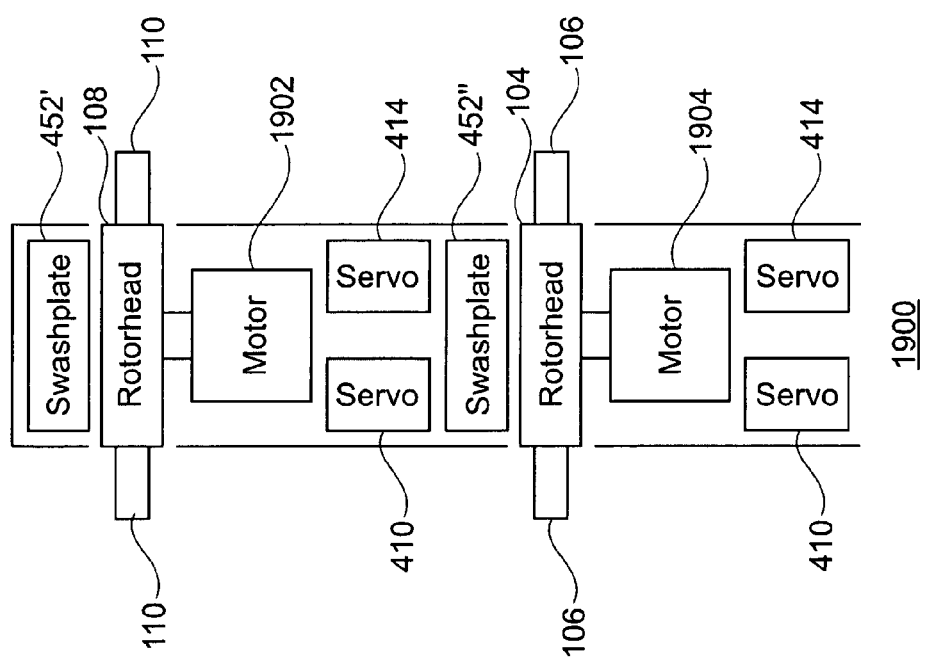
FIG. 19 depicts a first vehicle configuration.

FIG. 19 shows a view 1900 of a first configuration of a vehicle 100 according to an embodiment. It can be appreciated that a first swashplate 452' is disposed above the associated servos 410 to 414 with both a single motor 1902 and rotor system 108 disposed therebetween. Similarly, the embodiment also comprises a second swashplate 452" that is also disposed above the servos 410 to 414 with a single motor 1904 and rotor system 104 disposed therebetween. It will be appreciated that the swashplates 452' and 452" are independently controllable due to having respective servos. Embodiments, however, are not limited to such an arrangement. Embodiments can be realised in which the servos are at least one of cooperable and synchronised.

Figure 20:
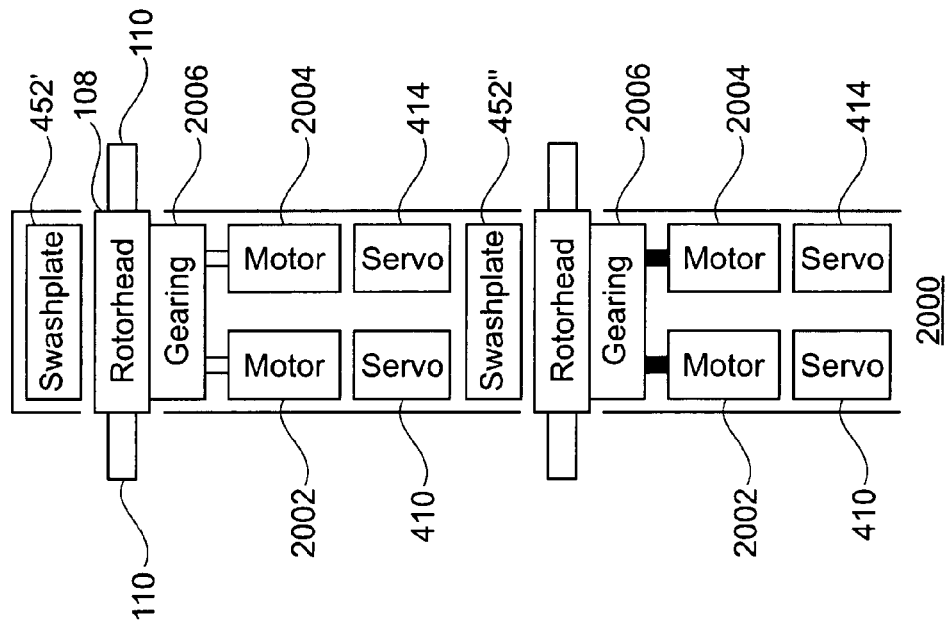
FIG. 20 illustrates a second vehicle configuration.

FIG. 20 shows a view 2000 of a second configuration of a vehicle 100 according to an embodiment. It can be appreciated that a first swashplate 452' is disposed above the associated servos 410 to 414 with multiple motors 2002 and 2004, associated gearing 2006 and a rotor system 108 disposed therebetween. Similarly, the embodiment also comprises a second swashplate 452" that is also disposed above the servos 410 to 414 with multiple motors 2002 and 2004, associated gearing 2006 and a rotor system 108 disposed therebetween. Again, it will be appreciated that the swashplates 452' and 452" are independently controllable due to having respective servos. Embodiments, however, are not limited to such an arrangement. Embodiments can be realised in which the servos are at least one of cooperable and synchronised.

FIG. 21 shows a view 2100 of a third configuration of a vehicle 100 according to an embodiment. It can be appreciated that first 452' and second swashplates 452" are disposed above the associated servos 410 to 414 with multiple motors 2104 to 2106, associated gearing 2102' and a rotor system 104 disposed therebetween in the case of the first swashplate. The second swashplate 452" is disposed above the servos 410 to 414, but below the rotor head 104 and respective motors 2108 to 2110. The respective motors 2108 to 2110 are disposed above the rotor head 104. In contrast to the above embodiments, the swashplates 452' and 452" are coupled and not independently controllable due to having shared servos.

FIG. 22 shows a view 2200 of a fourth configuration of a vehicle 100 according to an embodiment. Again, it can be appreciated that first 452' and second 452" swashplates are shown in a spaced apart relationship with the rotor systems 104 and 108 together with respective motors 2202 and 2204 disposed therebetween. The servos 410 to 414 are caudally disposed relative to the foregoing.

FIG. 23 shows a view 2300 of a fifth configuration of a vehicle according to an embodiment. It can be appreciated that the first 452' and second 452" swashplates are disposed cephalically and caudally relative to the servos 410 and 414. This embodiment has the advantage of minimising the lengths of the pitch control linkages 404 to 408 between the servos 410 to 414 and swashplates 452' and 452". The rotor systems 104 and 108 are disposed longitudinally outward relative to the foregoing and motors 2302 and 2304 are disposed outward relative to the rotors. It can be appreciated that the present embodiment does not use gearing. However, embodiments are not limited thereto. Embodiments can be realised in which at least one or more gears are coupled between the motors and their respective rotor heads, as per FIG. 24 showing view 2400 of a configuration in which gearings 2402 and 2404 are positioned between motors 410 to 414 and respective rotor system 108 and 104.

The motors used in the above embodiments can be any type of motor, but electric motors are preferred notwithstanding their lower energy density as compared to internal combustion motors. Generally, electric motors have the advantage that they are light as compared to an internal combustion engine together with associated fuel. Embodiments of the invention can use brushless motors or brushed motors. As can be appreciated from the various configurations described above, a single motor can be used to drive the pinions or multiple motors can be used to drive the pinions. One skilled in the art will appreciate that embodiments that use a single motor preferably use a motor with a hollow core to accommodate the hollow core or spine 402.

Similarly, some of the configurations use one or more gears and others do not. However, depending on motor choice and output speeds, embodiments can be realised that use zero, one or more gears.

Figure 25:
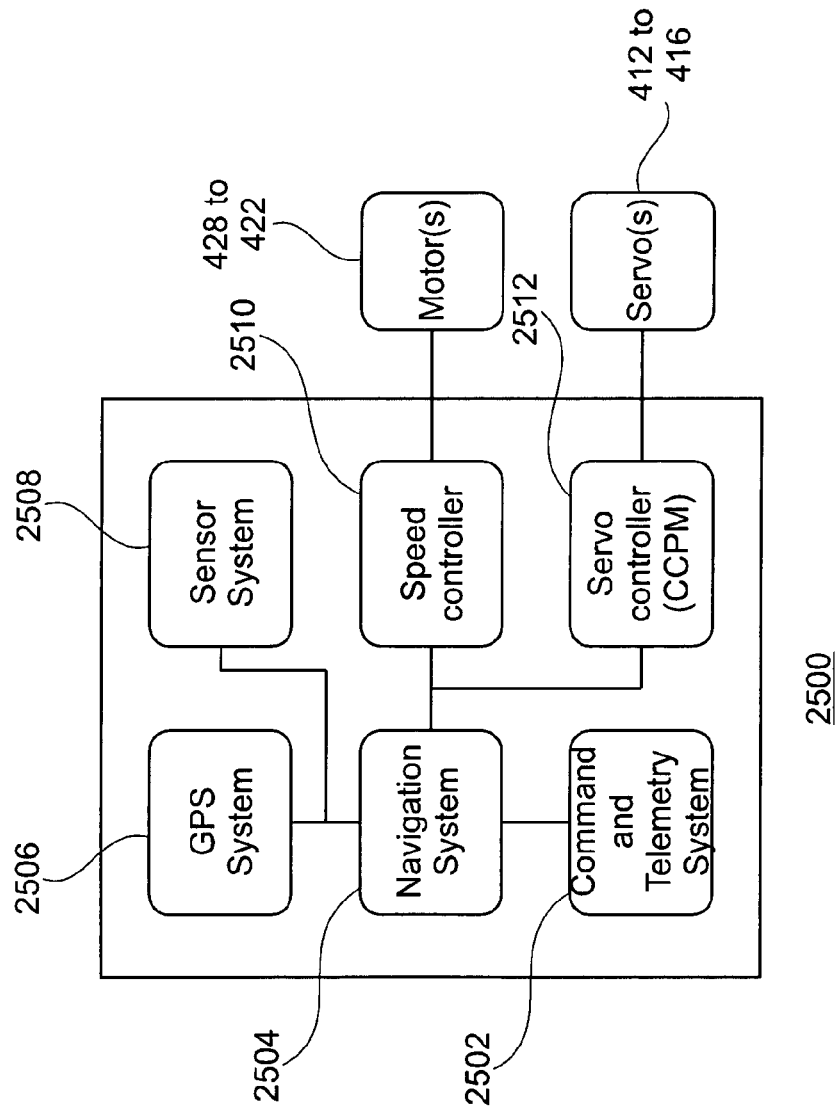
FIG. 25 shows a vehicle control system.

Referring to FIG. 25, there is shown a schematic view of a vehicle control system 2500 for embodiments of the present invention. The vehicle control system 2500 comprises a command and telemetry system 2502 for providing overall control of the systems of the vehicle and for managing telemetry between the vehicle and a ground control system (not shown) as well as managing the launch and transition to powered coaxial flight. The command and telemetry system 2502 receives data from the ground control system relating to desired flight parameters such as waypoints, altitudes, speeds, attitudes, direction of pointing of payloads, tracking of objects, as well as providing feedback to the ground control system of the vehicle's current situation. The vehicle comprises a navigation system 2504 to monitor and control the vehicle's geographical position as well as its altitude, attitude and speed. The navigation system 2504 receives GPS data from a GPS system 2506 and sensor data from a sensor system 2508, such as at least one of pressure measurements, speed measurements, attitude data and any other measurement data taken jointly and severally in any and all combinations.

The navigation system 2504 is arranged to control the motors via one or more speed controllers 2510 and direction of travel, altitude and attitude via a collective/cyclic pitch mixing (CCPM) controller 2512. The speed controllers 2510 are coupled to one or more of the motor or motors. The CCPM controller is connected to the servos to achieve desired collective and cyclic pitch control. Although embodiments of the present invention use a CCPM controller, embodiments are not limited thereto. Embodiments can be realised in which lateral cyclic, longitudinal cyclic and collective pitch are controlled individually by respective servos. Vehicle rolling can be accommodated using torque differentials between the motors.

Embodiments of the vehicle can be adapted to carry payloads. The payloads are housed in respective casings. Preferred embodiments house the payloads within substantially cylindrical casings having the same diameter as the vehicle's casing. The payloads may comprise at least one or more of sensors, cameras of various types, including, without limitation, IR cameras, visible light cameras, munitions, markers, means for illuminating or otherwise marking targets such as, for example, a laser, flares and other heat generating devices to act as missile decoys.

Figure 26:
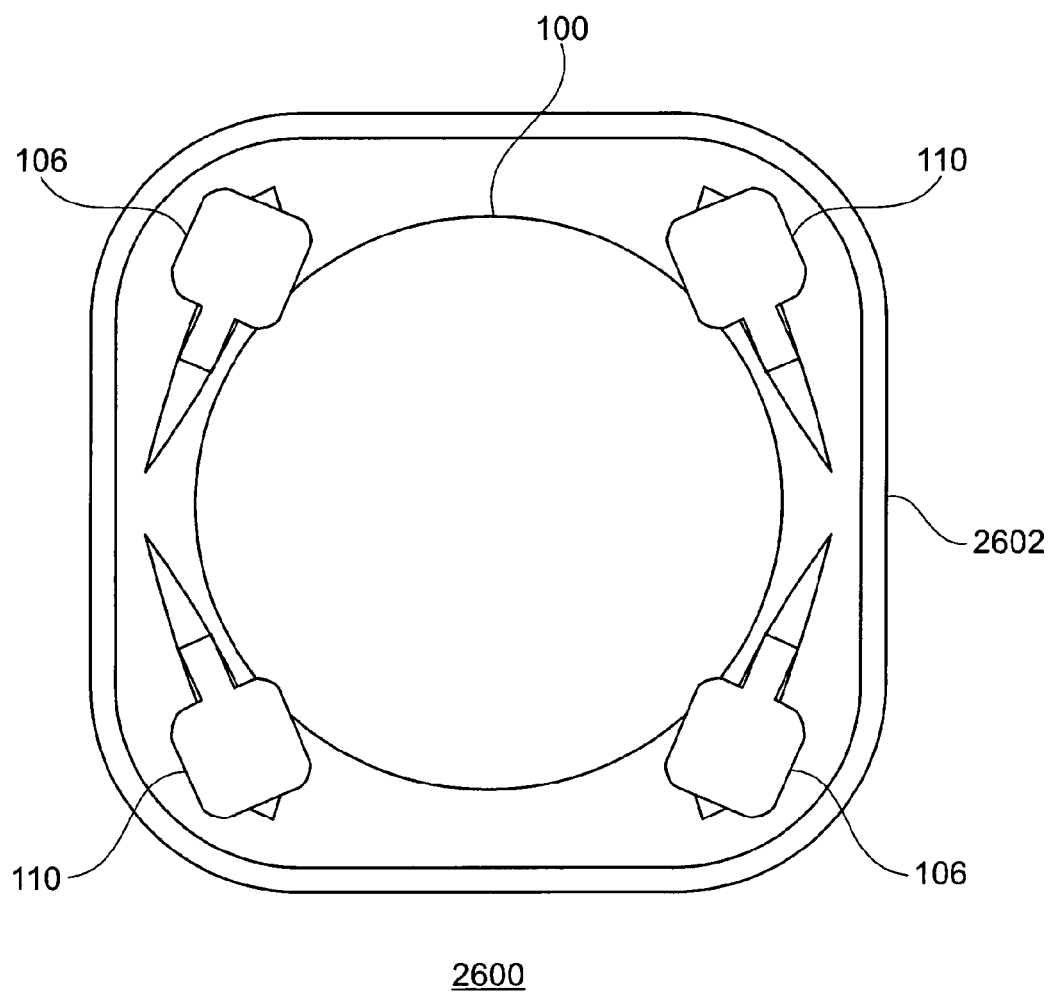
FIG. 26 depicts a vehicle and housing.

Referring to FIG. 26, there is shown a cross-sectional view 2600 of a housing 2602 for the vehicle 100 to allow it to be conveniently transported and/or launched. It can be appreciated that the pitch of the rotor blades 106 and 110 can be adjusted to facilitate compact storage within the housing as opposed to the rotor blades 106 to 110 being tangential to the vehicle body.

Figure 27:
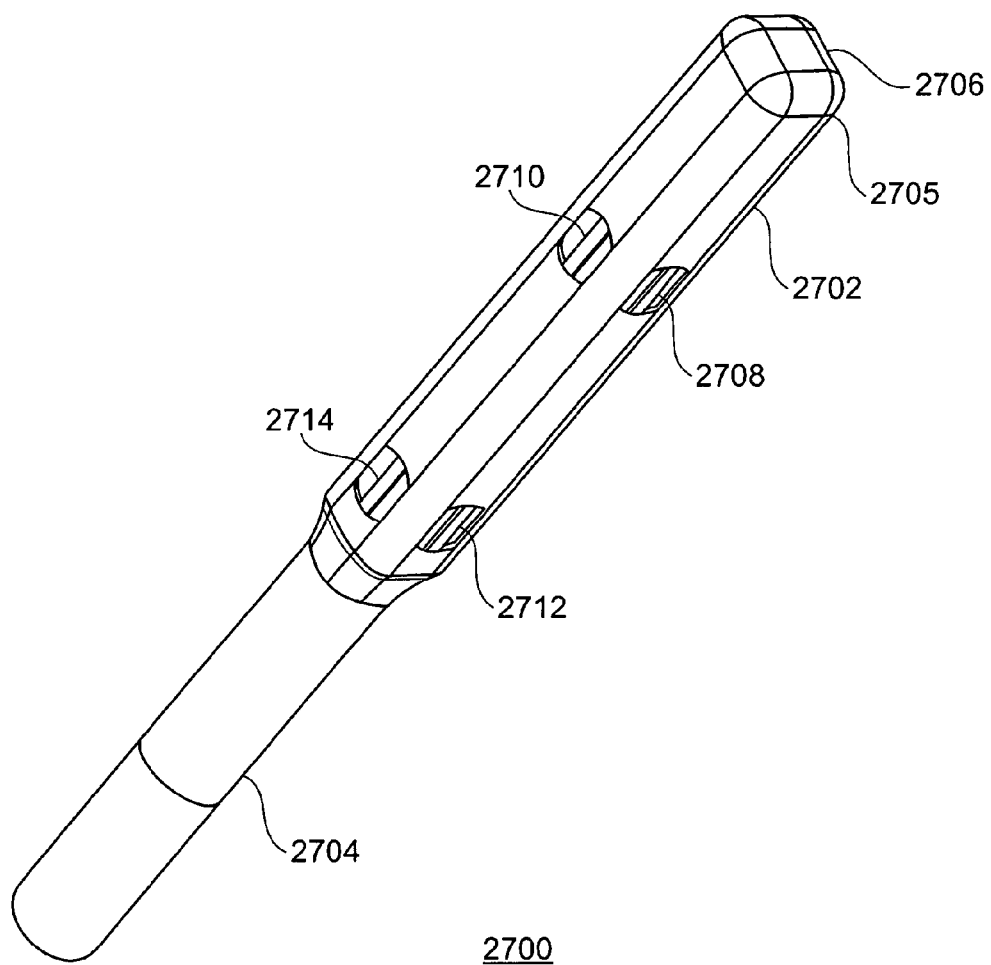
FIG. 27 shows a barrel extender.

FIG. 27 depicts a barrel extender 2700 comprising a housing 2702, such as that described above with respect to FIG. 26, and an extension portion 2704 to be accommodated within or as an extension to a barrel or breach of a large bore gun for either a controlled or uncontrolled ballistic launch or a rocket motor powered launch. Preferably, the top 2705 of the housing 2702 has a cap 2706 that is ejected by the vehicle during launch. Alternatively, the top 2706 of the housing 2702 may have a frangible seal through which the vehicle bursts during launch. The seal is arranged to protect the vehicle against environmental ingress. The sides of the housing bear a number of handles 2708 to 2714 to facilitate handling thereof.

Figure 28:
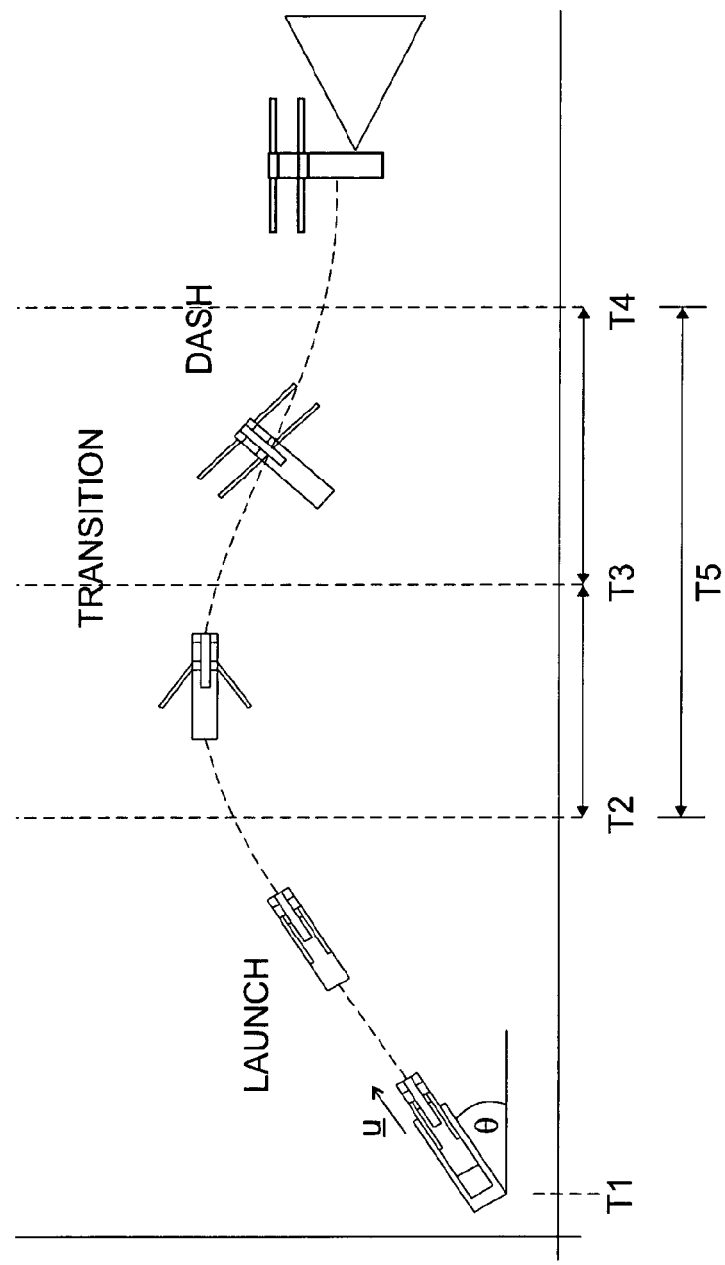
FIG. 28 shows a typical vehicle launch process.

Referring to FIG. 28, there is shown a typical launch process 2800. The vehicle is mounted within or on a suitable launch means such as a barrel or breach. Embodiments that use a rocket motor for launch will provide the command system 2502 with a launch signal. The command system 2502 will fire the rocket motor and the vehicle will be launched at a given initial velocity, u, at an initial angle, $\vartheta$ to the horizontal. Preferably, $\vartheta$ is $\pi/4$.

Assuming launch is at time T1, at time T2, a predetermined period of time after T1, the vehicle enters a transition phase during which the rocket motor, if employed, may be jettisoned and during which the rotor blades are deployed in preparation for powered flight. Preferably, in a coaxial embodiment, upper rotor blade rotation is instigated first and a short time thereafter lower rotor blade rotation is instigated. The timings of instigating rotation of the upper and lower rotor blades help in avoiding rotor collisions. As the speed of the rotors increases, the rotor blades will rise, under the absence of sufficient centripetal force, to their fully deployed positions. Preferred embodiments have both sets of rotor blades at the same end of the vehicle. A still further strategy for avoiding rotor blade collision is to ensure that the vehicle deploys the rotor blades with the body at low aerodynamic angles of attack. It will be appreciated from the foregoing that a torque differential will arise during which rotation of the vehicle's body will occur.

During the transition phase, the cyclic and collective can be varied to achieve desired operational characteristics relating to at least one of speed, attitude and altitude taken jointly and severally in any and all combinations. Preferably, the rotor blades are accelerated as rapidly as possible and therefore full pitch control of the rotors is required across a wide range of flapping angles to control, preferably, minimise, rotor loading and thereby control the torque required to spin the rotor blades to their operating speeds.

It can be appreciated that the vehicle has a second stage of the transition phase, that is, the stage between times T3 and T4. During the second stage, the orientation of the vehicle is changed from a first, preferably lower, to a second, preferably higher, angle of attack. One skilled in the art will appreciate that the dynamics of the vehicle in an inertial and aerodynamic sense are complex and non-linear such that any control strategy should seek to balance transition times, that is, at least one of T3, T4 and T5, taken jointly and severally in any and all combinations, and structural loads.

Once the rotors are at speed supporting the vehicle's load, the vehicle is ready for tasking via a predetermined or pre-stored task or via command and control instructions from the ground control system at time T4 or any time thereafter. The overall duration T5 of the transition phase can be varied according to the demands of a current theatre.

During a rocket or ballistic launch, embodiments of the vehicle can use integrated folding fins for improved stability. Embodiments can be realised in which the fins are also controllable. Control over fin attitude might assist in influencing vehicle attitude during at least one phase of the launch process.

Although the above embodiments have been described with reference to cephalically disposed rotors, embodiments are not limited thereto. Embodiments can be realised in which rotors are substantially centrally disposed or in which the rotors are both cephalically and caudally disposed.

Figure 29:
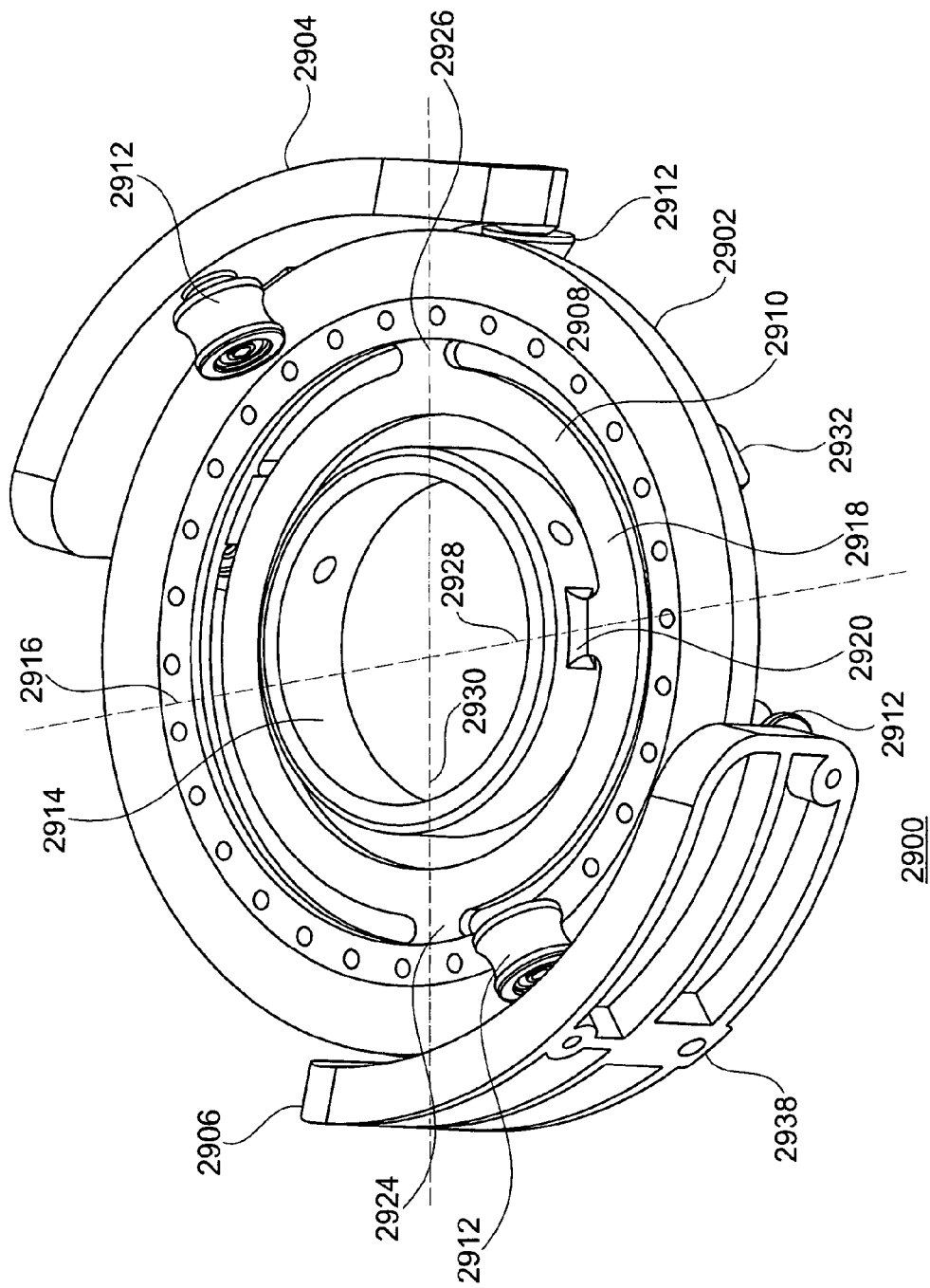
FIGS. 29 to 32 show an alternative embodiment of a swashplate.

FIG. 29 shows a perspective plan view of an alternative embodiment of a swashplate assembly 2900. The assembly comprises a swashplate 2902 and circumferentially disposed trucks 2904 and 2906. The swashplate 2902 comprises an annular track 2908 having a plurality of radially inwardly disposed locating holes. The locating holes are arranged to receive corresponding stubs of a lower, resiliently deformable, swashplate 2910. The annular track 2908 bears upper and lower circumferentially disposed tracks that carry a plurality of wheels 2912 of the trucks 2904 and 2906. The wheels 2912 allow relative rotational movement between the swashplate 2902 and trucks 2904 and 2906. Each truck 2904 and 2906 has three such wheels 2912. Preferably, the wheels 2912 are disposed in a triangular arrangement relative to one another. Embodiments are not limited to such a wheel arrangement. Alternative embodiments might use some other number of wheels, such as four wheels, or some other means of supporting the swashplate 2902 such as upper and lower annular ball or roller bearings.

The deformable swashplate 2910 comprises a number of concentric rings with respective linkages therebetween. A preferred embodiment of the deformable swashplate 2910 comprises an inner ring 2914, an outer ring 2916 and a middle ring 2918 disposed between. The linkages 2920 to 2926 are arranged to flexibly couple the rings. Preferably, four such linkages 2920 to 2926 are provided. Embodiments that use four such linkages are arranged such that pairs of the linkages are substantially orthogonally disposed relative to one another. A first pair of such linkages 2920 and 2922 has an associated, first, axis of rotation 2928. A second pair of such linkages 2924 and 2926 has an associated, second, axis of rotation 2930. The first axis of rotation 2928 supports relative movement about that axis 2928 of the inner 2914 and middle 2918 rings. The second axis of rotation 2930 supports relative movement about that axis 2930 of the middle ring 2918 and outer ring 2916.

Figure 30:
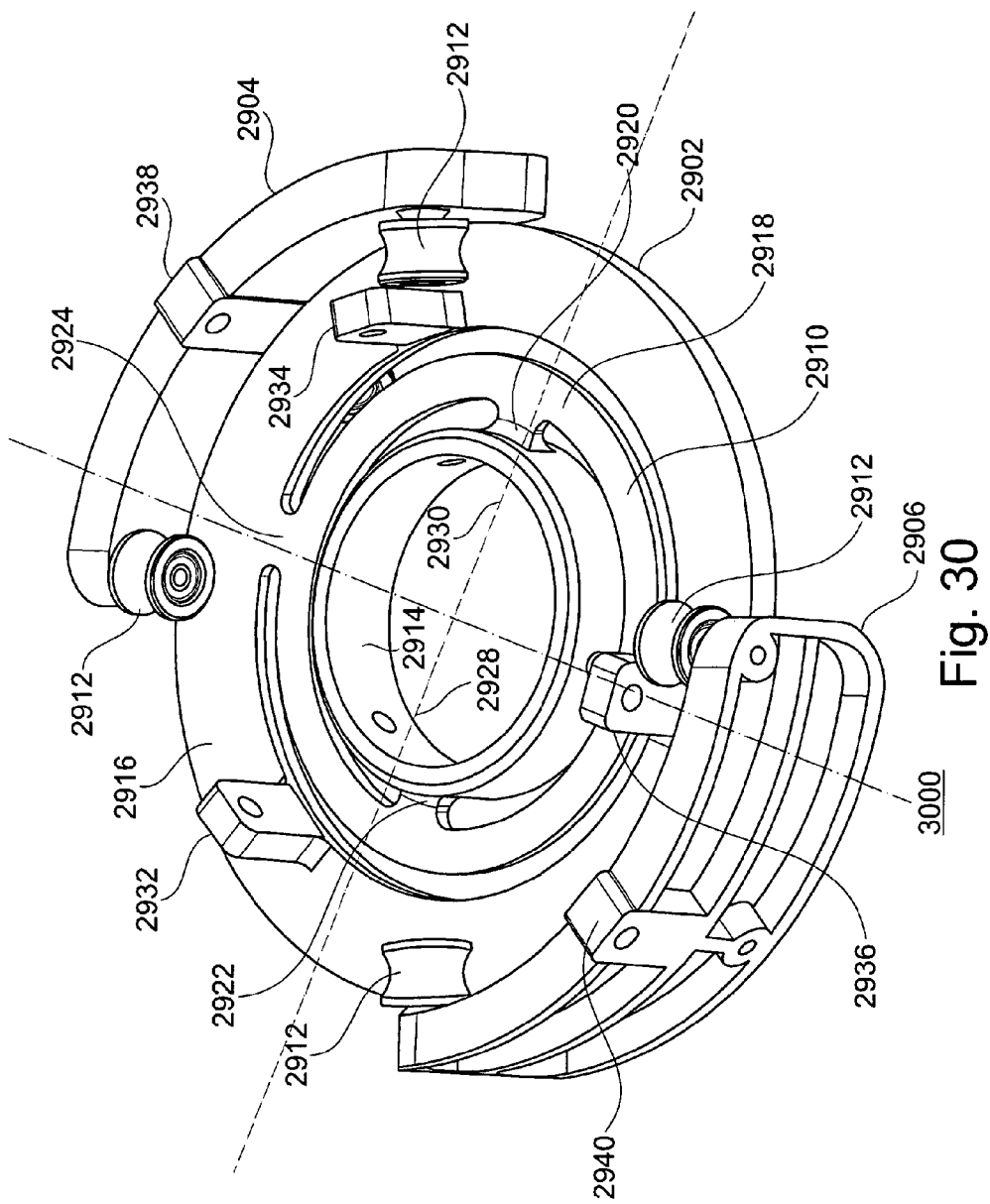

The deformable swashplate 2910 carries a plurality of anchors 2932 to 2936 (e.g., anchors 2932, 2934, 2936) for receiving pitch control inputs as can be appreciated from FIG. 30 showing a view of a swashplate assembly 3000. Preferred embodiments are arranged to couple anchors 2932 to 2936 to the above described non-rotating swashplate linkages 1318 to 1322.

The trucks 2904 and 2906 also carry respective anchors 2938 to 2940 for connection to pitch control rods 766 coupled to pitch control arms 446 to thereby vary at least one of the collective and cyclic of the rotor blades 106/110.

Figure 31:
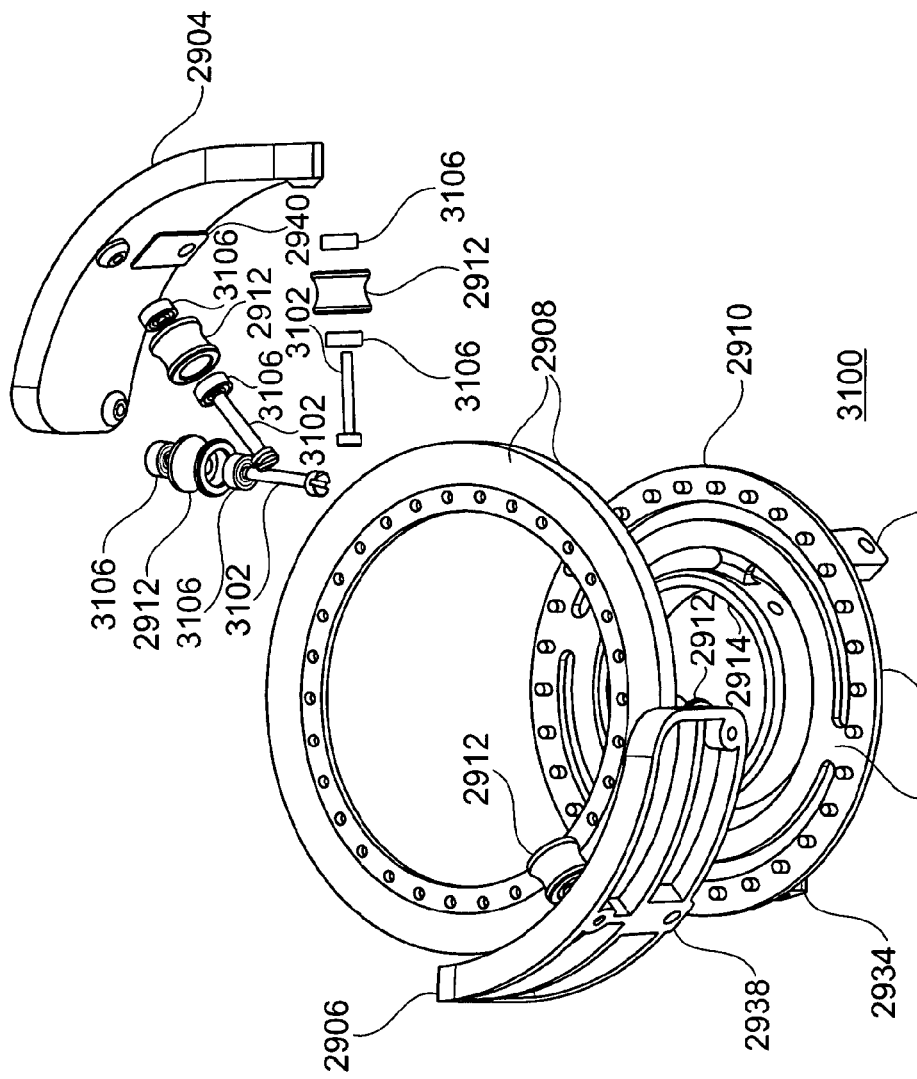
Figure 32:
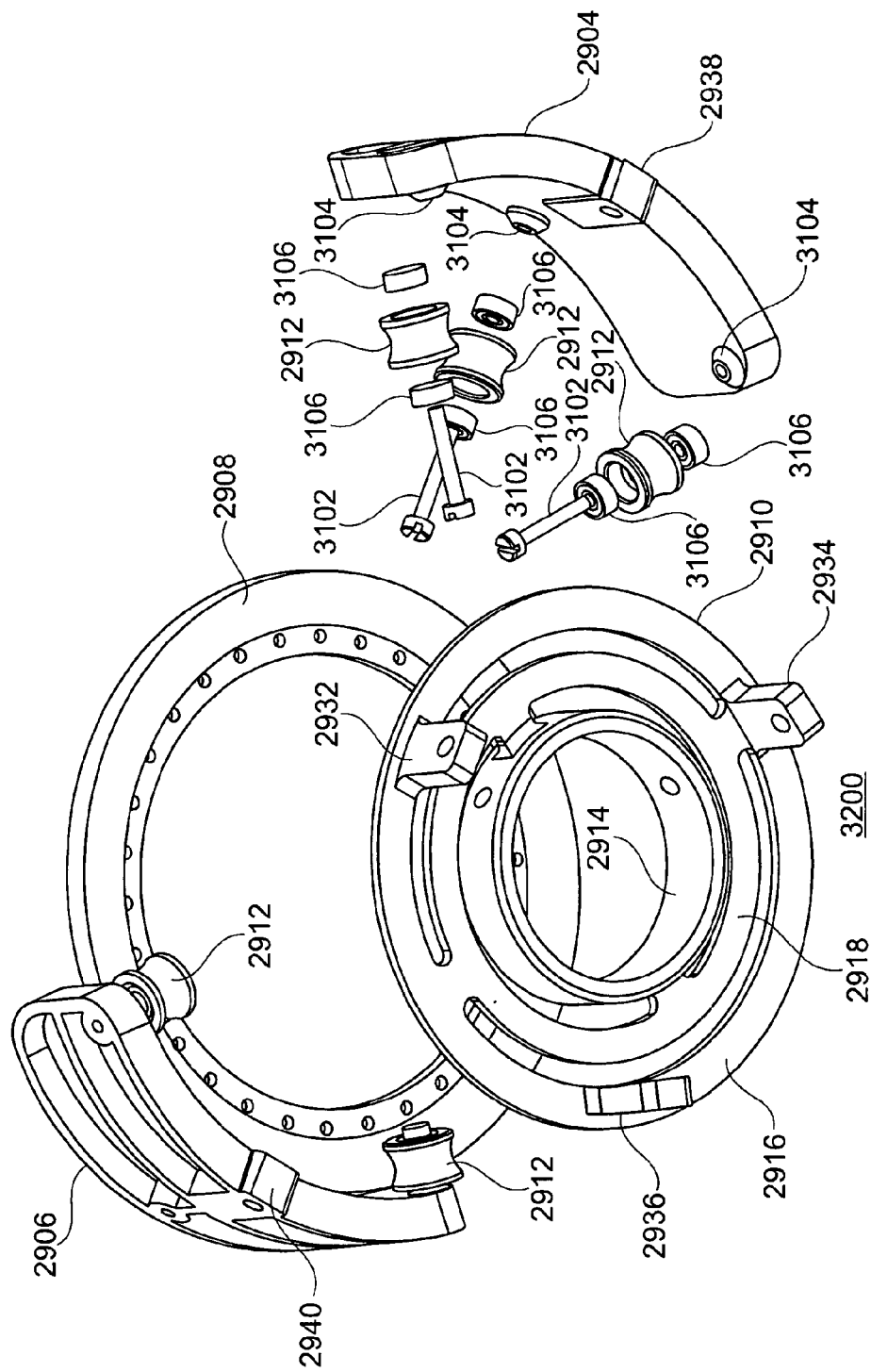

FIGS. 31 and 32 show topside and underside exploded views 3100 and 3200 of the swashplate 2902. It can be appreciated that the wheels 2912 are supported via respective axles 3102, which are arranged to be coupled to respective coupling points 3104 in the trucks 2904 and 2906, and respective pairs of bearings 3106.

The central ring 2914 is coupled in a fixed relationship to the hollow core or spine either directly or indirectly such as, for example, via a ball joint 1316 as described above. One skilled in the art will appreciate that the trucks 2904 and 2906 support rotation of the rotor blades 106/110 while at least one of middle ring 2918 and the linkages 2920 to 2926 are deformable to serve as collective and cyclic controls, while always urging the swashplate to its equilibrium position.

Although at least one of the plurality of anchors 2932 to 2936 and anchors 2938 to 2940 have been schematically illustrated as using a hole (and respective pin, which is not shown) as the means of coupling to their respective linkages and rods, preferred embodiments use the above described ball and socket joints.

Figure 33:
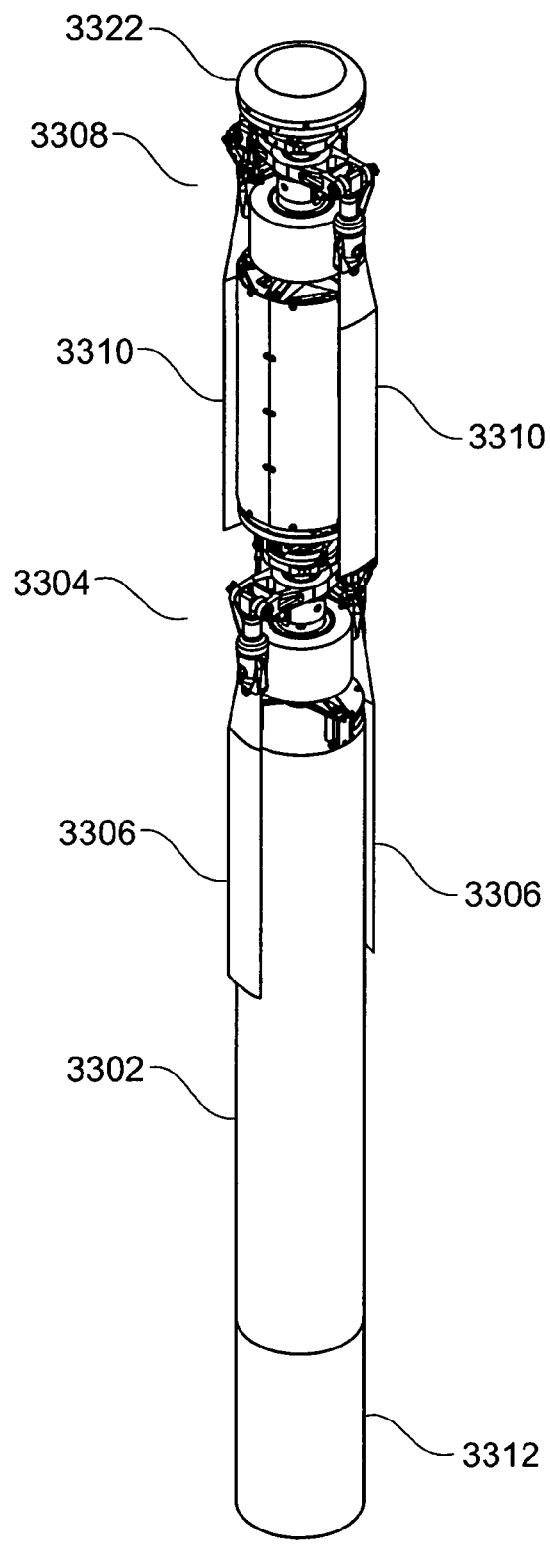
FIG. 33 illustrates a further embodiment of a vehicle.

There now follows a description of a currently preferred embodiment. Referring to FIG. 33, there is shown a first perspective view of a rotary wing vehicle 3300 comprising an elongate body 3302, a first rotor system 3304 bearing respective rotors 3306 and a second rotor system 3308 bearing respective rotors 3310. The rotor systems are co-axial and arranged such that the rotors are counter-rotating, that is, the first rotor system is arranged to rotate its respective rotors in the opposite direction to the rotors of the second rotor system and the rotor blades will be oriented accordingly. The vehicle 3300 also has a detachable launch or propulsion section 3312. The propulsion section 3312 can take the form of a ballistic system or a rocket motor system, such as, for example, a solid fuel rocket motor, or an explosive charge for launch from a barrel. It will be noted that the fins 114 to 120 of the above embodiment are absent. The vehicle has a nose cone 3322. Preferred embodiments of the elongate body are substantially cylindrical with a substantially uniform circular cross section. The rotor blades 3306 and 3310 are shown in the stowed or launch position, in which they are substantially parallel with the longitudinal axis of the vehicle 3300. It will be noted that the rotors 3306 to 3310 are shorter as compared to the above embodiment. The rotors do not overlap, as per the above embodiment. The non-overlapping rotors 3306 to 3310 have the advantage that any risk of rotor collision is removed, especially during the initial phase of rotor spin-up. Preferred embodiments are arranged such that the rotor systems are separated by a distance that is greater than the rotor length.

Figure 34:
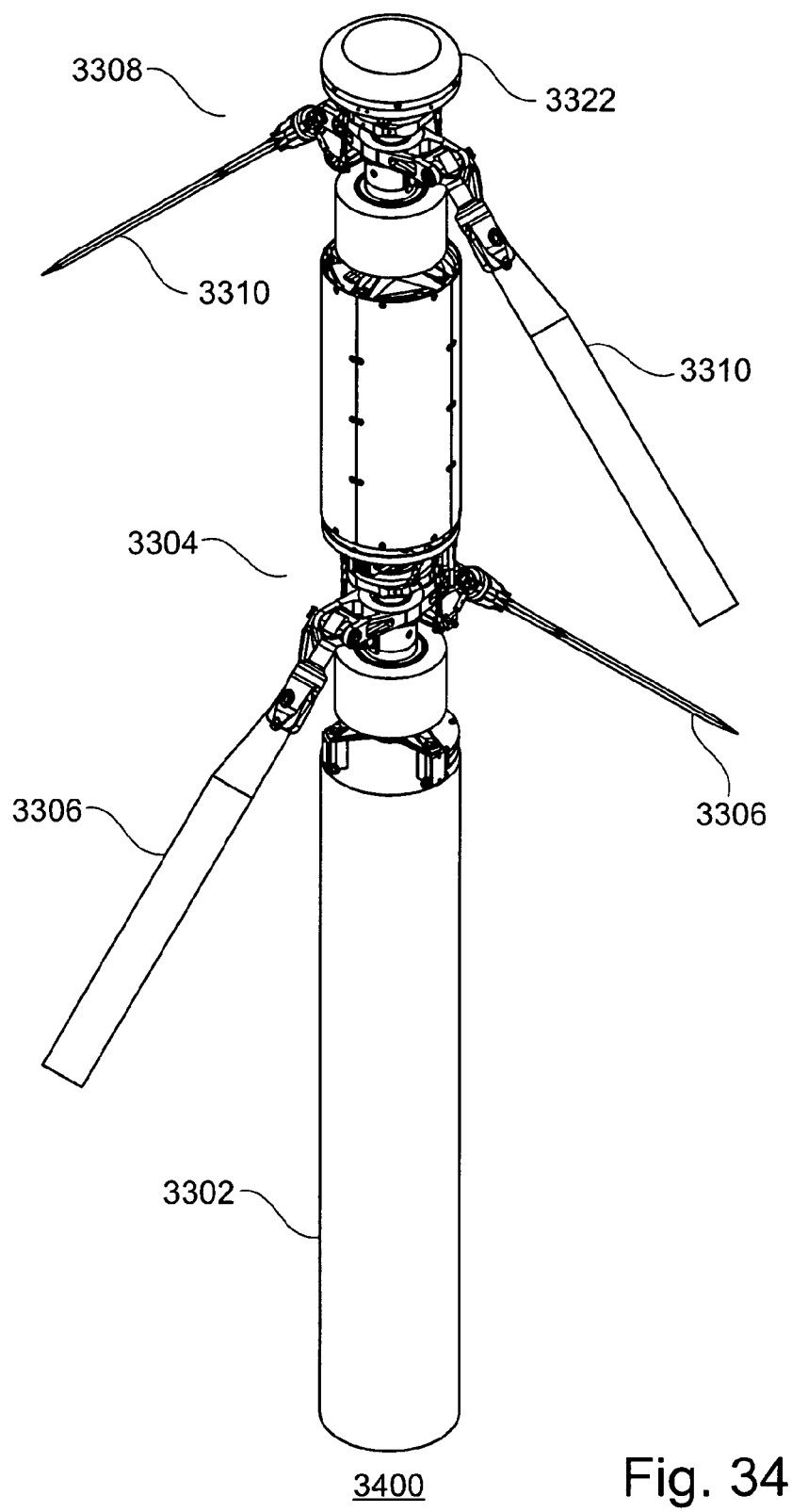
FIG. 34 depicts a perspective view of a vehicle.

FIG. 34 is a second perspective view 3400 of the vehicle 3300 with the rotors 3306 and 3310 in a partially stowed or partially deployed position. For the purposes of illustration, it can be appreciated that the rotors of a given pair are diagonally opposite one another and that the pairs of rotors are orthogonal to one another. However, other arrangements, especially during stowage, can be realised, such as, for example, the rotors of each being aligned or parallel. Furthermore, it can be appreciated that the embodiments herein use a pair of rotors per rotor system. However, embodiments can be realised in which a set of rotors having two or more, that is, a plurality, of rotors can be used per rotor system.

Figure 35:
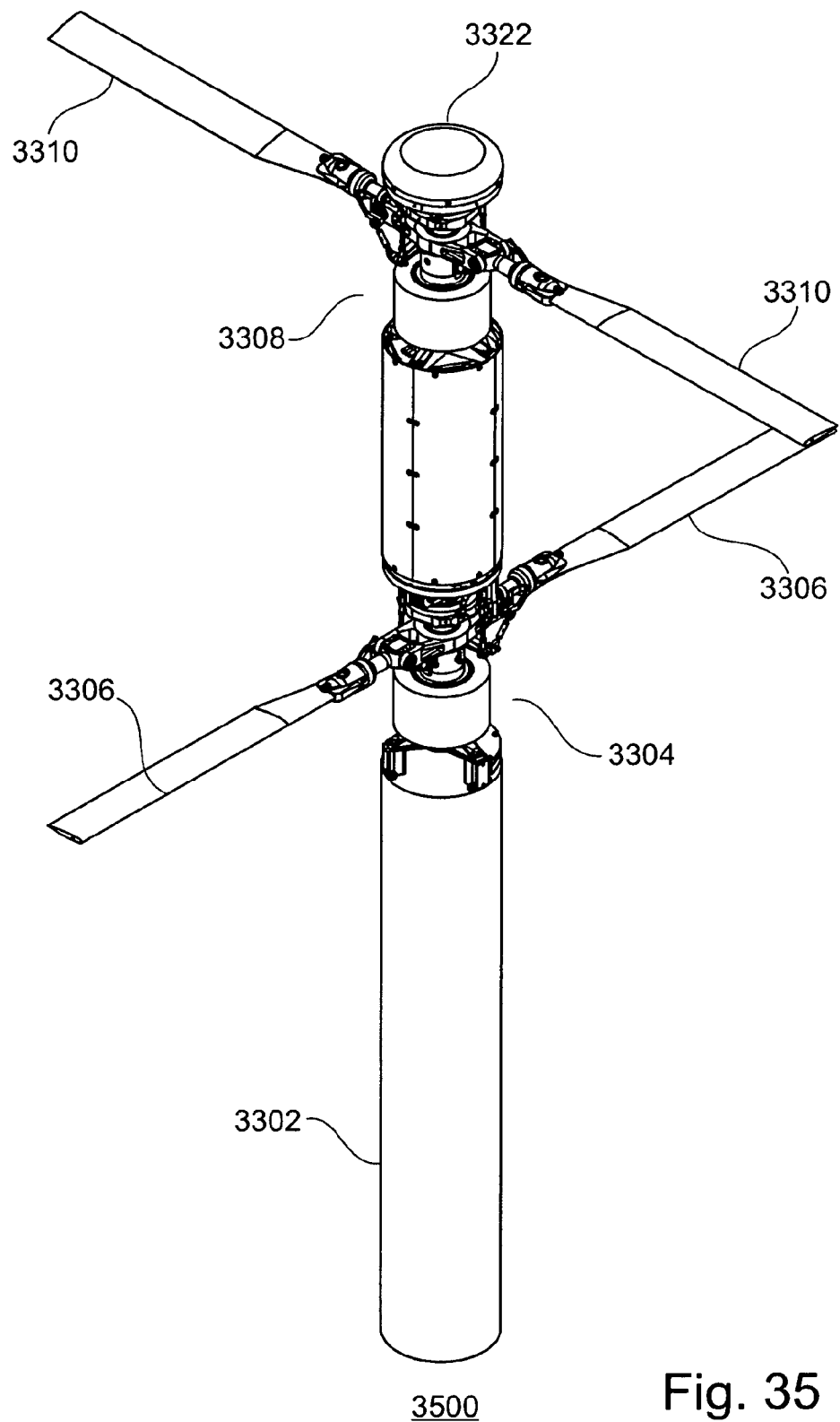
FIG. 35 shows a further perspective view of a vehicle.

FIG. 35 is a third perspective view 3500 of the vehicle 3300 with the rotors 3306 and 3310 in the fully deployed position. It can be appreciated that the launch or propulsion section 3312 has been dropped. In general, once the rotors have been fully deployed and have reached their intended speed at least to sustain flight using the rotors the propulsion system 3312 is no longer required.

The elongate body comprises an external case. Each of the rotor systems 3304 and 3308 has an optional external housing, although the external case and housings are not shown in this embodiment. Does it matter if we do not have housings on the final vehicle?

Figure 36:
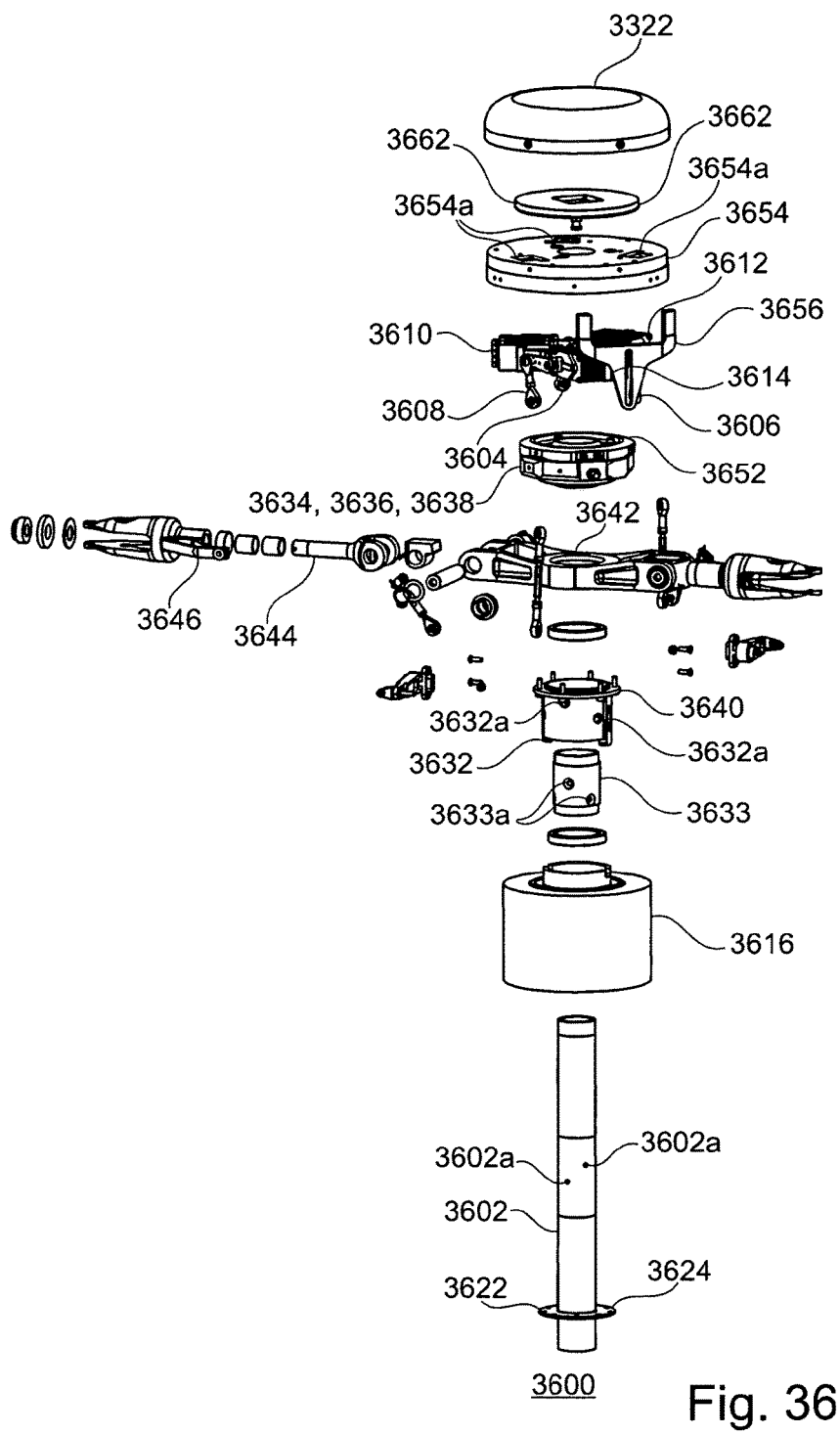
FIG. 36 shows an exploded view of a vehicle.
Figure 37:
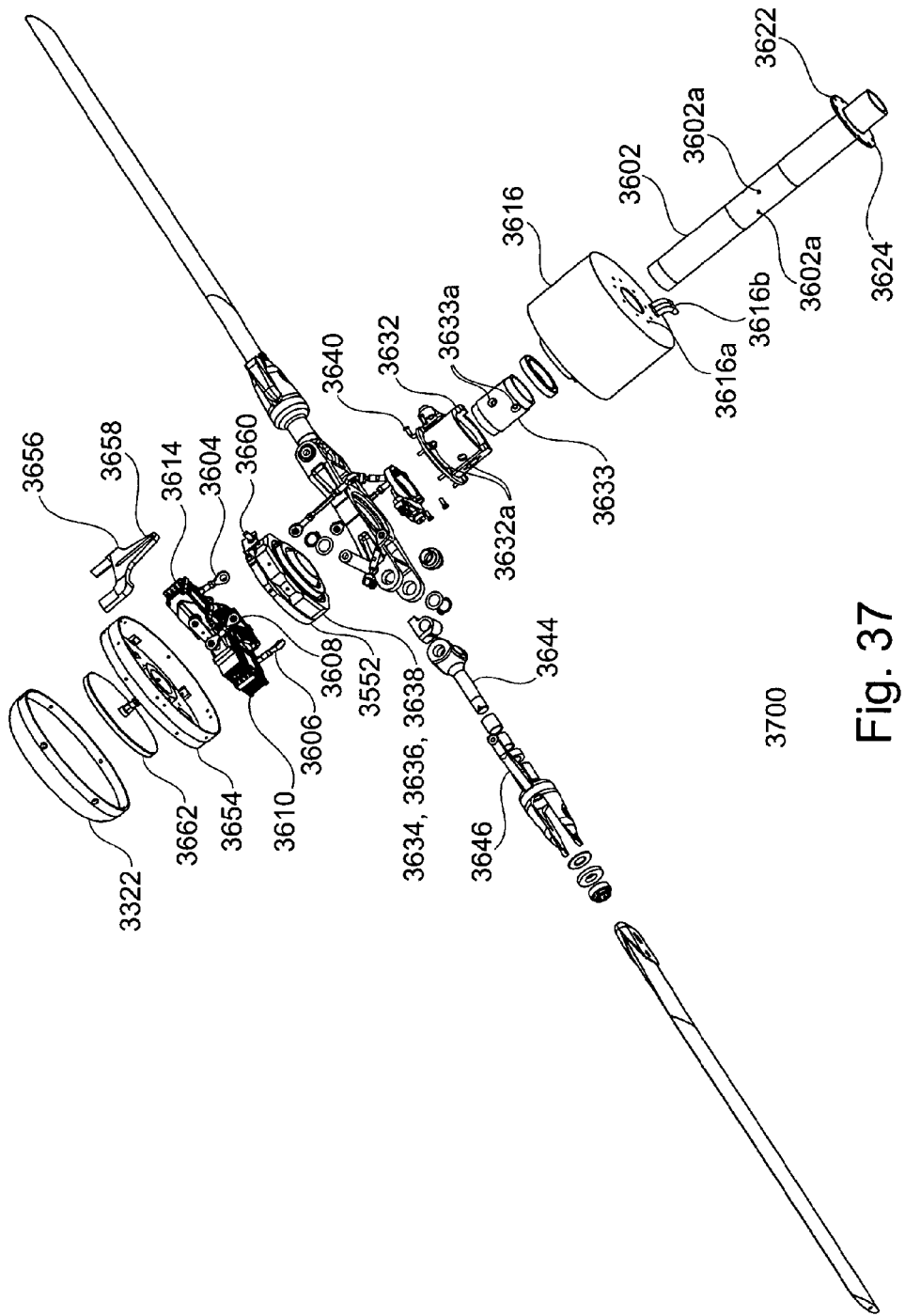
FIG. 37 illustrates a second exploded view of a vehicle.

FIGS. 36 and 37 show respective perspective exploded views 3600 and 3700 of the rotary vehicle 3300 without the external case, external housings and with only a single rotor head. It can be appreciated that the rotor systems 3304 and 3308 comprise a central core or spine 3602, which is optionally hollow, around which the other components are built or mounted, a number of servo-swashplate linkages 3604 to 3608, a number of servos 3610 to 3614, a single of motor 3616 and a motor mount 3622. The motor 3616 is coupled to the motor mount 3622 via respective screws (not shown) via respective holes, referred to collectively as 3624, in the motor mount 3622. The upper surface 3640 of a rotor hub drive 3632 is arranged to be coupled to a rotor hub 3642. The vehicle comprises a non-rotating bearing sleeve 3633. The non-rotating bearing sleeve 3633 has one or more holes 3633a via which the non-rotating bearing sleeve 3633 can be connected to the core 3602 via respective holes 3602a. It can be appreciated that the rotor hub drive 3632 also has corresponding access holes 3632a to allow through access to the non-rotating bearing sleeve 3633 and core 3602 during assembly. The rotor hub 3642 supports a number of rotor blades 3306/3310 via respective pitch axles 3644. Each rotor blade 3306/3310 also has an associated pitch control arm 3646. The vehicle 3300 further comprises a swashplate 3652. The servo-swashplate linkage 3604 to 3608 are coupled between the servos 3610 to 3614 (third servo and linkage obscured) and the swashplate 3652. A pair of bearing clamps 3634 and 3636 are arranged to retain a ball race 3638, as described in greater detail with reference to FIG. 45. Difficult to see using 3600 series numbering.

Although the above embodiments described with reference to FIGS. 1 to 32, use a scissor link and counterweight, connected to the hub via a hinged joint and the swash via a rotating socket, to carry the main shaft rotation of the motor up to the lower swashplate and allows axial movement whilst transmitting cyclic and collective inputs, preferred embodiments use a different arrangement. In preferred embodiments, a shaft retained within a body by a cross pin, which runs parallel with the longitudinal axis of the vehicle, that is restrained in all axes but for axially within the hub and planer inline with the cross pin, with a rotating socket connected to the lower swashplate which in turn carries the main shaft rotation up to the lower swashplate which allows axial movement whilst transmitting cyclic and collective inputs.

Also shown is an actuator plate 3654 to which is mounted an anti-rotation guide 3656. The anti-rotation guide 3656 cooperates with the swashplate 3652 to prevent rotation of the upper element 4402swashplate 3652 described in detail with reference to FIG. 44. It can be appreciated that the cooperation is realised in the form of a slot 3658 in the anti-rotation guide 3656 and a corresponding pin 3660 of the swashplate 3652, which are described hereafter. The servos 3610 and 3614 are mounted to the underside of the actuator plate 3654. The actuator plate 3654 bears a plurality of apertures 3654a to accommodate movement of the servo-swashplate linkages 3604 to 3608 and allow wire routing.

The actuator plate 3654 also bears a GPS assembly 3662 for providing GPS data to the control system 2500. The GPS assembly is protected via the nose cone 3322. The nose cone 3322 is releasably coupled to the actuator plate 3654 via respective fasteners (not shown), which are preferably screws, but can be some other arrangement like a snap-fit connector.

Alternatively, as per the above embodiment described with reference to FIGS. 1 to 32, one skilled in the art will appreciate that having the control links 404 to 408 internally mounted, that is, in a sliding relationship with the core 402, results in a smaller form factor as compared to having the control links radially outwardly disposed as per conventional collective/cyclic control mechanisms.

The underside of the motor 3616 has a plurality of holes 3616a for registry with corresponding holes 3624 of the motor mount 3622 for mounting the motor thereto. Also visible are power and control connections 3616b for powering and controlling the motor 3616.

FIG. 37a shows in greater detail a view 37a00 of a servo-swashplate linkage 3606 that couples the servo 3610 to the swashplate 3652. The servo-swashplate linkage 3606 comprises upper 37a02 and lower 37a04 arms coupled together via a ball and socket joint 37a06. The upper arm 37a02 is coupled to the servo and arranged for rotation about an axis AA' thereby moving a ball and socket joint 37a08 of caudally disposed end 37a10 of the lower arm 37a04 to control the collective and cyclic via the swashplate assembly.

Figure 37B:
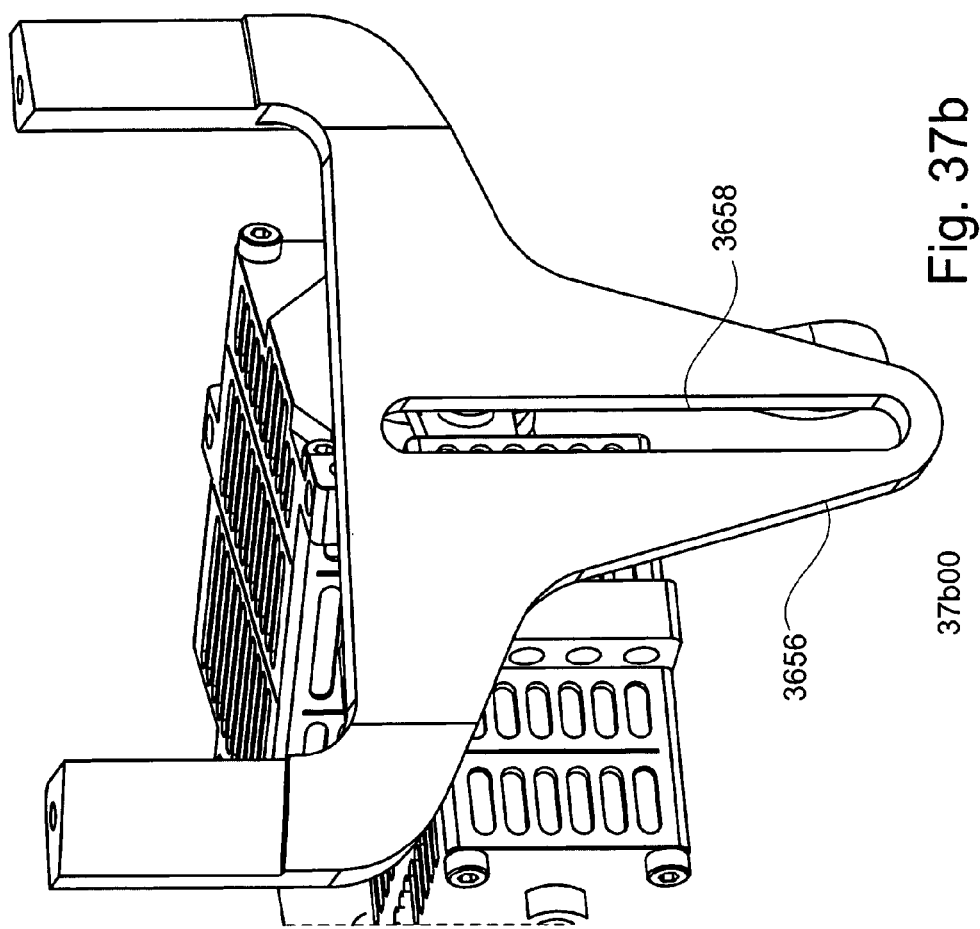
FIG. 37*b* shows an anti-rotation guide.

Referring to FIG. 37b, there is shown an enlarged view 37b00 of the anti-rotation guide 3656 together with its slot 3658 for receiving a corresponding pin 3660 of the swashplate 3652. The anti-rotation guide 3656 is secured to the actuator plate 3654.

Figure 38:
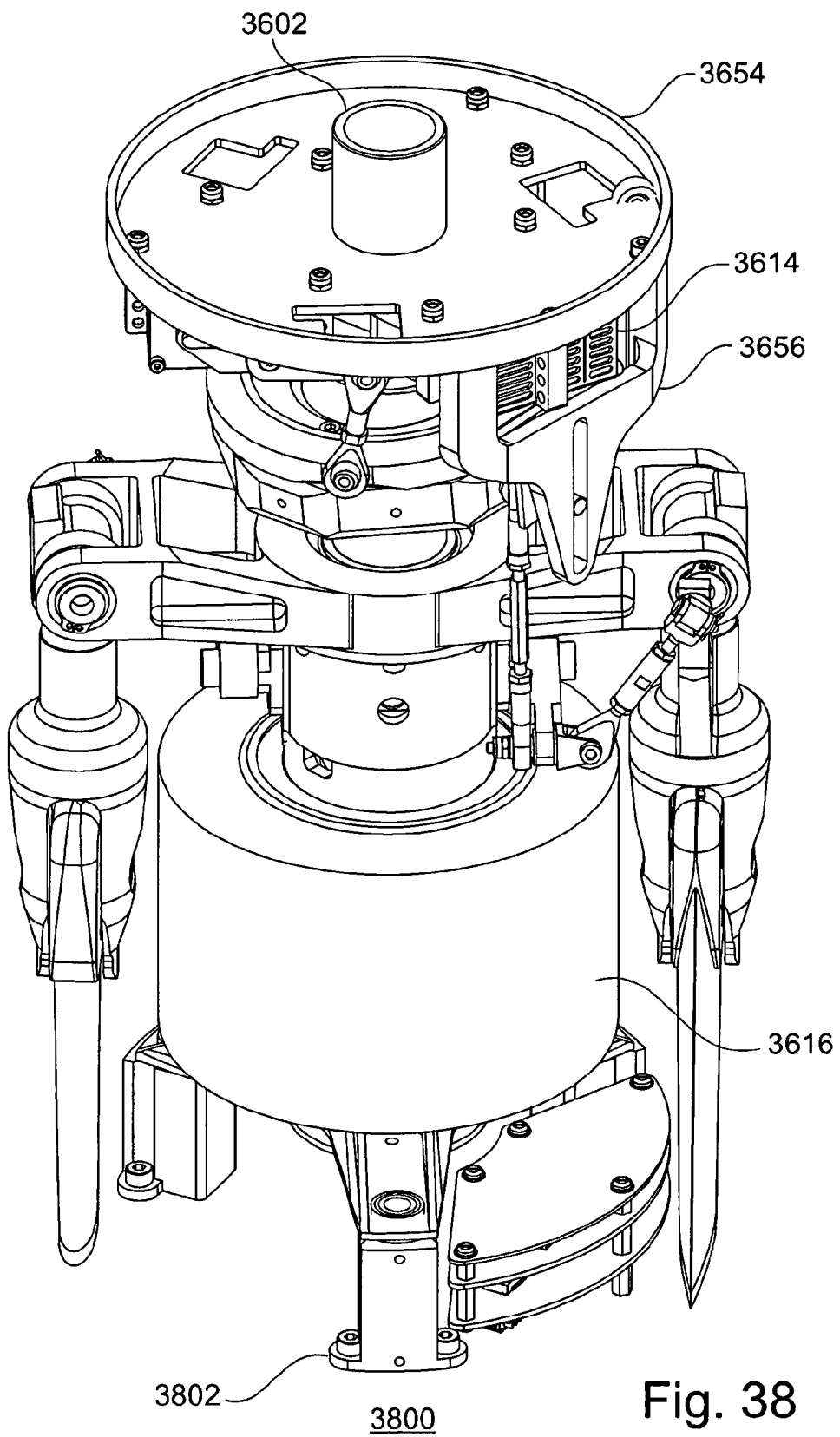
FIG. 38 depicts an assembled view of a pitch mechanism.

Referring to FIG. 38, there is shown an assembled view 3800 of a rotor system of the vehicle 3300. It can be appreciated that the assembly is relatively compact. A mount 3802 is illustrated that couples the core 3602 to the remainder of the air-frame (not shown). Also visible is the flight control system and corresponding mounts, which are described hereinafter with reference to FIG. 48.

Figure 39:
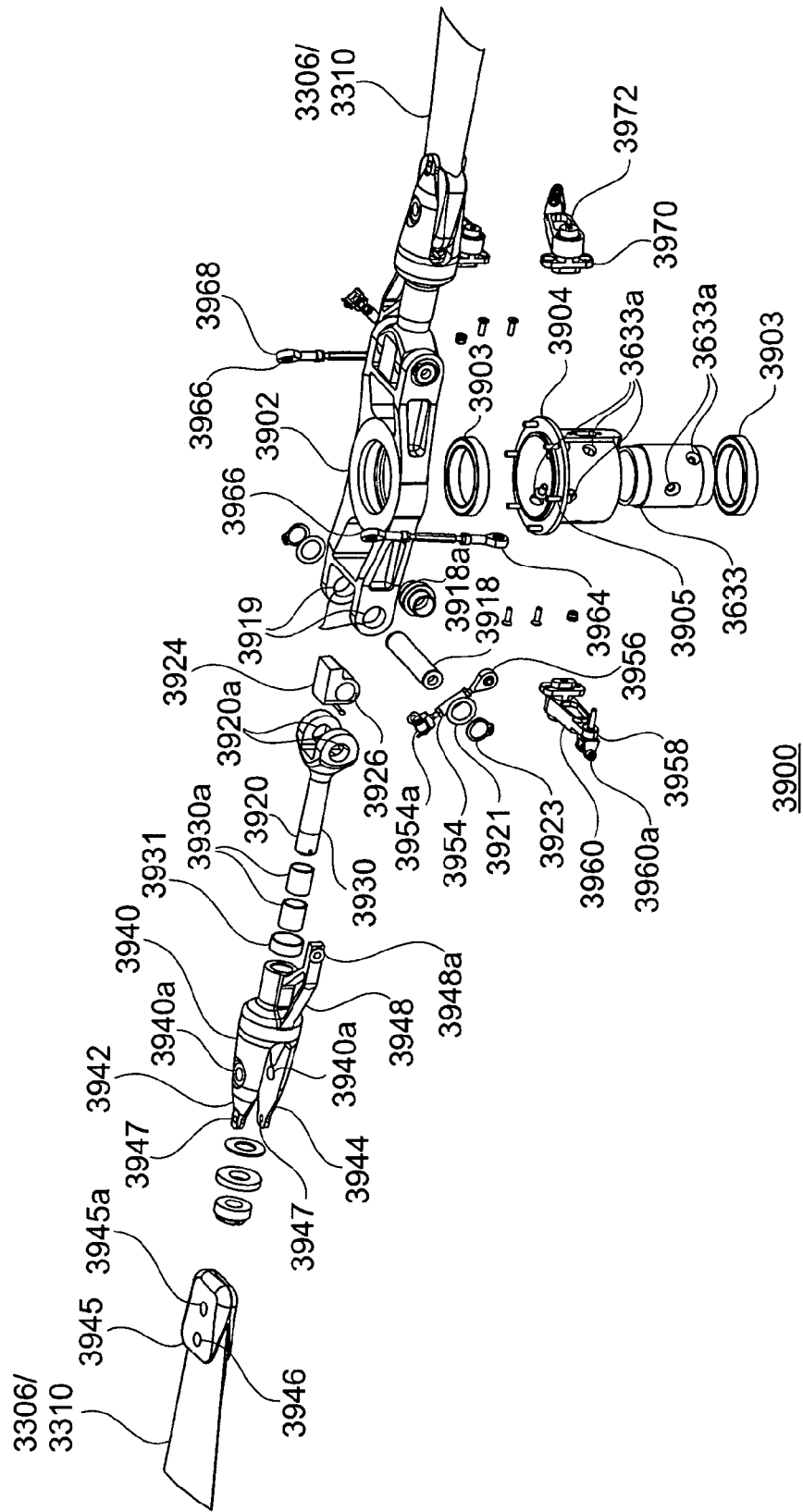
FIG. 39 depicts an exploded view of a pitch mechanism and associated rotors.

FIG. 39 shows an exploded view 3900 of a pitch mechanism. The pitch mechanism comprises a rotor hub 3642, which is part of the rotor head 3902, that is mountable on a rotor hub drive 3904, referred to as 3632 above. The rotor hub drive 3904 has associated fasteners 3905 for coupling the rotor hub drive 3904 to the rotor hub 3642. The non-rotating bearing sleeve 3633 is mounted within the rotor hub drive 3904 and captured between a pair 3903 of bearings. The through holes 3633a of the sleeve 3633 are shown more clearly as are corresponding through holes 3632a. The rotors 3306/3310 are coupled to the rotor hub 3642 via a flap hinge comprising a flap hinge pivot pin 3918 and rotor axle 3920. The flap hinge comprises a pair of through holes 3919. The flap hinge pivot pin 3918 is retained in place via respective pairs of washers 3921 and circlips 3923 and is mounted within a bearing 3918a mounted between through holes 3920a of the rotor axle 3920. The flap hinge also comprises a flap hinge pivot travel limiter 3924 having a through hole 3926 for receiving the flap hinge pivot pin 3918. The flap hinge pivot travel limiter 3924 is arranged to limit the rotation of the rotors 3306/3310 about the axis of the flap hinge. In a preferred embodiment, the range of minimum angles, measured relative to a normal of the body 3302, is 0° to 15° and, preferably, 7.5°. The rotor axle 3920 has a neck portion 3930 arranged to receive a set of bearings 3930a for bearing the load of the rotor via the rotor grip. The illustrated embodiment shows a pair of such bearings 3930a, but could equally well comprise a single bearing or more than two bearings. Also provided is a collar 3931 to act as a spacer between the rotor grip and a shoulder at the base of the neck portion 3930. The neck portion 3930 and the bearings 3930a are received within a rotor grip 3940. The rotor grip 3940 has a jaw comprising an upper jaw 3942 and a lower jaw 3944 arranged to clamp the root 3945 of the rotor blade 3306/3310. The rotor grip 3940 also comprises a pair of through-holes 3940a for cooperating with corresponding holes 3945a of the root 3945 via a screw (not shown) to serve as a clamp for clamping the rotor in position. The rotor grip comprises a fastener and lead/lag limiter (not shown) that is arranged to pass through respective holes 3947 in the upper 3942 and lower 3944 jaws and at least one respective hole 3946 of the rotor blade root 3945 to provide a measure of lead/lag variation, that is, the rotor is allowed to pivot about an axis defined by the through-holes 3940a during operation.

The rotor grip 3940 has a pitch control arm 3948 arranged to engage a respective pitch control linkage 3954. The pitch control linkage comprises a joint 3954a rotatable about a respective axis. The joint has a spigot 3954b for coupling to a spigot receiving hole 3948a of the pitch control arm 3948 such that the spigot 3954b is rotatable within the spigot receiving hole 3948a about a respective axis that is perpendicular to the axis of the joint 3954a.

A socket 3956 is provided at the other end of the pitch control linkage 3954. The socket 3956 is arranged to cooperate with a first end 3958 of a pitch input arm 3960 via a joint 3960a. The joint 3960a has a pair of mutually perpendicular axes arranged such that socket 3956 is rotatable about a respective pin of the joint 3960a forming a first axis and the joint is rotatable as a whole about a perpendicular axis of the pitch input arm 3960. The other side of the same end 3958 of the pitch input arm 3960 is also adapted to receive a respective socket 3964 of a first, caudal, end of a pitch control rod 3966. The other end, cephalic, of the pitch control rod 3966 also has a socket 3968 for receiving a ball of the swashplate 3652. A pair of mounts 3970 is provided together with respective bearings (only one 3972 is shown) for supporting the pitch input arms 3960. The mounts 3970 are coupled to the rotor hub drive 3904.

It will be noted that the pitch control rods 3966 are shown as extending substantially vertically, which is expected since the swashplate is disposed vertically above, or cephalically relative to, the rotors. This is because the swashplate is inverted and disposed above the rotor head rather than below the rotor head as is conventional. While preferred embodiments can be realised using such an arrangement, embodiments can be arranged such that the pitch control rods extend substantially downwards from the pitch input arms towards respective balls of the swashplate as indicated above with reference to FIGS. 1 to 32.

Figure 39A:
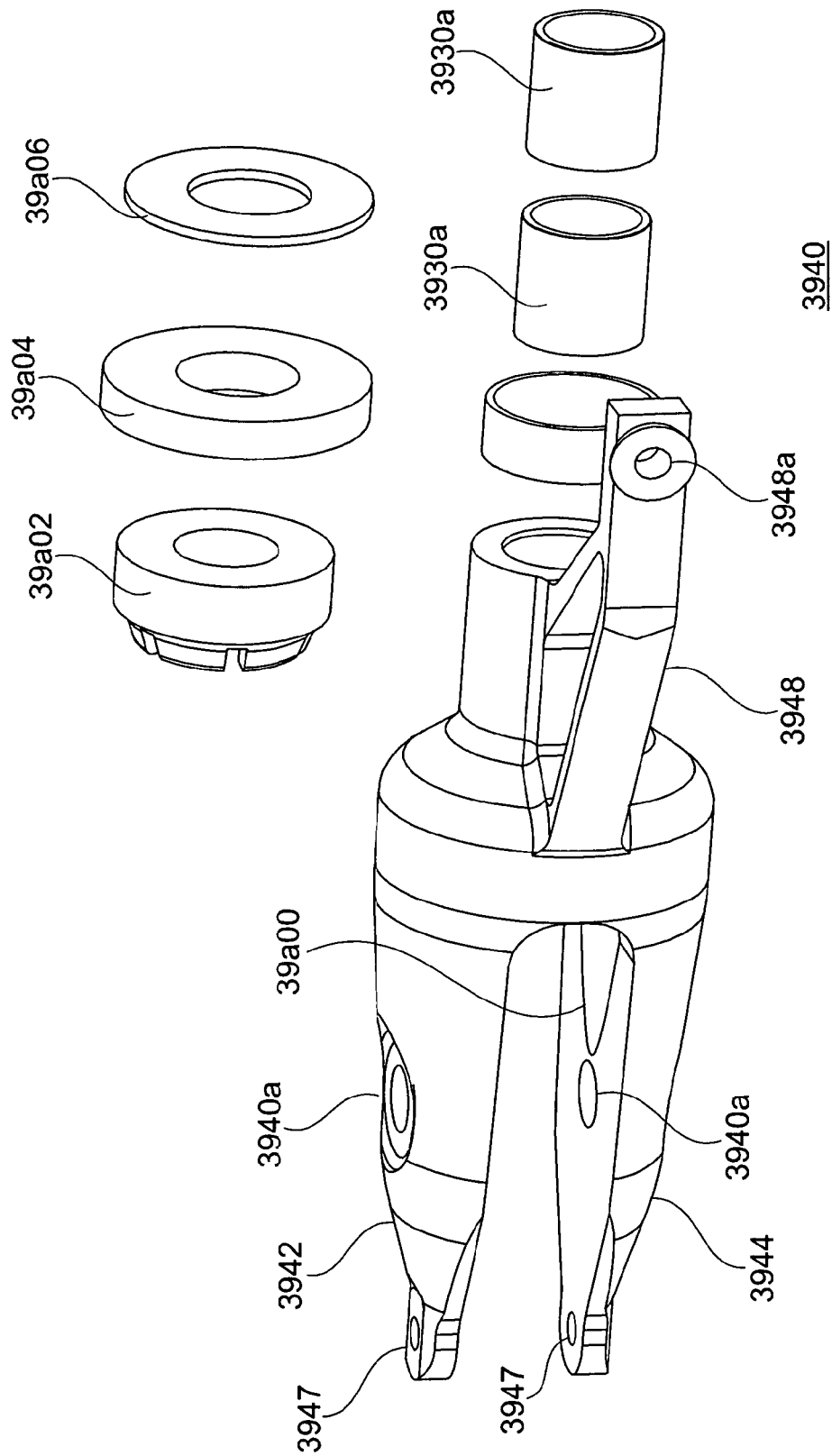
FIG. 39*a* illustrates in greater detail a rotor grip.

Referring to FIG. 39a, there is shown an enlarged view of the rotor grip 3940 showing the upper 3942 and lower 3944 jaws bearing the lead/lag holes 3947 and the through-holes 3940a for securing the rotor (not shown) and provide the lead/lag axis. The rotor grip has a pitch input arm 3948 and associated spigot receiving hole 3948a. The upper and lower jaws each bear respective grooves 39a00 for receiving nut 39a02, a thrust bearing 39a04, and a washer 39a06 to transfer rotor loads from the blade grip 3940 to the rotor axle 3920. The two bearings 3930a are also illustrated together as is the collar 3931.

Figure 40:
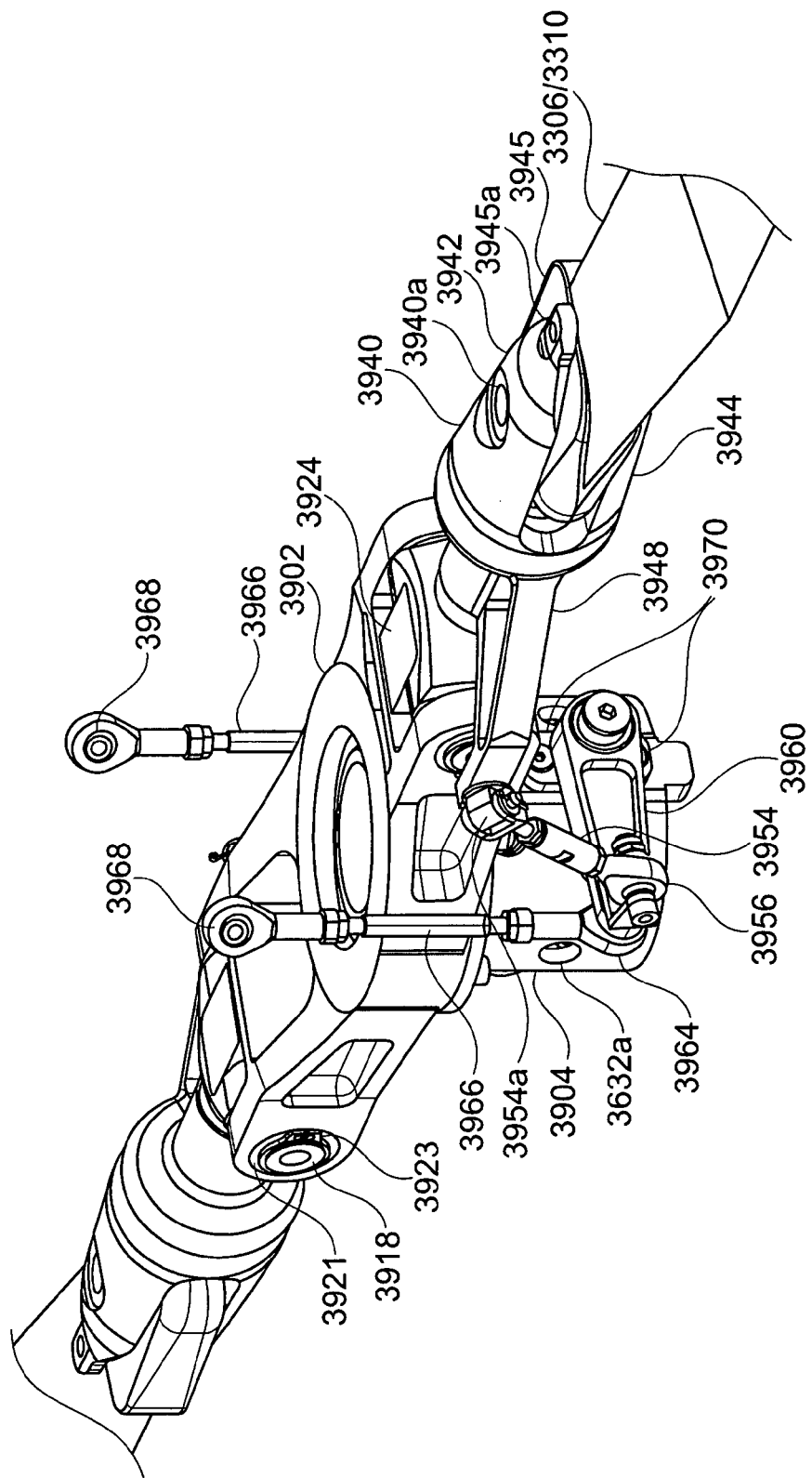
FIG. 40 shows a perspective view of the pitch mechanism.

FIG. 40 is an assembled view 4000 of the pitch mechanism. It will be appreciated again that the pitch control rods 3966 are shown as being cranially or cephalically oriented, that is, directed towards the top of the vehicle as opposed to caudally oriented, that is, directed towards the bottom of the vehicle. Embodiments of the invention use cephalically oriented pitch control rods because the swashplate 3652 is situated above the rotor head 3902. It can be appreciated that the pitch control rods 3966, the pitch input arms 3960, pitch control linkages 3954 and pitch control arms 3948 are arranged such that the rotor blades 3306/3310 have a substantially zero angle of attack.

Figure 41:
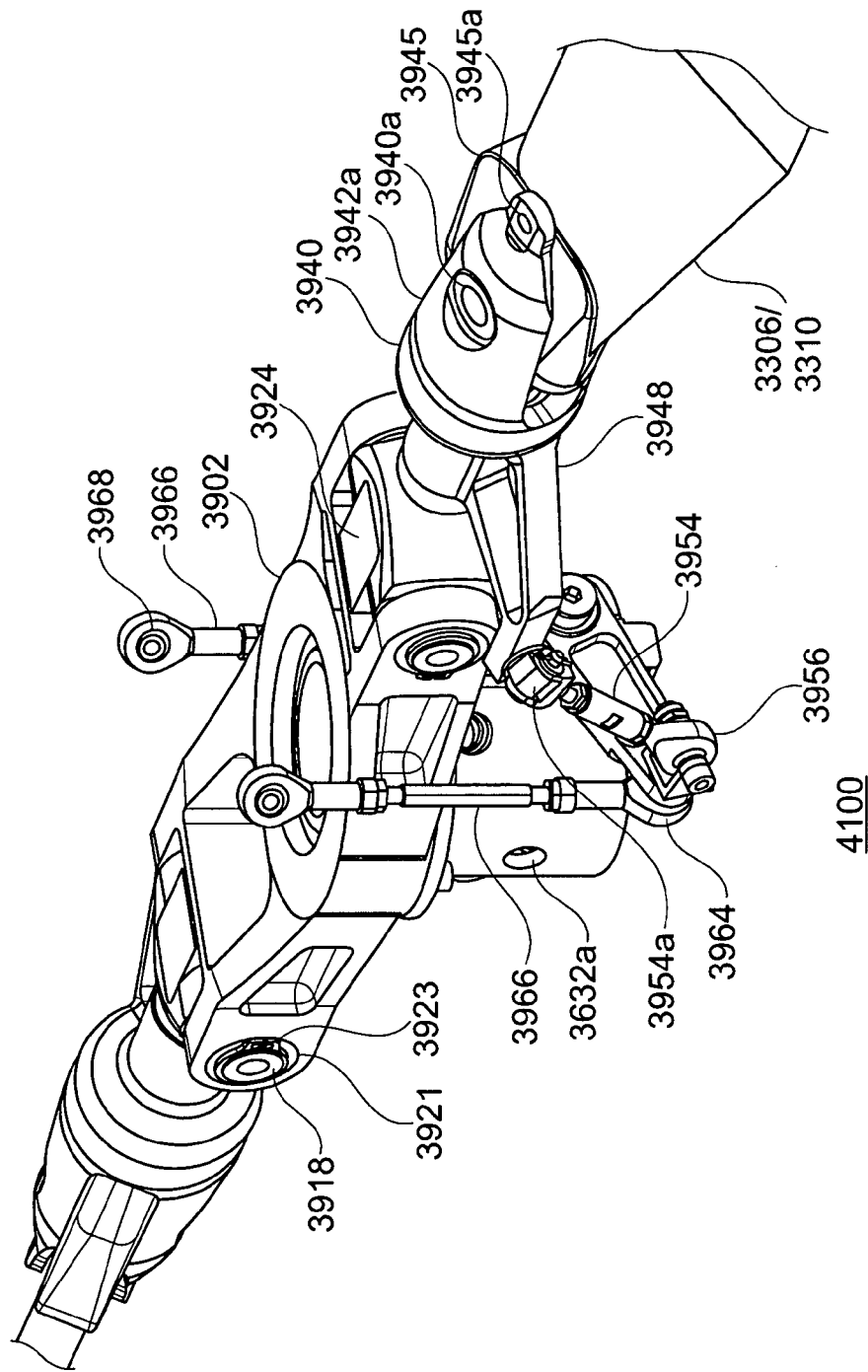
FIG. 41 depicts a further perspective view of the pitch mechanism.

FIG. 41 is a further assembled view 4100 of the pitch mechanism. It will be appreciated again that the pitch control rods 3966 are shown as being cephalically oriented. Embodiments of the invention actually use cephalically oriented pitch control rods because the swashplate 3652 is situated above the rotor head 3902. It can be appreciated that the pitch control rods 3966, the pitch input arms 3960, pitch control linkages 3954 and pitch control arms 3948 are arranged such that the rotor blades 3306/3310 have an angle of attack. Preferred embodiments have a maximum angle of attack of 35°.

Figure 42:
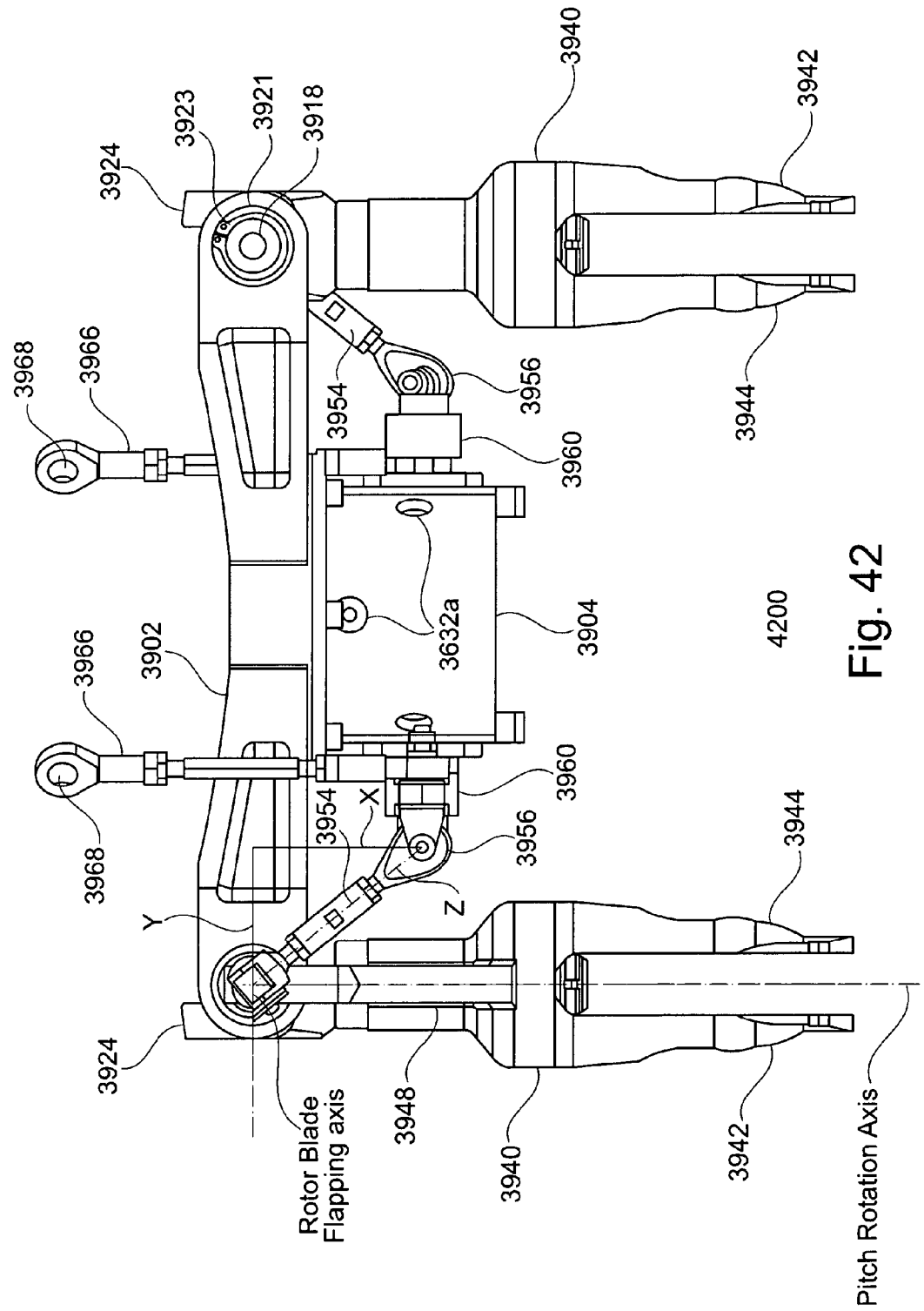
FIG. 42 illustrates a further view of the pitch mechanism.
Figure 43:
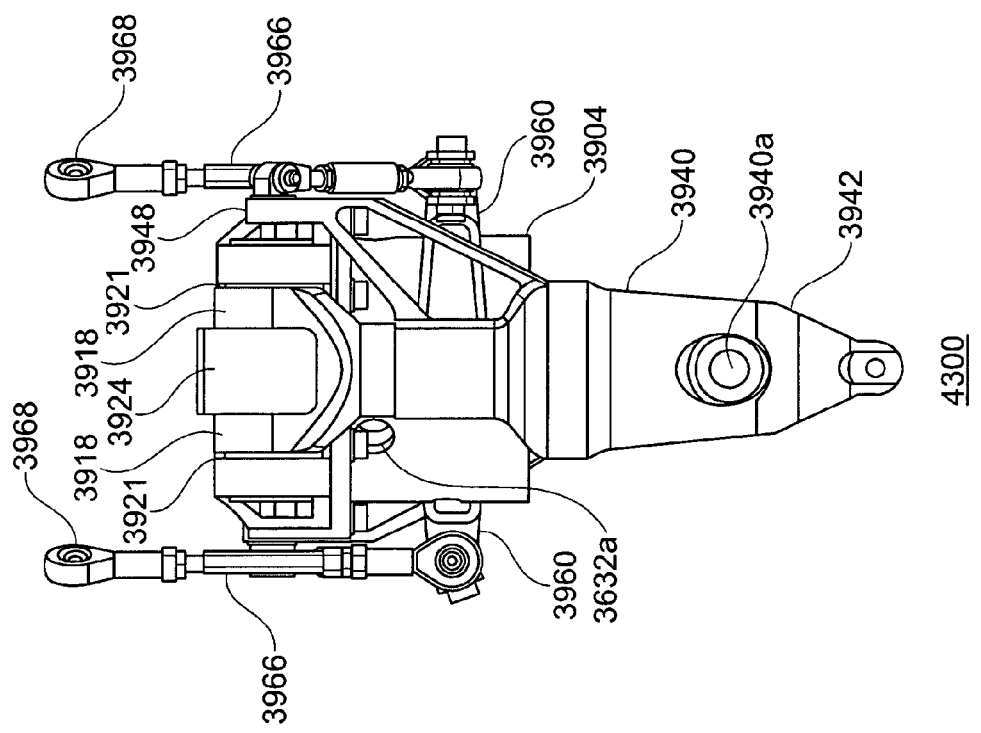
FIG. 43 shows a still further view of the pitch mechanism.

FIGS. 42 and 43 show front and end views 4200 and 4300 of the pitch mechanism 3900 with the rotor grips positioned as if the rotors were in the stowed position. Although structurally different in some respects the principle of operation is identical to the pitch mechanism describe above with reference to FIG. 7. The model will be described with reference to relative dimensions and ratios because the embodiments are scalable. The above described pitch input arm 760 has been modelled as a pair of arms 1002 and 1004. It can be appreciated that the model could have merely shown the first arm 1002 as being the other side of the second arm 1004, as depicted by the dashed line. The actuation axis 1006 corresponds to that provided by input arm bearing pins 776. It can be seen that the rotor 106/110 has a centre line or pitch rotation axis 1008. There is a predetermined distance, U, between the pitch rotation axis 1008 and the centre of the ball of the pitch control arm 748. FIG. 11 shows the relative orientations of the pitch control linkage 754, the centre line of the rotor head 702, which is collinear with the pitch rotation axis when the blade is in the deployed position, and the vertical distance between the axis 1006 and the centre line of the rotor axis. The following relative dimensions apply to preferred embodiments of the present invention:

$$X=Y, S=U, T=U, U=1.333Y \text{ and } Z=\sqrt{X^2+Y^2}.$$

Referring, again, to FIGS. 39 and 40, it will be appreciated that the flapping angle is zero, that is, the rotors are fully deployed, which is in contrast to FIGS. 41 and 42 in which the rotors are in a stowed position.

One skilled in the art will appreciate that the pitch or angle of attack of the rotor blades 3306/3310 can be controlled even when the rotor blades 3306/3310 are in the stowed position and/or during the transition of the rotor blades 3306/3310 from the stowed position to the fully deployed position, which is in stark contrast to a conventional helicopter pitch control mechanism. One skilled in the art will appreciate that the blade collective pitch needs to be close to zero for fully folded rotors for packaging constraints. During rotor deployment, the rotor collective pitch will initially be changed to high pitch and then reduced as the rotor system accelerates. The foregoing is undertaken with a view to managing, preferably reducing, the aerodynamic forces on the rotors during deployment. This rotor pitch schedule will be implemented as a schedule depending upon rotor RPM and airspeed. As the rotor RPM increases from zero, cyclic inputs may be used to control flapping and maintain axisymmetric deployment. After the rotors are at moderate RPM and deployment is at small flapping angles, cyclic will be used to initiate transition to level flight. During transition to level flight, control of collective and cyclic will be required to achieve the desired body forces and to avoid excessive rotor loads.

Figure 44A:
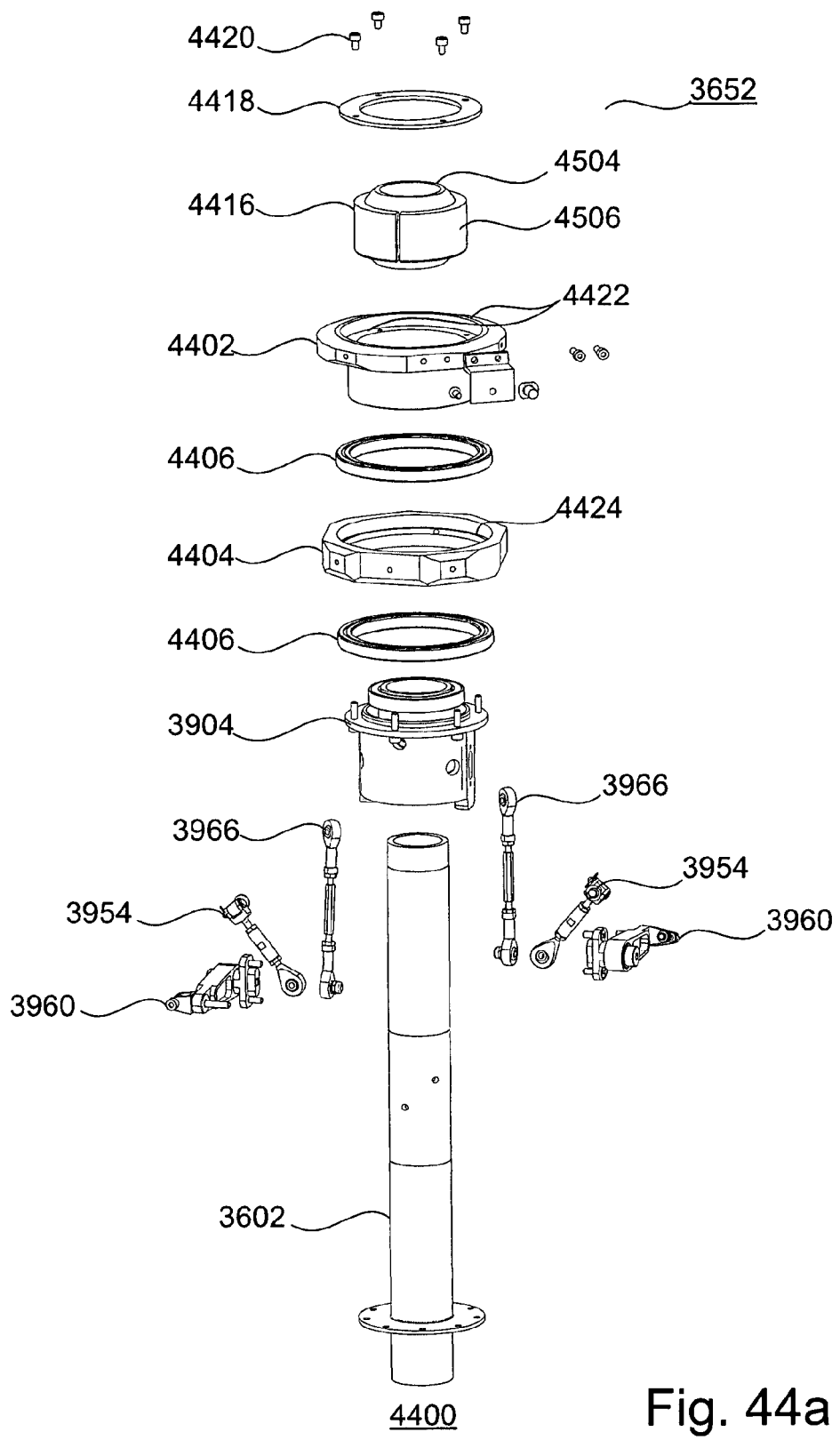
FIG. 44*a* depicts an exploded view of a swashplate.

FIG. 44a is an exploded view 4400 of the swashplate assembly 3652 and central core 3602. The swashplate assembly 3652 comprises a non-rotating element 4402 and a rotating element 4404. The rotating element 4404 is carried by bearings 4406. The non-rotating element 4402 and a circular bracket 4418 are arranged, when assembled, to capture a ball joint 4416, comprising a ball 4504 and a collar 4506. The ball 4504 is fabricated from a rigid plastic material. Preferred embodiments use such materials exhibiting self-lubricating properties such as acetal, nylon, Teflon etc. The ball joint is supported within the non-rotating element 4402 via a lip (not shown) and is secured place by a circular bracket 4418 together with corresponding screws 4420 that engage respective holes 4422 in the non-rotating element 4402. The rotating element 4404 has an inner lip 4424 that is arranged to bear the bearings 4406.

Although the above embodiment uses a ball and socket arrangement to realise the swashplate assembly, embodiments are not limited thereto. Alternative embodiments of the swashplate assembly can be realised with other arrangements, as have been described with reference to FIGS. 29 to 32.

Figure 44C:
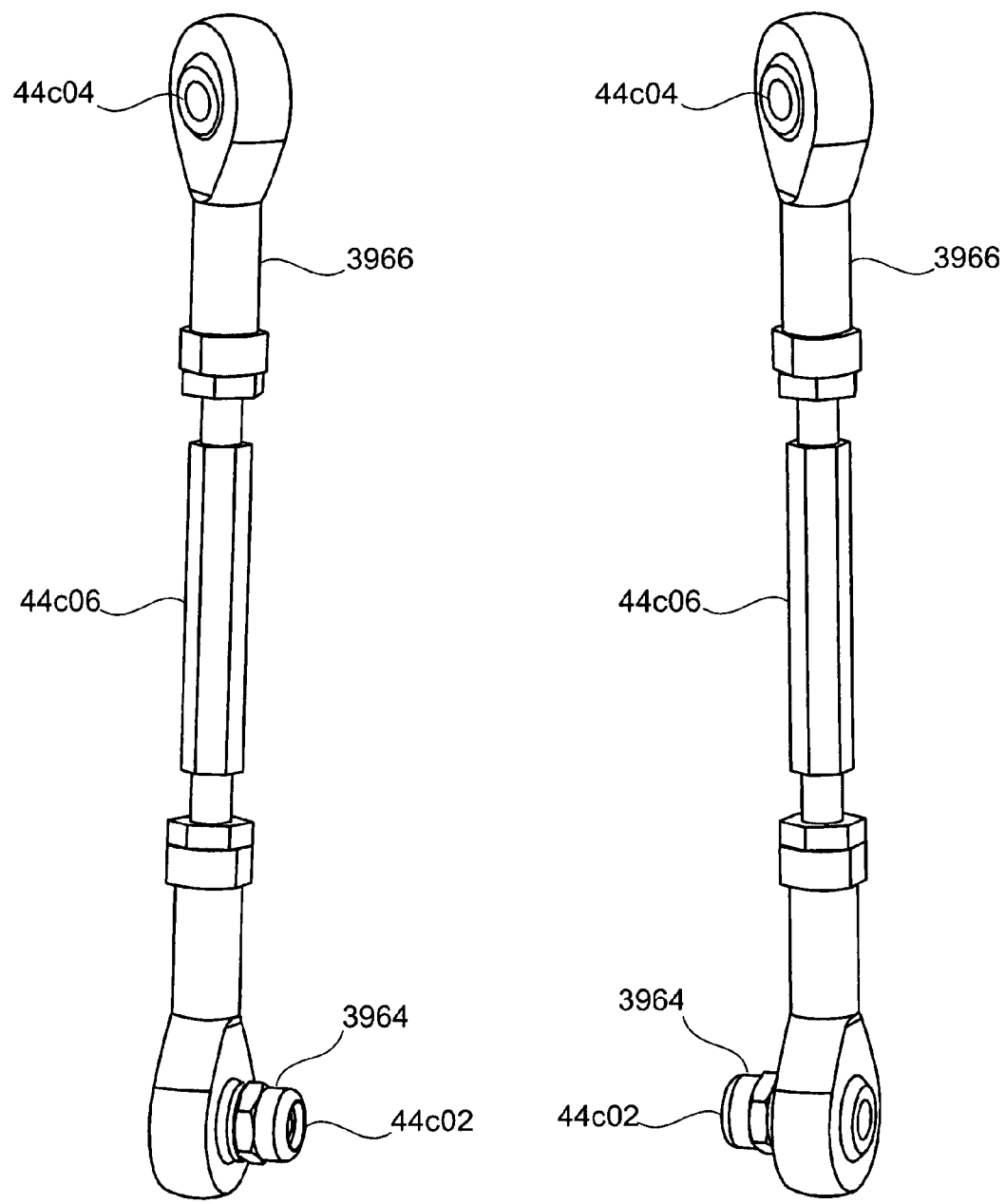
FIG. 44*c* shows perspective views of pitch control rods.
Figure 44D:
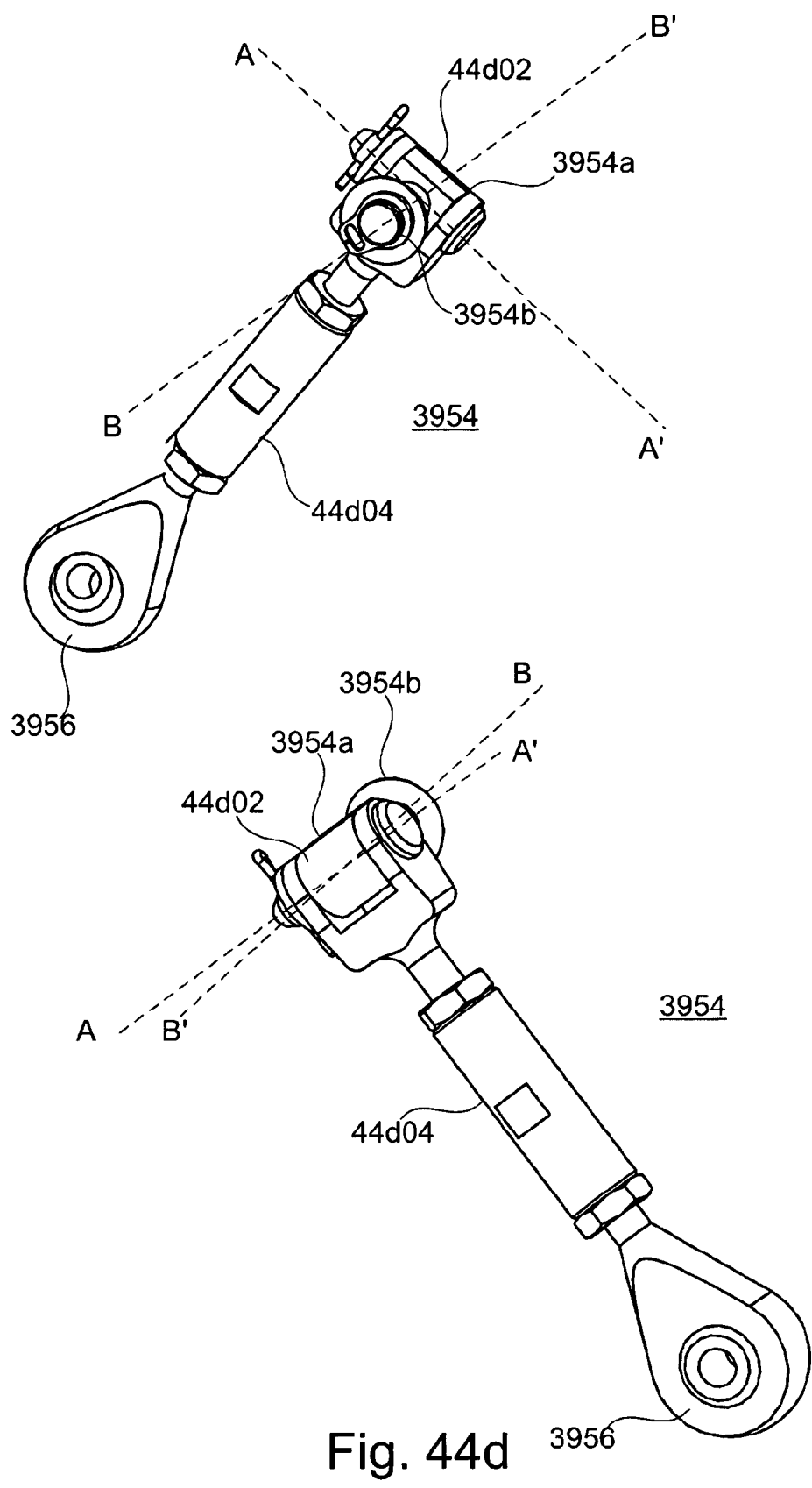
FIG. 44*d* depicts perspective views of pitch control arms.

FIGS. 44b to 44d illustrate in greater detail components shown in FIG. 44a.

Referring to FIG. 44b there is shown two perspective front and rear views of pitch control arms 3960 according to embodiments of the present invention. The pitch control arms 3960 clearly illustrate several axes; namely AA', BB' and CC'. The whole pitch control arm 3960 rotates about axis AA' to vary the pitch of the rotors. The joint 3960a comprises two mutually perpendicular axis BB;' and CC' that allow the joint 3960a to rotate when coupled to a corresponding pitch control linkage 3954 and, in particular, to a socket 3956 thereof via a rod 3960b. The rod 3960b is releasably secured in place via a respective nut and bolt 3960c. Also illustrated is the mount 3970 via which the pitch control arm 3960 is secured to the rotor hub drive 3904. The pitch control arm 3960 comprises a spigot 3960d for coupling to a corresponding caudally disposed socket of a respective pitch control rods 3966. The spigot 3960a is coaxial with axis BB'. The rod 3960b is also rotatable about axis BB', as well as axis CC'.

FIG. 44c shows in greater detail an embodiment of the pitch control rods 3966. The pitch control rods 3966 comprise a caudally disposed ball and socket joint 3964 for receiving the spigot 3960*d* of the pitch control arm 3960 and a corresponding nut 44*c*02 for coupling with the spigot 3960*d*. The pitch control rods 3966 also comprise a cephalically disposed ball and socket joint 44*c*04 for coupling to the rotating element 4404 of the swashplate. The lengths of the pitch control rods 3966 can be varied via central threaded portions 44*c*06.

FIG. 44*d* shows an embodiment of a pitch control linkage 3954. The pitch control linkage 3954 comprises a caudally disposed socket 3956 for coupling to the rod 3960*b* of the joint 3960*a* and a cephalically disposed joint 3954*a* as described above, in the form, for example, of a ball and socket joint. The joint 3954*a* is realised using a shaft 44*d*02 that is rotatable about a respective axis AA' and a mutually perpendicular spigot 3954*b*. The spigot 3954*b* is adapted to be received in the above described spigot receiving hole 3948*a*. The pitch control linkages 3954 also comprise a central threaded portion 44*d*04 for varying the length or tension of the pitch control linkages 3954.

Figure 45:
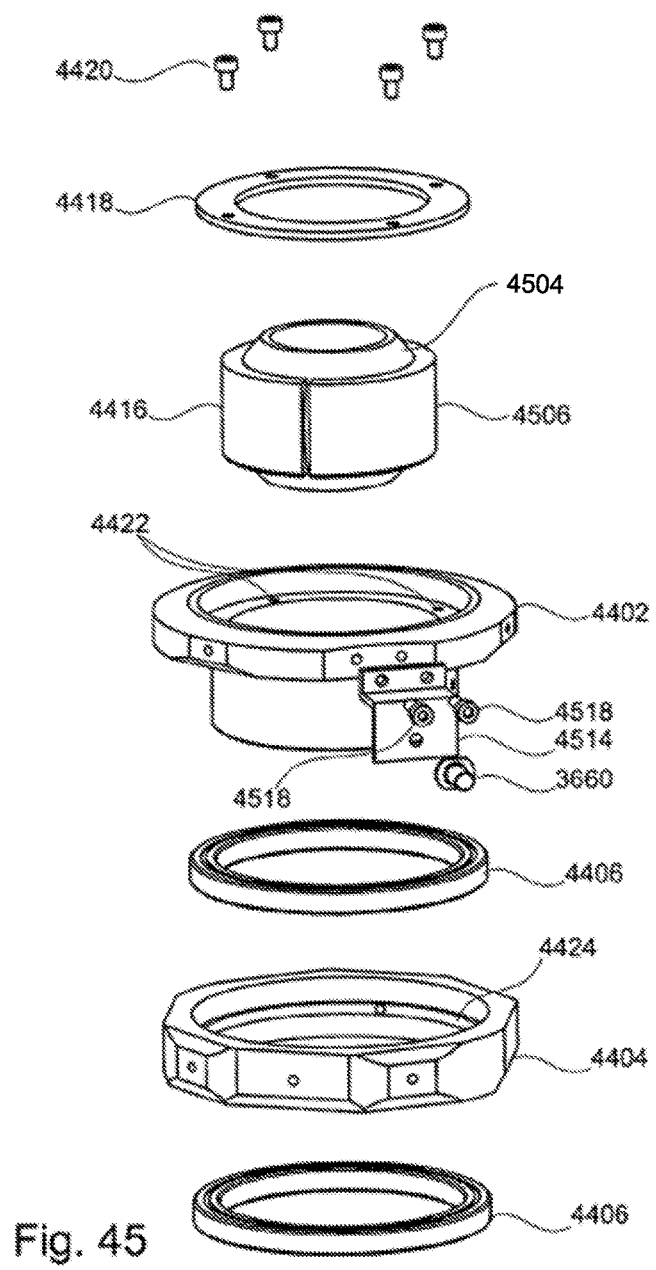
FIG. 45 is an exploded view of a swashplate.

FIG. 45 shows an exploded view 4500 of the swashplate assembly 3652. It can be appreciated that the rotating element 4404 has an internal lip 4424 for maintaining a degree of separation between the bearings 4406. The ball joint 4416 comprises an annular ball 4504 and a collar 4506. The ball joint 4416 is secured in place within the non-rotating element 4402 via the brace 4418 and respective screws 4420 that engage corresponding holes 4422 within the non-rotating element 4402. The collar 4506 has a cylindrical outer surface and a spherical inner surface that matches the curvature of the annular ball 4504.

Also shown is a bracket 4514 for carrying the pin 3660 that cooperates with the anti-rotation guide 3656. The pin 3660 is secured in place from the rear via a respective screw (not shown). The bracket 4514 is secured to the non-rotating swashplate 4402 via a pair of screws 4518.

Figure 46:
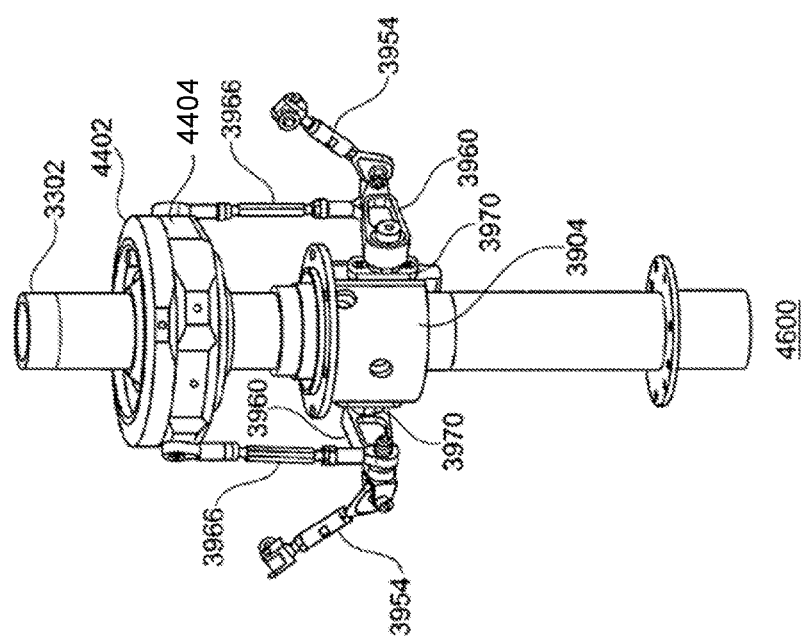
FIG. 46 is a perspective view of a swashplate and pitch mechanism.

FIG. 46 is a view 4600 of the swashplate assembly 3652. The pitch control rods 3966 are coupled, at a cephalic end, to the rotating element 4404 and coupled, at a caudal end, to respective pitch input arms 3960.

Figure 47:
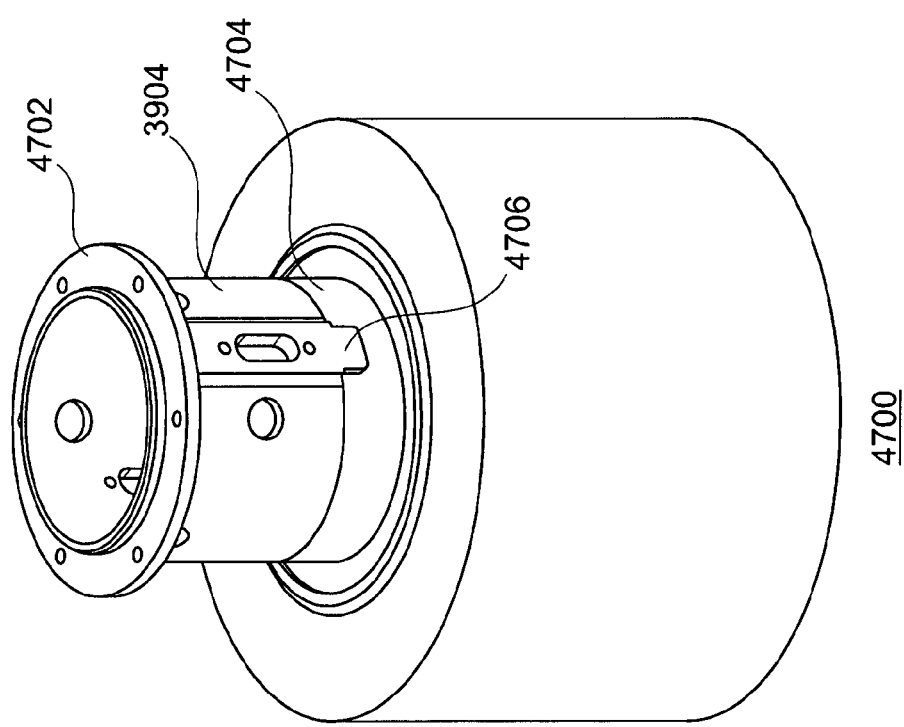
FIG. 47 depicts a motor and rotor hub drive.

FIG. 47 is a perspective view 4700 of the motor and rotor hub drive 3904. The rotor hub drive 3904 has an annular mount 4702 with a plurality of holes for coupling the rotor hub drive to the rotor hub 3642. The rotor hub drive 3904 engages with an output shaft 4704 of the motor 3616 via at least one lug 4706 and preferably a plurality of such lugs that are circumferentially equally disposed around the rotor hub drive.

Embodiments of the present invention are modular and the layout of the various components can be varied. The layout of embodiments as described above with reference to FIGS. 19 to 24 are equally applicable to the present embodiment. Similarly, the observations made above relating to FIGS. 17 and 18 and FIGS. 25 to 32 are equally applicable to the embodiments described with reference to FIGS. 33 to 51.

The motors used in the above embodiments can be any type of motor, but electric motors are preferred notwithstanding their lower power density as compared to internal combustion motors. Generally, electric motors have the advantage that they are light as compared to an internal combustion engine together with associated fuel. Embodiments of the invention can use brushless motors or brushed motors. As can be appreciated from the various configurations described above, a single motor can be used to drive the rotors or multiple motors can be used to drive the rotors. One skilled in the art will appreciate that embodiments that use a single motor preferably use a motor with a hollow core to accommodate the core 3602.

Figure 48:
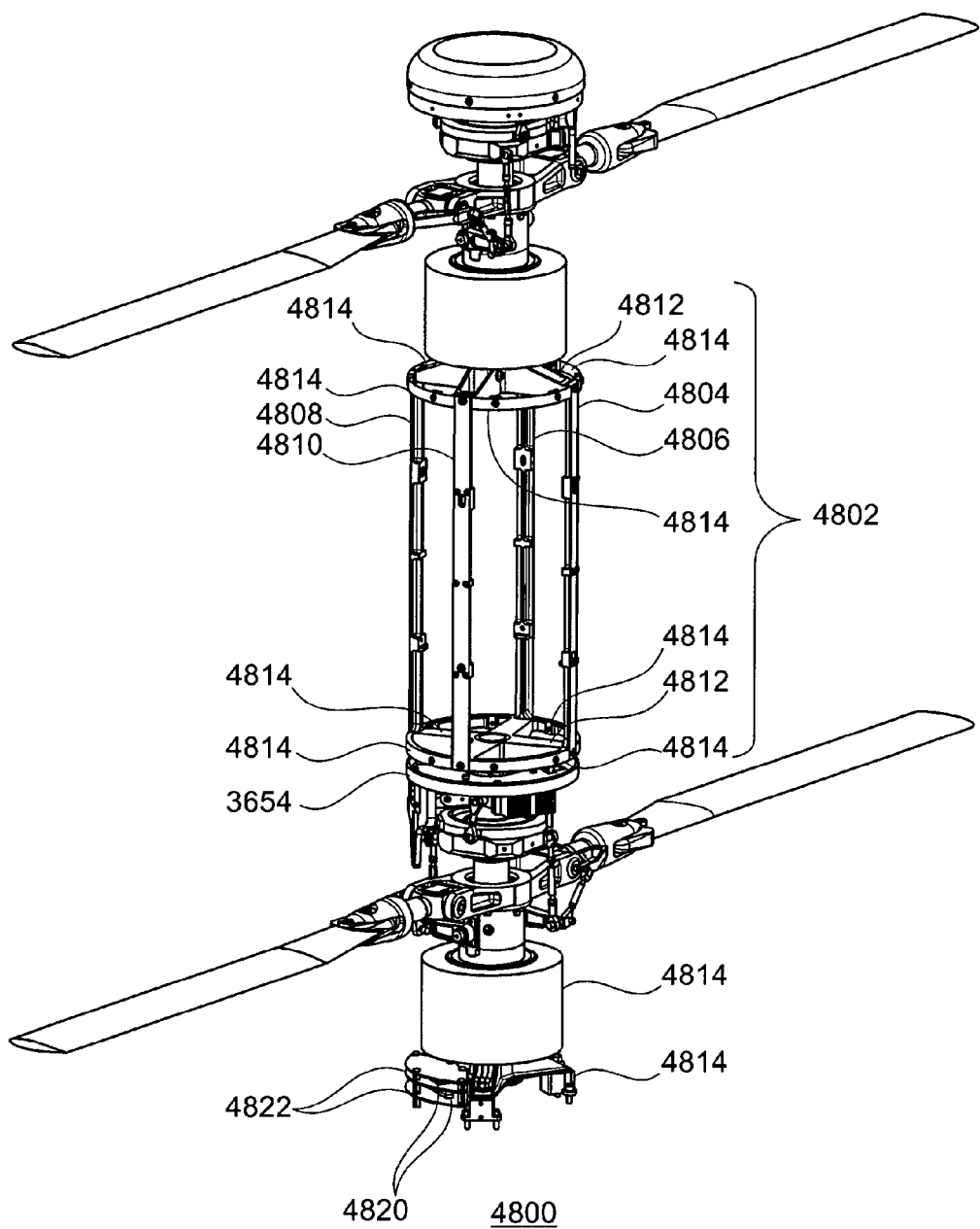
FIGS. 48 to 50 show a preferred embodiment of a vehicle.

Referring to FIG. 48, there is shown an assembled view 4800 of a preferred embodiment of the vehicle 3300. Of note is a central portion of the air-frame 4802, which comprises a plurality of circumferentially disposed supports 4804 to 4810. The supports have a modular or segmented construction that can be used to vary the lengths of the supports according to requirements.

The supports 4804 to 4810 are coupled to a cephalically disposed motor mount 4812. Preferably the motor mount 4812 has a cruciform shape with braces between the ends of the arms of the cruciform. It will be appreciated that four such braces are shown. Motor mount 4812 and mount 3802 described above are one and the same.

The supports 4804 to 4810 are coupled to a caudally disposed actuator plate 3654, as described above.

A mount 4816 is provided on the bottom of the caudal motor 4818. A payload can be attached to the mount 4816. Alternatively, or additionally, the volume defined by the supports 4804 to 4810 can be used to carry a payload, which leads to a more compact vehicle as compared to having a payload attached to the mount 4816.

The flight control system 2500 described above with reference to FIG. 25 is illustrated in FIG. 48 as indicated by the one or more PCBs 4820 mounted on respective mounts 4822.

Figure 49:
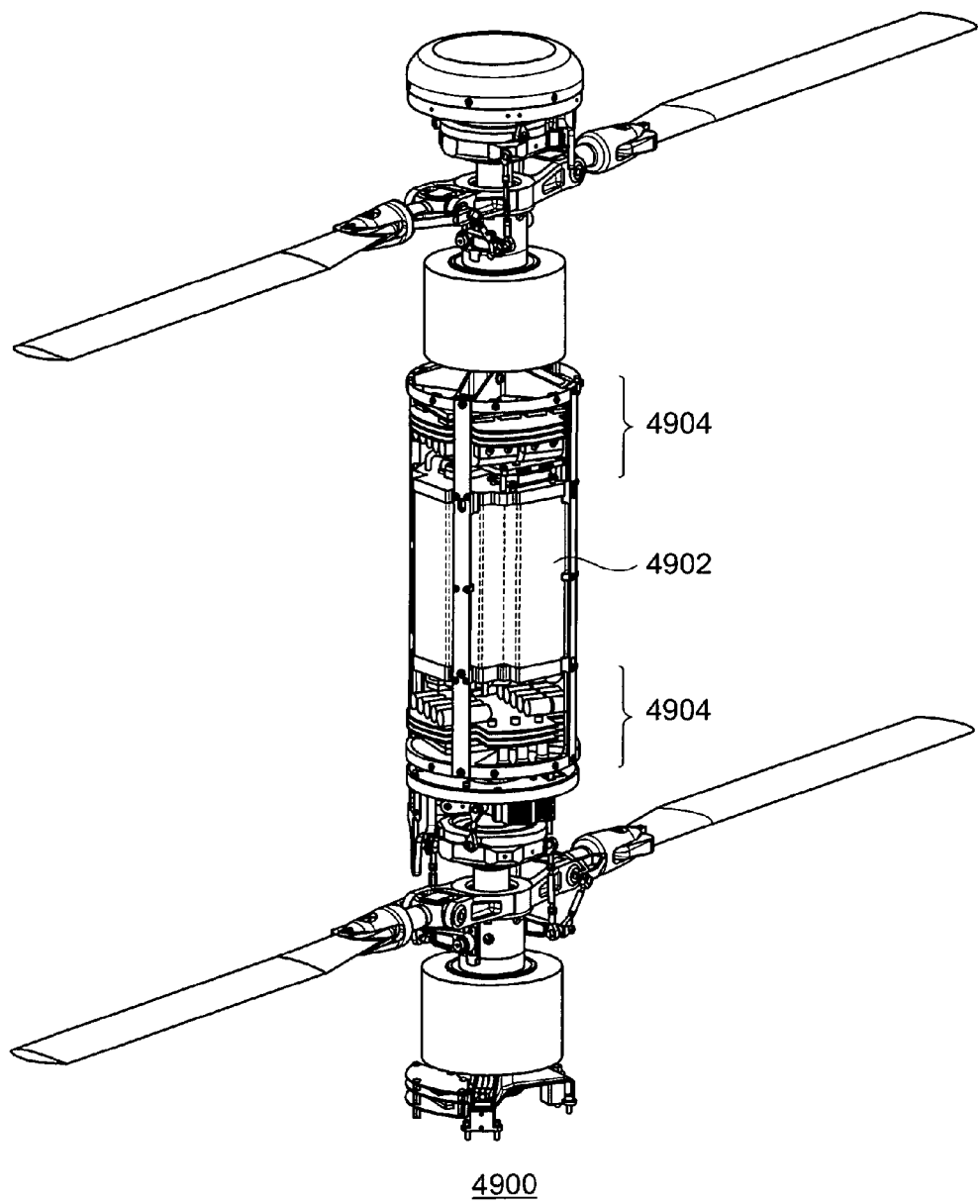

FIG. 49 shows a view 4900 of the vehicle in which the central portion of the air-frame 4802 is illustrated as carrying an electrical power supply 4902 and associated power electronics 4904 for driving the motors and servos in response to the control system.

Figure 50:
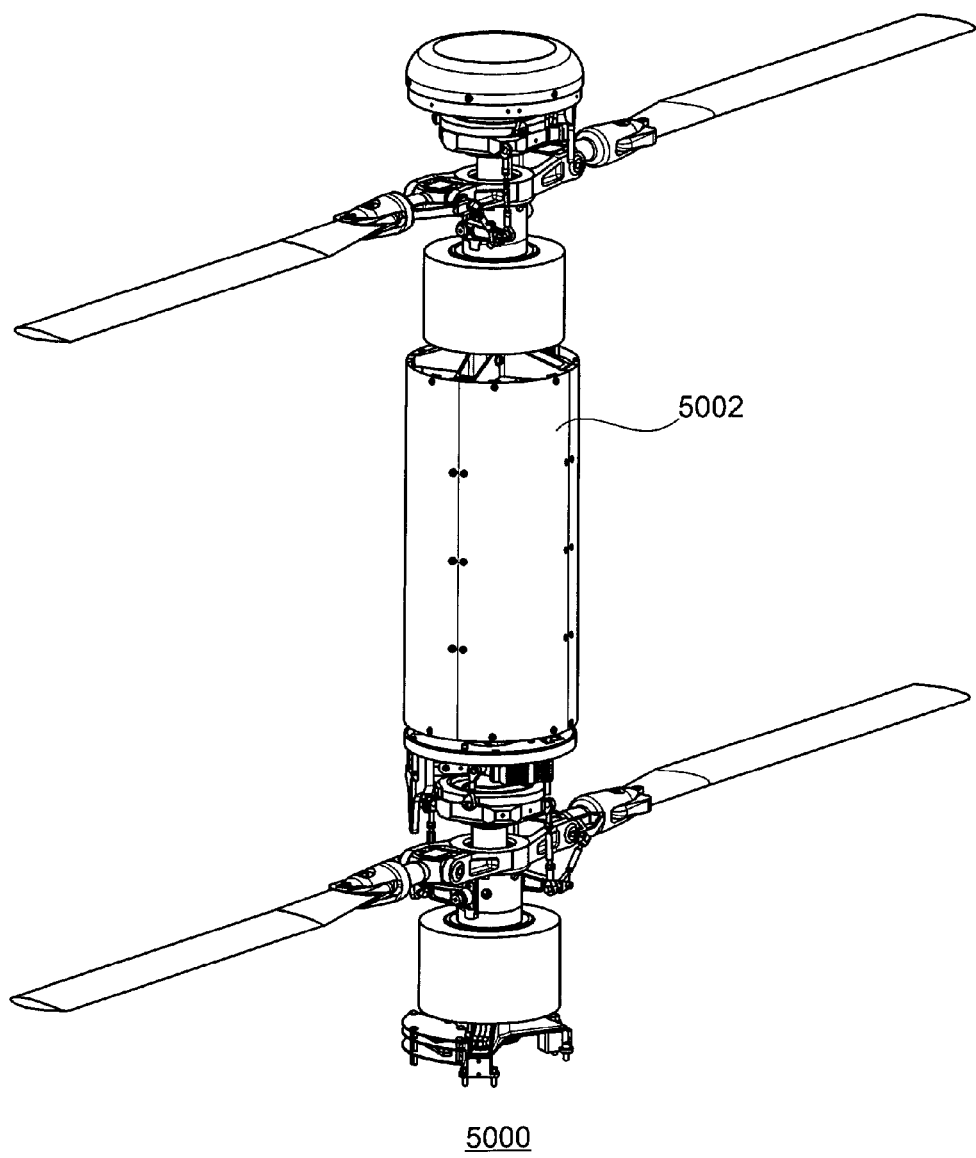

FIG. 50 is a view 5000 of the vehicle in which the central portion of the air-frame 4802 has a housing or shell 5002 to protect the power supply and associated electronics as well as to improve the aerodynamics of the vehicle. In the embodiment illustrated the shell comprises four arcuate panels that are mounted to the supports 4804 to 4810 and braces 4814.

Figure 51:
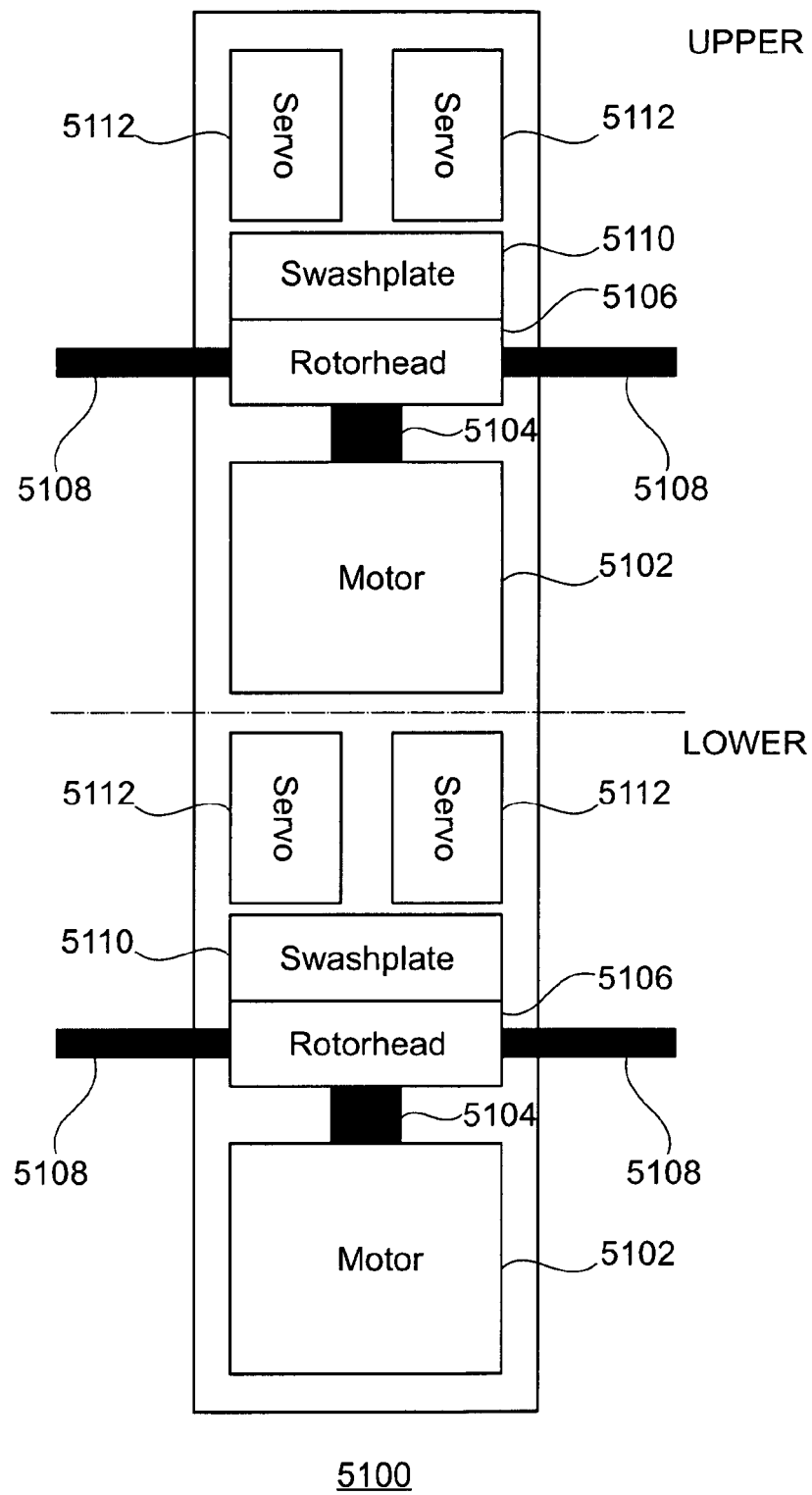
FIG. 51 depicts a preferred vehicle configuration.

FIG. 51 shows a view 5100 of a preferred configuration of a vehicle according to embodiments of the present invention. It can be appreciated that the upper and lower sections are substantially identical in layout but for the orientation of the rotors, which are opposite as expected in a counter-rotating arrangement. Starting from the caudal end, the motors 5102 are mounted on shafts 5104 and arranged to drive the rotor heads 5106. The rotor heads 5106 carry the rotors 5108. The swashplates 5110 are positioned above the rotor heads and the servos 5112 are positioned above the swashplates 5110.

Preferred embodiments of the present invention use an electric propulsion system comprising a source of electrical energy, such as a battery or a fuel cell, and a means of conversion of electrical energy to mechanical energy, such as a brushless motor and associated power electronics. Preferred embodiments of the present invention use a rocket launch system comprising a solid fuel rocket motor.

Although the above embodiments have been described with reference to cephalically disposed rotors, embodiments are not limited thereto. Embodiments can be realised in which rotors are substantially centrally disposed or in which the rotors are both cephalically and caudally disposed.

Figure 52:
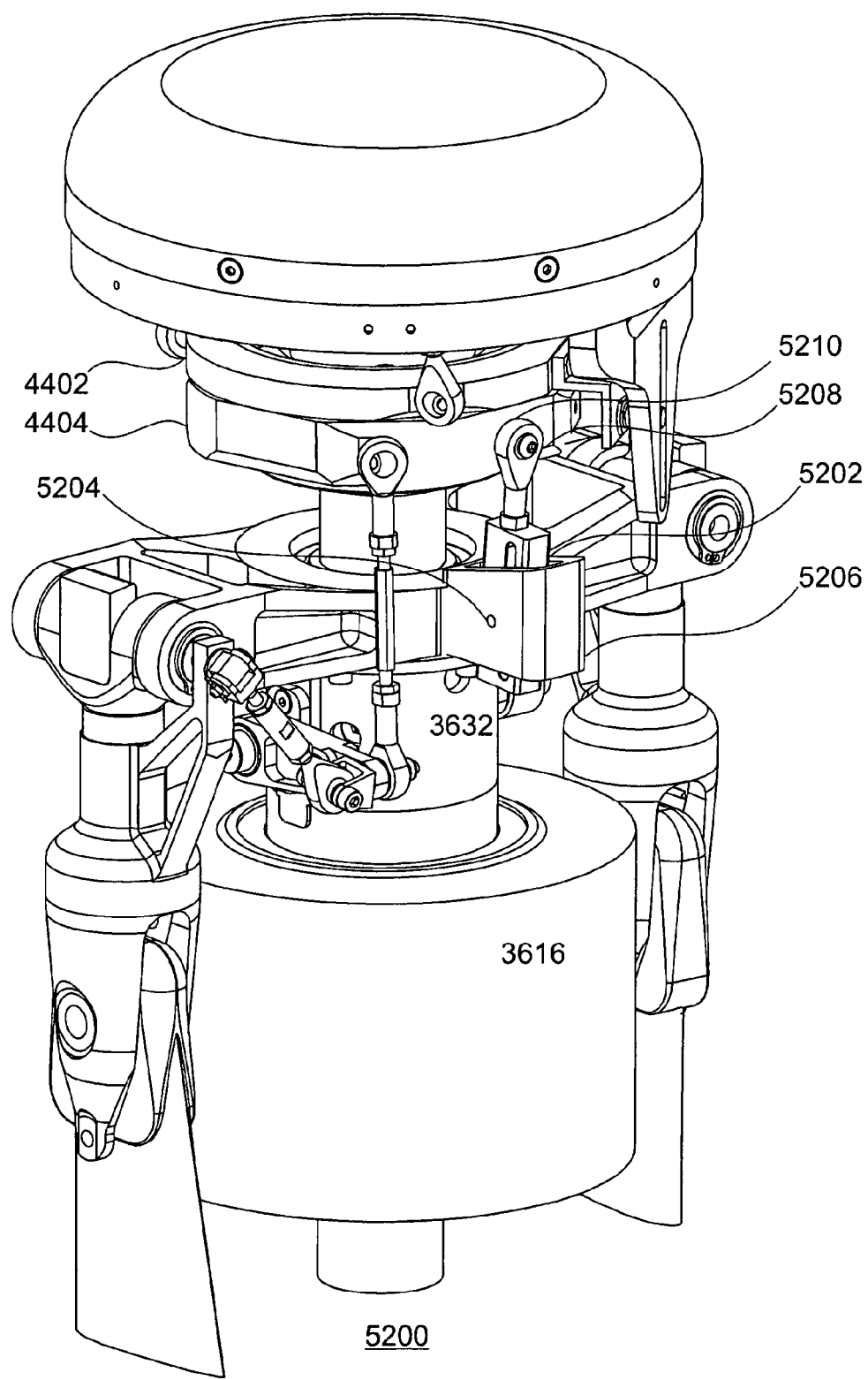
FIG. 52 shows an embodiment of a swashplate drive.

Referring to FIG. 52, there is shown a view 5200 of an embodiment of a rotor system of any of the above-described rotor systems. It can be appreciated that the motor 3616 is arranged to drive the rotor hub drive 3632. The rotor hub drive 3632 is coupled to a slotted slide block 5202 adapted to move in a reciprocating manner cephalically and caudally constrained via a pin 5204 and a respective drive guide 5206; the latter being coupled to or forming part of the rotor hub. The slide block is freely moveable within the drive guide 5206. The slide block 5202 is coupled to the rotating element 4404 of the swashplate to transfer torque from the motor to the rotating element 4404 to cause rotation there. The coupling between the slide block 5202 and the rotating element 4404 is realised via a rod end 5208 having a ball 5210 to form a ball and socket joint coupling with the rotating element 4404.

The invention claimed is:

1. A rocket or ballistic launch rotary wing vehicle, the vehicle comprising:
    a rocket or ballistic launch propulsion system for launching the vehicle,
    a rotary wing flight system for providing powered flight comprising dual counter rotating coaxial rotors;
    the rotary wing flight system comprising a pitch mechanism for controlling the pitch of a rotor of the dual counter rotating coaxial rotors, the pitch mechanism comprising a flap hinge having a flap hinge axis of rotation, and a pitch control arm having a pitch control arm axis of rotation;
    the pitch control arm being, relative to a rotor axis of rotation, radially outwardly disposed of the flap hinge axis of rotation, the flap hinge being actuatable, via the flap hinge axis of rotation, over a range comprising a stowed position, in which the dual counter rotating coaxial rotors are folded, to a deployed position via a transition phase and wherein at least one of a cyclic and collective is variable during the transition phase; and
    a control system programmed to adjust the pitch of the rotor to any determined degree of pitch independently of a flap angle of the flap hinge during a transition of the dual counter rotating coaxial rotors from the stowed position to the deployed position.

2. The vehicle of claim 1, wherein the rotary wing flight system comprises a plurality of rotary wings for deployment following a rocket or ballistic phase of flight.

3. The vehicle of claim 1, wherein at least one of the cyclic and collective is variable to influence vehicle attitude.

4. The vehicle of claim 1, wherein the launch propulsion system comprises at least one of a ballistic system for launching the vehicle as a projectile and a rocket motor for launching the vehicle as a rocket.

5. The vehicle of claim 1, wherein the dual counter rotating coaxial rotors are in the stowed position having a predetermined pitch angle.

6. The vehicle of claim 5, wherein the predetermined pitch angle is at least one of (a) between 5° and 15° and (b) 8°.

7. The vehicle of claim 1, wherein the pitch mechanism for controlling the pitch of the rotor comprises a rotor head, for rotation about a rotor axis of rotation, comprising the flap hinge to pivot about a flap hinge axis of rotation within a respective flap hinge plane of rotation and the pitch control arm mounted radially outwardly of the flap hinge; the pitch control arm being to rotate about the pitch control axis of rotation within a pitch control arm axis plane of rotation; and wherein the pitch control arm plane of rotation is substantially orthogonal to the flap hinge plane of rotation.

8. The vehicle of claim 1, wherein the dual counter rotating coaxial rotors comprise at least a first pair of rotors and the vehicle comprises head end and a tail end.

9. The vehicle of claim 8, wherein at least the first pair of rotors is disposed at the head end.

10. The vehicle of claim 9, wherein the rotary wing flight system for providing powered flight comprises at least a second pair of rotors disposed at the head end of the vehicle.

11. The vehicle of claim 8, wherein the dual counter rotating coaxial rotors comprise at least a second pair of rotors disposed at the tail end.

12. The vehicle of claim 8, wherein the dual counter rotating coaxial rotors comprise at least a second pair of rotors.

13. The vehicle of claim 1, wherein the vehicle comprises a central portion and the dual counter rotating coaxial rotors comprise one or more of a first pair of rotors disposed at the central portion and a second pair of rotors disposed at the central portion.

14. The vehicle of claim 1, wherein said at least one of the pitch, cyclic and collective is variable to transition the vehicle from a first angle of attack to a second angle of attack.

15. The vehicle of claim 14, wherein the first angle of attack is lower than the second angle of attack.

* * * * *